US006543184B2

United States Patent
Weder et al.

(10) Patent No.: US 6,543,184 B2
(45) Date of Patent: *Apr. 8, 2003

(54) DECORATIVE ASSEMBLY FOR A FLORAL GROUPING

(75) Inventors: Donald E. Weder, Highland, IL (US); William F. Straeter, Breese, IL (US); Joseph G. Straeter, Highland, IL (US); Michael J. King, Staunton, IL (US); Franklin J. Craig, Valley Park, MO (US); Michael R. Klemme, Collinsville, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/229,618

(22) Filed: Aug. 27, 2002

(65) Prior Publication Data

US 2003/0005629 A1 Jan. 9, 2003

Related U.S. Application Data

(60) Continuation of application No. 10/011,226, filed on Nov. 15, 2001, now abandoned, which is a continuation of application No. 09/912,217, filed on Jul. 24, 2001, now Pat. No. 6,427,380, which is a continuation of application No. 09/670,644, filed on Sep. 27, 2000, now abandoned, which is a continuation of application No. 09/576,789, filed on May 23, 2000, now abandoned, which is a continuation of application No. 09/333,333, filed on Jun. 15, 1999, now Pat. No. 6,082,045, which is a division of application No. 08/827,852, filed on Apr. 11, 1997, now Pat. No. 5,937,576.

(51) Int. Cl.$^7$ ................................................ A01G 9/02
(52) U.S. Cl. ............................................................ 47/72
(58) Field of Search ............................................. 47/72

(56) References Cited

U.S. PATENT DOCUMENTS

| 797,175 A | 8/1905 | Collenburg et al. ............ 47/72 |
| 1,206,708 A | 11/1916 | Hutchins ........................ 47/72 |

(List continued on next page.)

FOREIGN PATENT DOCUMENTS

| CH | 560532 | 4/1975 |
| DE | 345464 | 12/1921 |

(List continued on next page.)

OTHER PUBLICATIONS

"Target Halloween Sales With Highlander", Brochure, Highland Supply Corporation, 1992.

(List continued on next page.)

Primary Examiner—Charles T. Jordan
Assistant Examiner—Francis T. Palo
(74) Attorney, Agent, or Firm—Dunlap, Codding & Rogers, P.C.

(57) ABSTRACT

A decorative assembly for a floral grouping comprising a floral holding material and a sheet of material. The floral holding material is constructed of a material capable of receiving a portion of a floral grouping and supporting the floral grouping. The sheet of material is extended about a portion of the floral holding material and a crimped portion is formed in the sheet of material with the crimped portion cooperating to hold the sheet of material about the floral holding material to provide a decorative covering.

3 Claims, 25 Drawing Sheets

U.S. PATENT DOCUMENTS

| | | | |
|---|---|---|---|
| 1,446,563 A | 2/1923 | Hughes | 47/72 |
| 1,490,026 A | 4/1924 | Richards | 47/72 |
| 1,610,652 A | 12/1926 | Bouchard | 47/72 |
| 1,697,751 A | 1/1929 | Blake | 47/72 |
| 1,704,801 A | 3/1929 | Miller | 47/72 |
| 1,964,887 A | 7/1934 | Lovett, Jr. | 47/37 |
| 1,988,886 A | 1/1935 | Wilson | 47/37 |
| 1,994,962 A | 3/1935 | Rushfeldt | 47/37 |
| 2,023,782 A | 12/1935 | Driver | 47/72 |
| 2,062,410 A | 12/1936 | Garcia | 47/72 |
| 2,152,648 A | 4/1939 | Jones | 47/34 |
| 2,209,778 A | 7/1940 | Krasowski | 41/10 |
| 2,274,526 A | 2/1942 | Bunn | 100/31 |
| 2,302,259 A | 11/1942 | Rothfuss | 41/10 |
| 2,514,038 A | 7/1950 | Doolittle | 226/129 |
| 2,540,707 A | 2/1951 | Beukelman | 47/72 |
| 2,774,187 A | 12/1956 | Smithers | 47/41 |
| 2,850,842 A | 9/1958 | Eubank, Jr. | 47/58 |
| 2,989,828 A | 6/1961 | Warp | 53/390 |
| 3,022,605 A | 2/1962 | Reynolds | 47/58 |
| 3,073,062 A | 1/1963 | Hoffman | 47/41 |
| 3,271,922 A | 9/1966 | Wallerstein et al. | 53/3 |
| 3,316,675 A | 5/1967 | Cartwright, Jr. | 47/37 |
| 3,376,666 A | 4/1968 | Leonard | 47/41 |
| 3,431,706 A | 3/1969 | Stuck | 53/390 |
| 3,531,910 A | 10/1970 | Snead | 53/135 |
| 3,554,434 A | 1/1971 | Anderson | 229/55 |
| 3,556,389 A | 1/1971 | Gregoire | 229/53 |
| 3,748,781 A | 7/1973 | Erling | 47/34.11 |
| 3,869,828 A | 3/1975 | Matsumoto | 47/34.11 |
| 4,006,561 A | 2/1977 | Thoma et al. | 47/58 |
| 4,091,925 A | 5/1978 | Griffo et al. | 206/423 |
| 4,118,890 A | 10/1978 | Shore | 47/28 |
| 4,189,868 A | 2/1980 | Tymchuck et al. | 47/84 |
| 4,216,620 A | 8/1980 | Weder et al. | 47/72 |
| 4,280,314 A | 7/1981 | Stuck | 53/241 |
| 4,300,312 A | 11/1981 | Weder et al. | 47/72 |
| 4,333,267 A | 6/1982 | Witte | 47/84 |
| 4,400,910 A | 8/1983 | Koudstaal et al. | 47/84 |
| 4,413,725 A | 11/1983 | Bruno et al. | 206/45.33 |
| 4,621,733 A | 11/1986 | Harris | 206/423 |
| 4,646,470 A | 3/1987 | Maggio | 47/76 |
| 4,733,521 A | 3/1988 | Weder et al. | 53/580 |
| 4,773,182 A | 9/1988 | Weder et al. | 47/72 |
| 4,801,014 A | 1/1989 | Meadows | 206/423 |
| 4,835,834 A | 6/1989 | Weder | 29/525 |
| 4,901,423 A | 2/1990 | Weder | 29/432 |
| 4,910,913 A | 3/1990 | Streeter | 47/72 |
| 4,941,572 A | 7/1990 | Harris | 206/423 |
| 5,077,937 A | 1/1992 | Weder et al. | 47/72 |
| 5,085,003 A | 2/1992 | Garcia | 47/72 |
| 5,106,662 A | 4/1992 | Khayat | 47/41.01 |
| 5,111,638 A | 5/1992 | Weder | 53/397 |
| 5,120,382 A | 6/1992 | WEder | 156/212 |
| 5,181,364 A | 1/1993 | Weder | 53/397 |
| 5,228,234 A | 7/1993 | de Klerk et al. | 47/47.01 |
| 5,231,794 A | 8/1993 | Weder et al. | 47/72 |
| 5,235,782 A | 8/1993 | Landau | 47/72 |
| 5,239,775 A | 8/1993 | Landau | 47/72 |
| 5,339,601 A | 8/1994 | Weder et al. | 53/399 |
| 5,410,856 A | 5/1995 | Weder et al. | 53/397 |
| 5,522,202 A | 6/1996 | Weder et al. | 47/72 |
| 5,595,298 A | 1/1997 | Straeter | 47/72 |
| 5,937,576 A | 8/1999 | Weder et al. | 47/72 |
| 6,018,908 A | 2/2000 | Charrin et al. | 47/41.01 |

FOREIGN PATENT DOCUMENTS

| | | |
|---|---|---|
| DE | 513971 | 12/1930 |
| DE | 1166692 | 6/1964 |
| DE | 2948265 | 5/1981 |
| DE | 8905250 | 10/1989 |
| EP | 0163453 | 12/1985 |
| FR | 1084888 | 1/1955 |
| FR | 1393725 | 2/1965 |
| FR | 2036163 | 12/1970 |
| FR | 2272914 | 12/1975 |
| FR | 2619698 | 3/1989 |
| FR | 2651663 | 3/1991 |
| FR | 2734464 | 5/1995 |
| GB | 15550 | 7/1899 |
| GB | 28322 | 12/1907 |
| GB | 1204647 | 9/1970 |
| WO | 9637133 | 11/1996 |

OTHER PUBLICATIONS

"Speed Sheets and Speed Rolls", Brochure, Highland Supply Corporation, 1991, 2 pages.

"The Simple Solution For Those Peak Volume Periods", Brochure, Highland Supply Corporation, 1989, 6 pages.

"Cellocoup—It's A Wrap", The John Henry Company, 1992, 4 pages.

"A World Of Cut Flower And Pot Plant Packaging", Brochure, Klerk's Plastic Products Manufacturing, Inc., date unknown, 6 pages. Applicant admits that the products described in this brochure have been on sale at least more than one year prior to the filing of the present patent application.

"Color Them Happy with Highlander Products", ©1992, 2 pages.

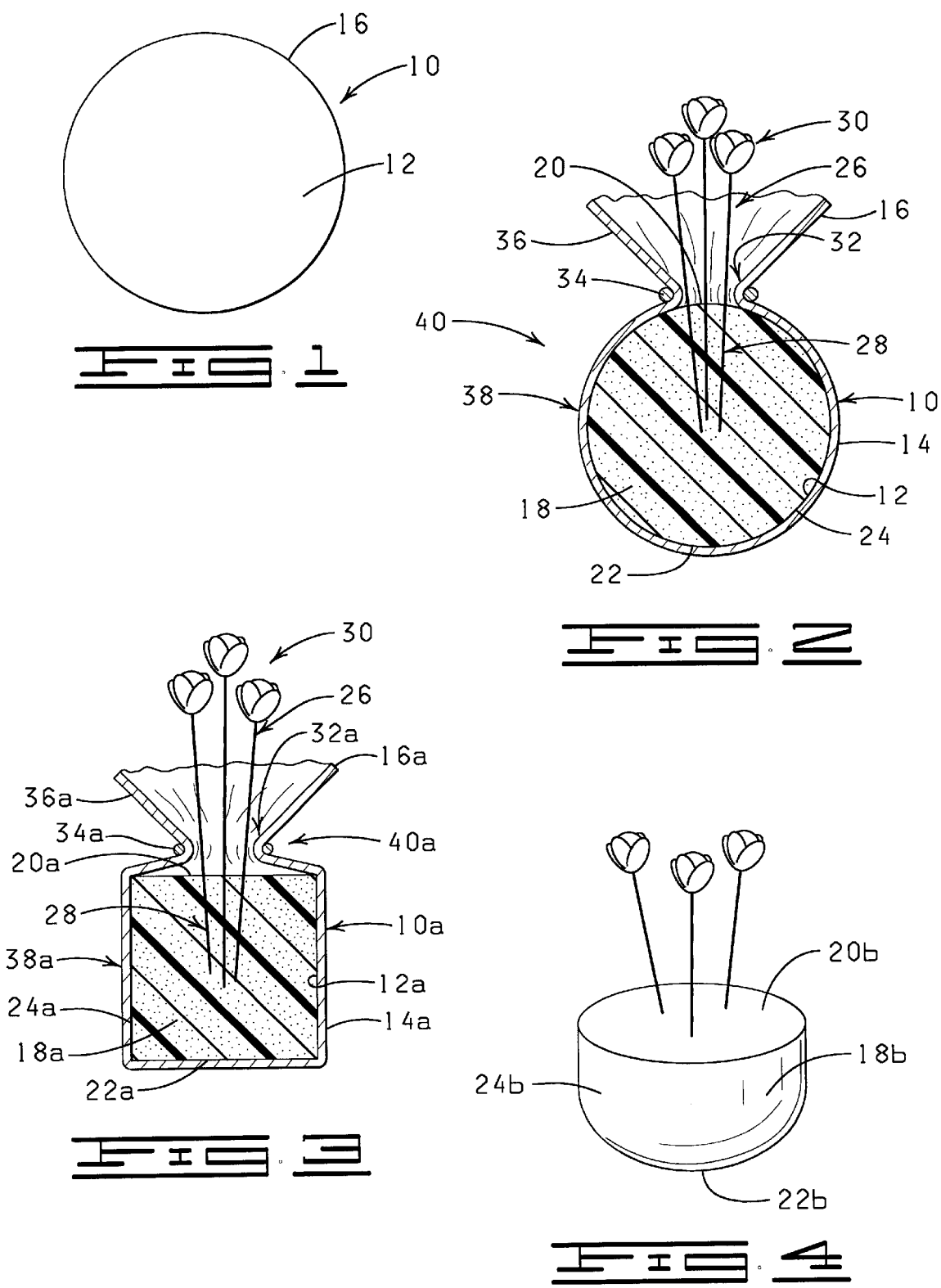

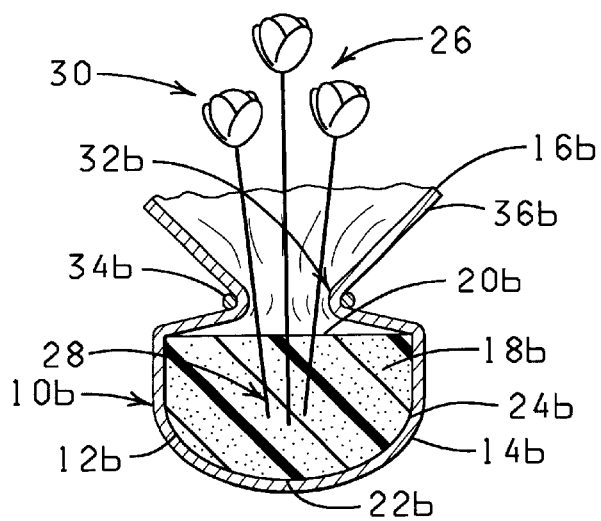
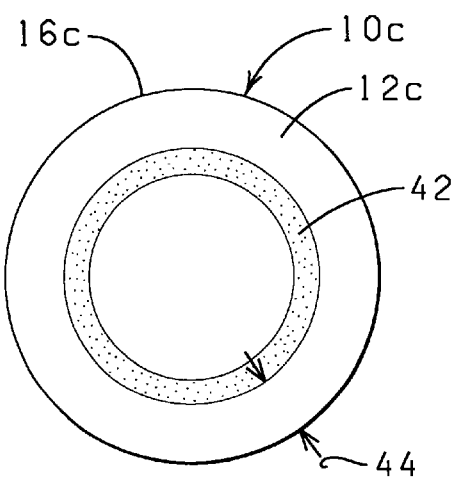
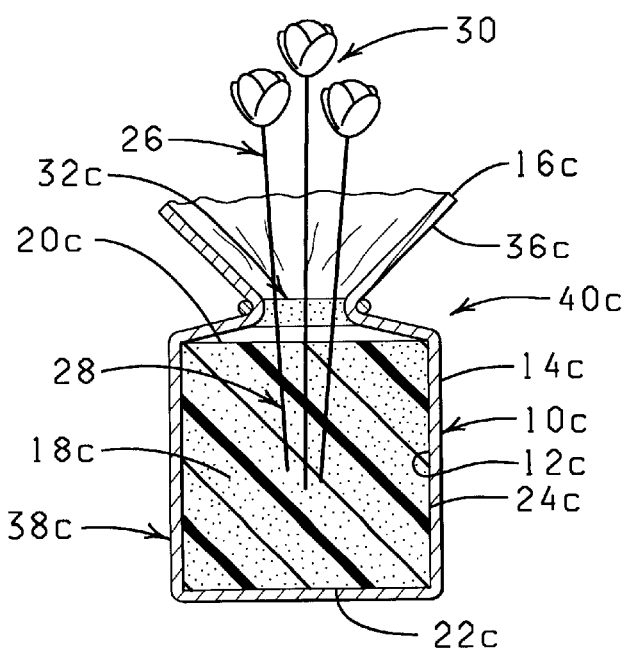

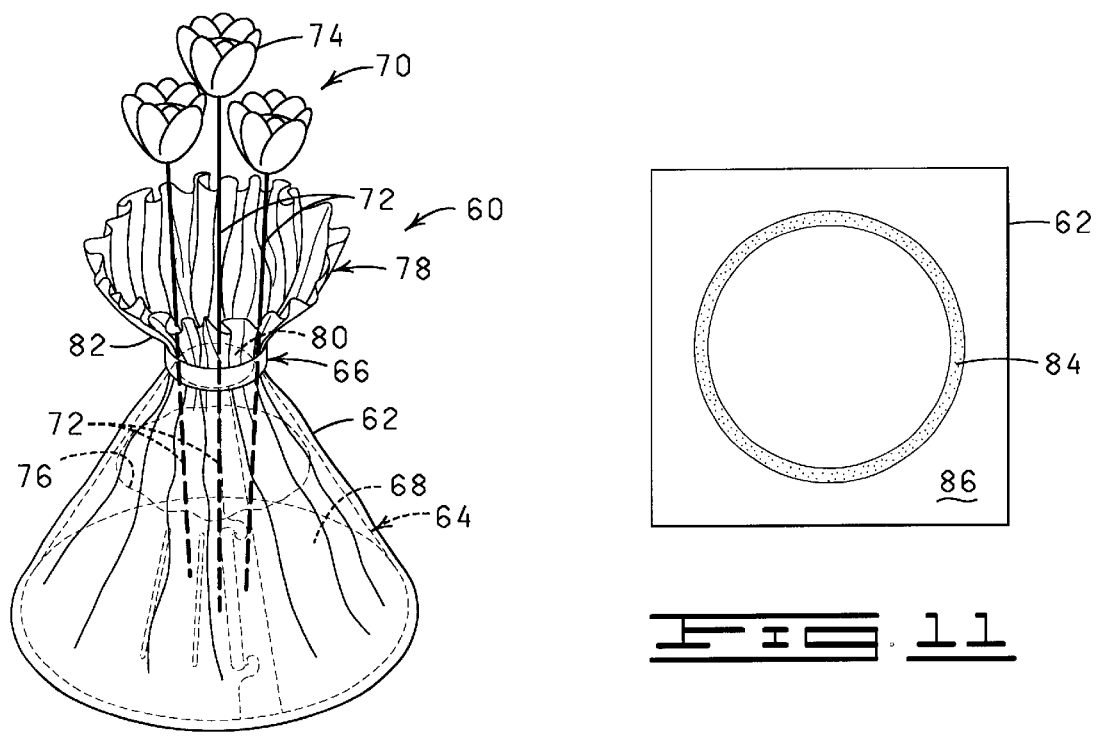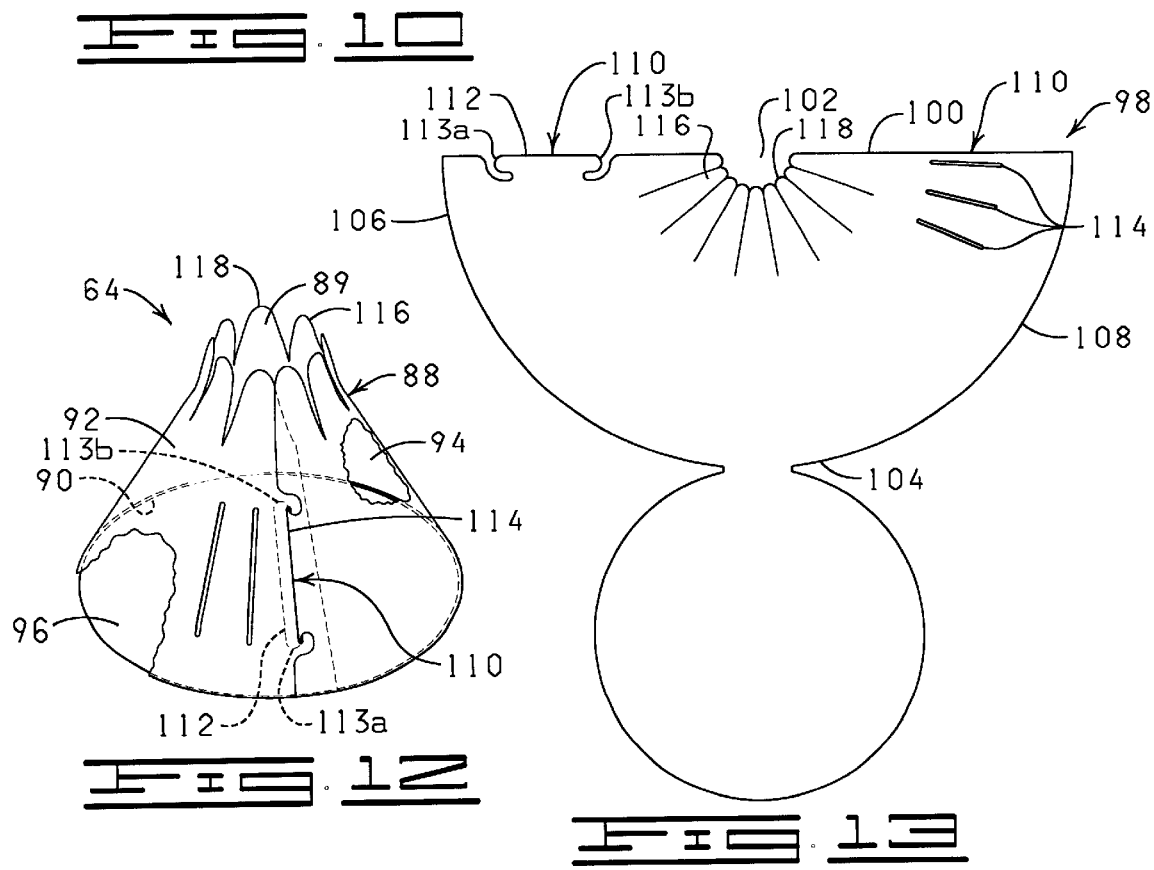

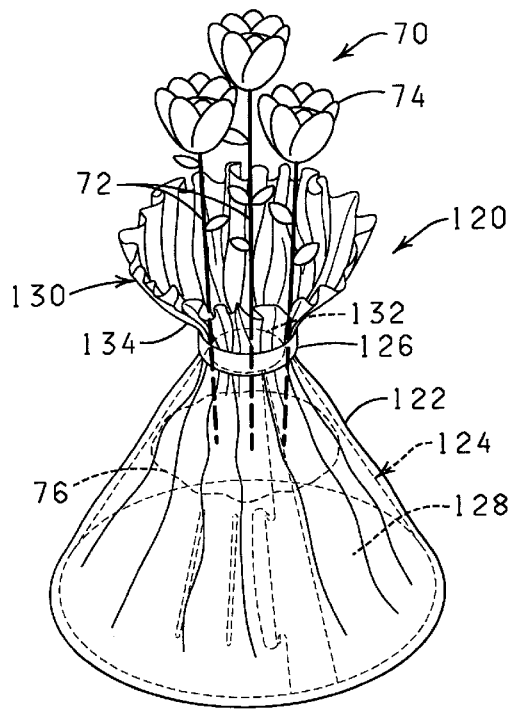
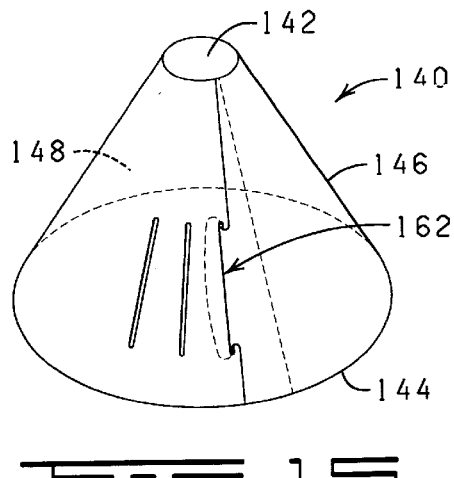
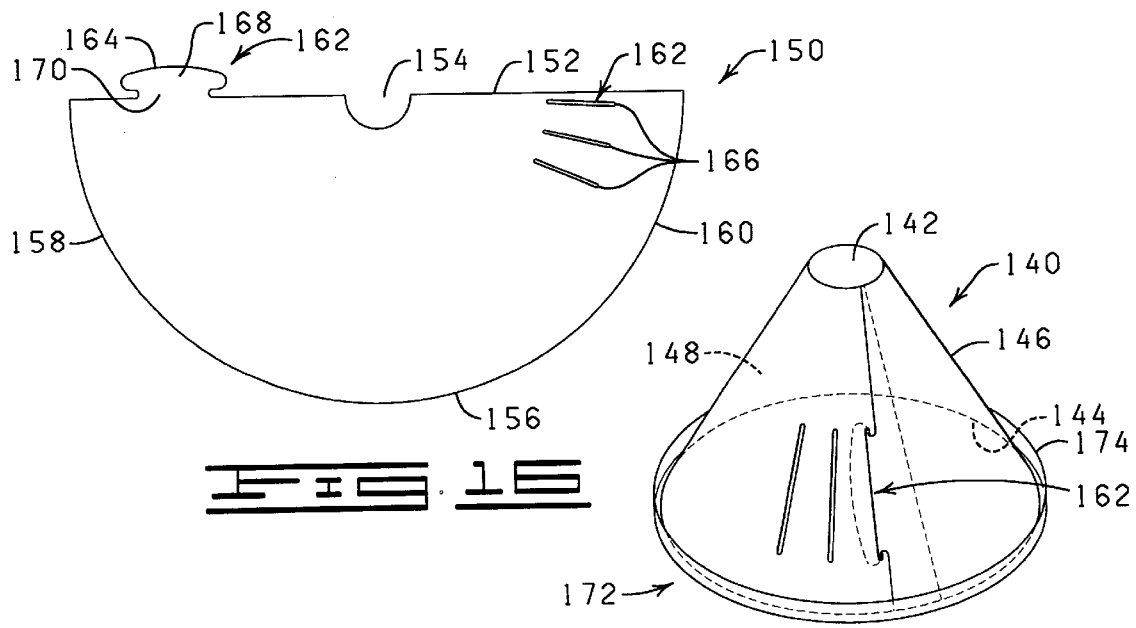

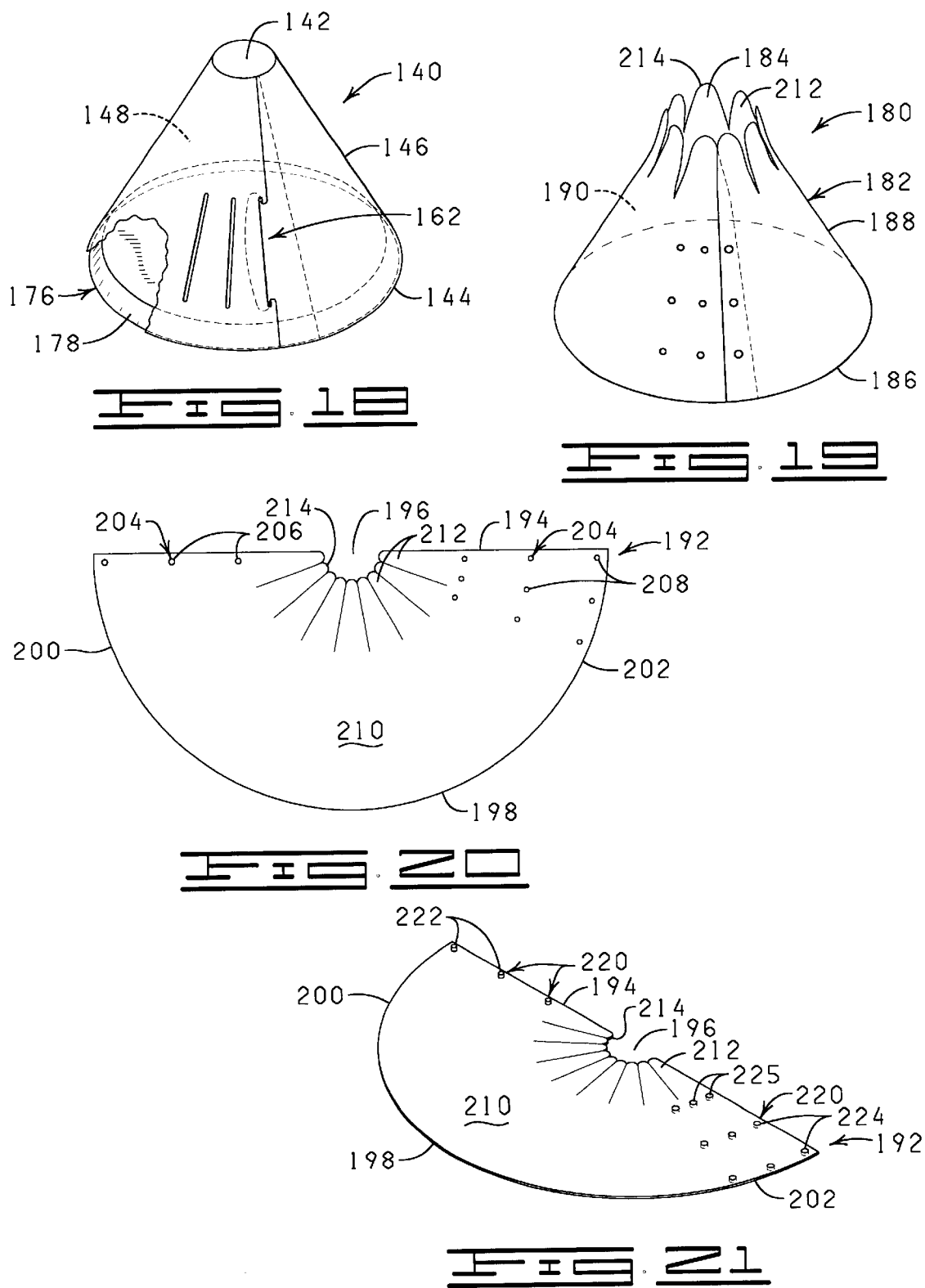

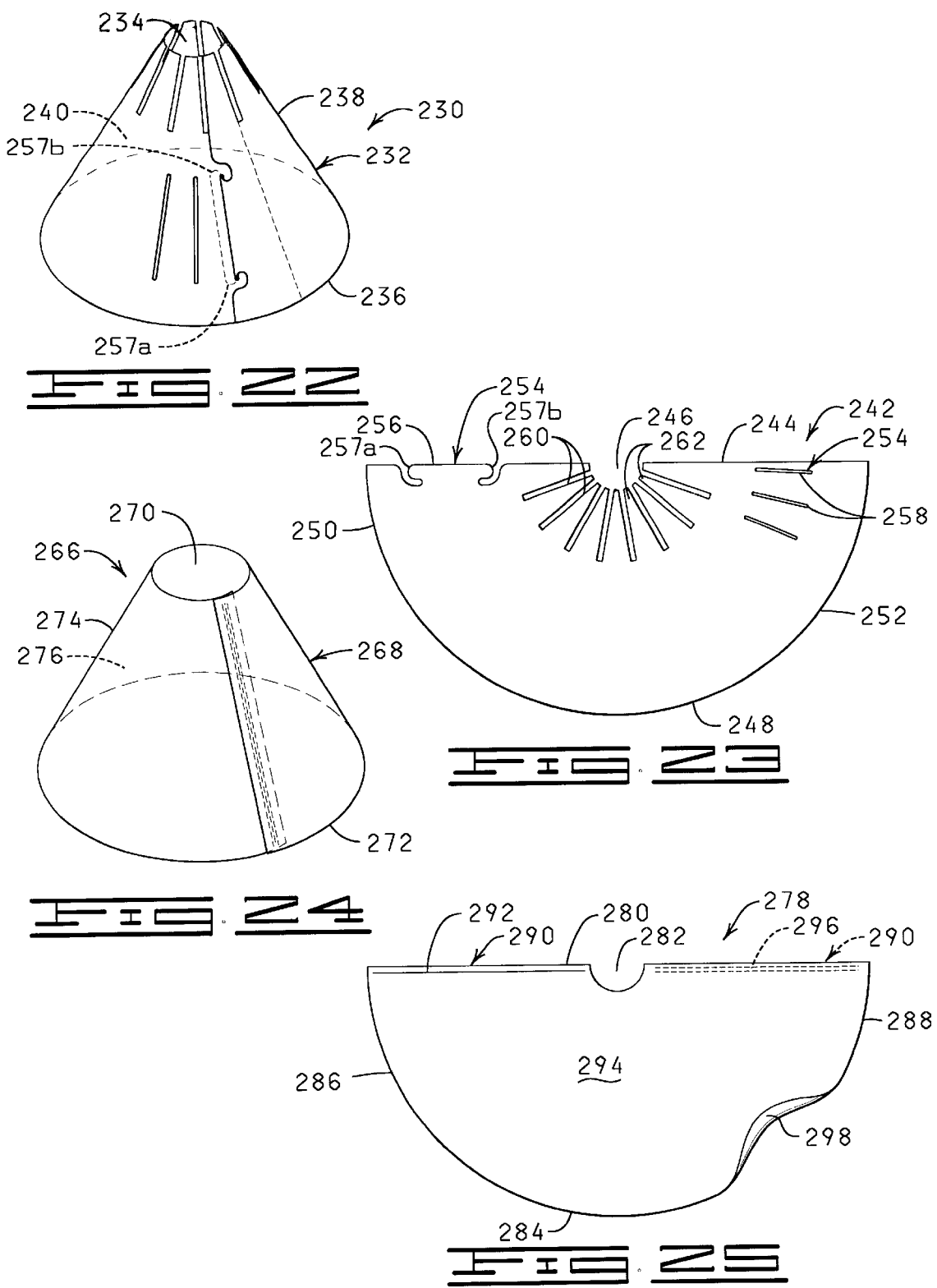

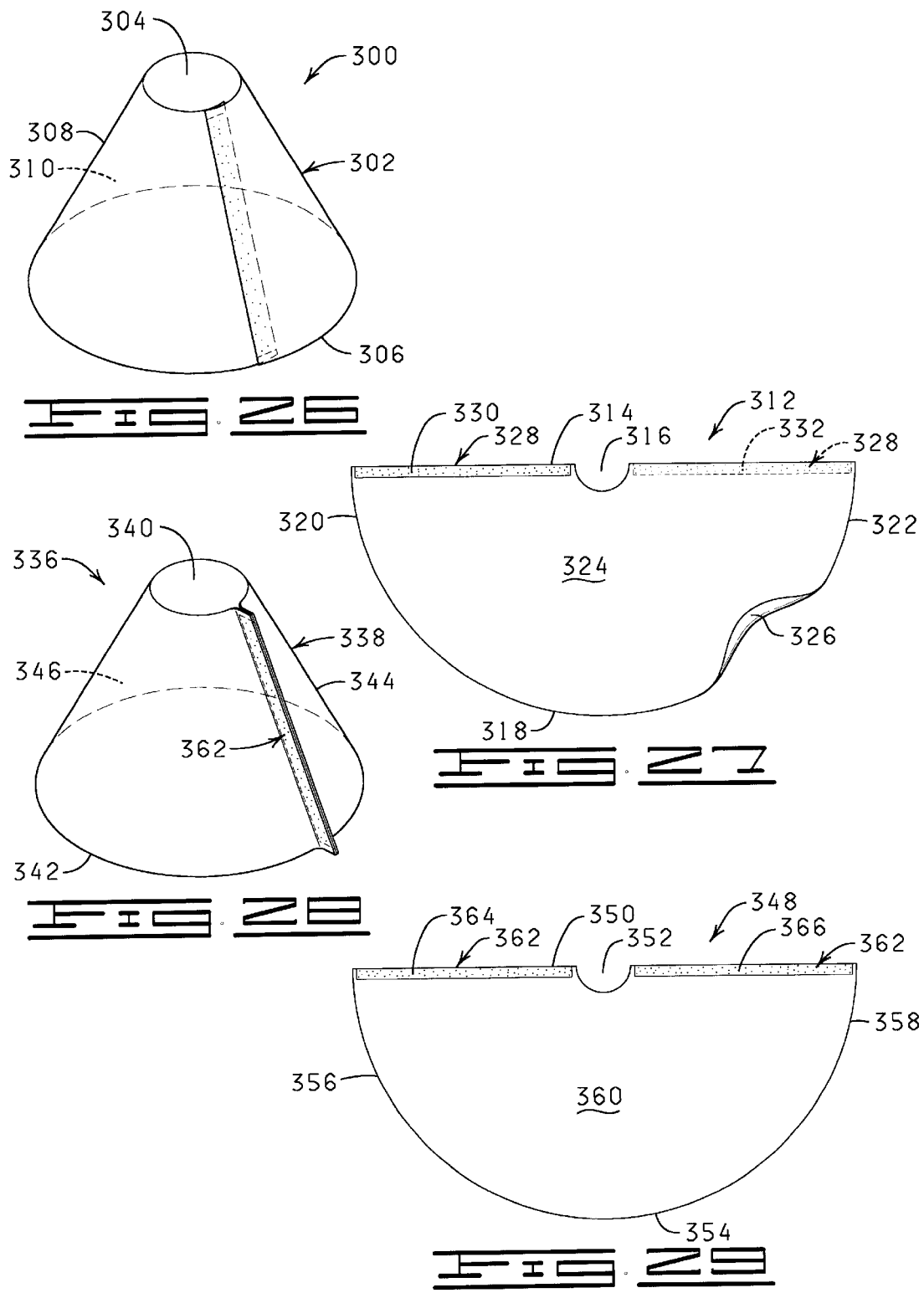

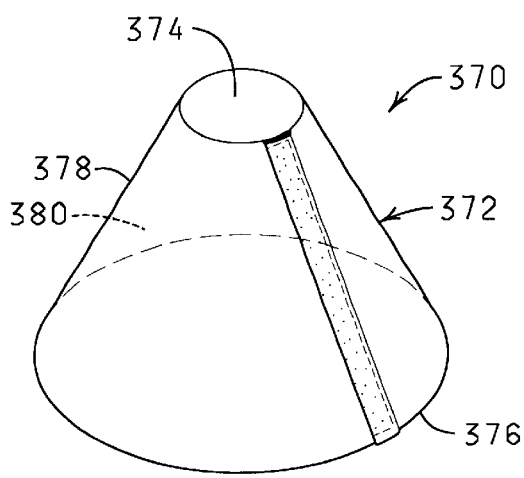
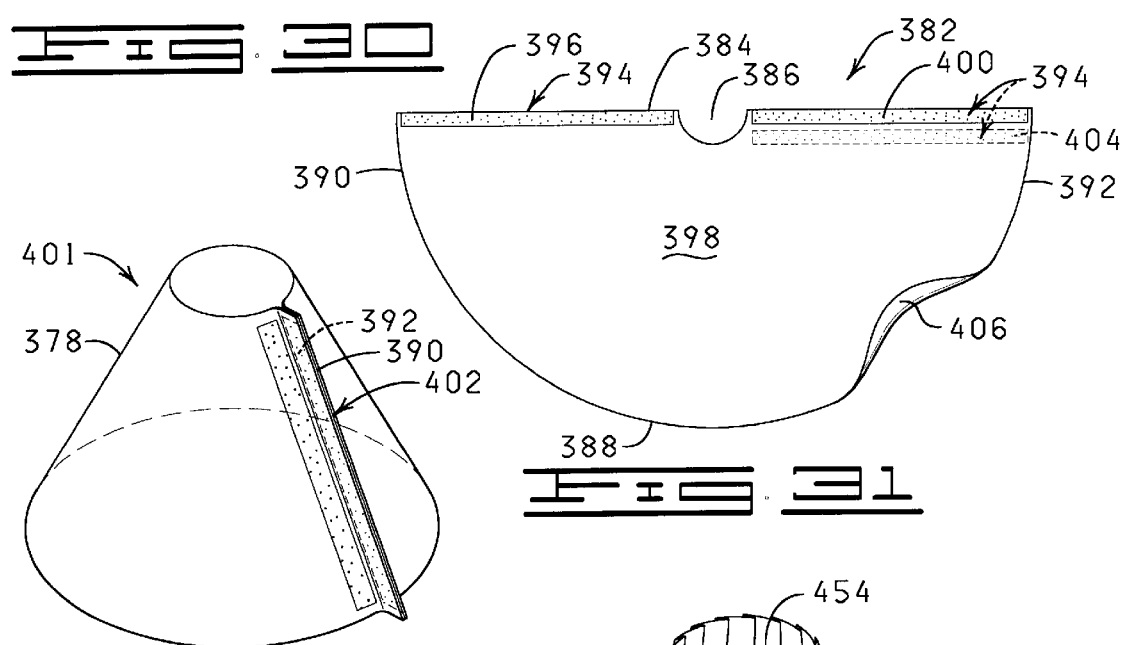
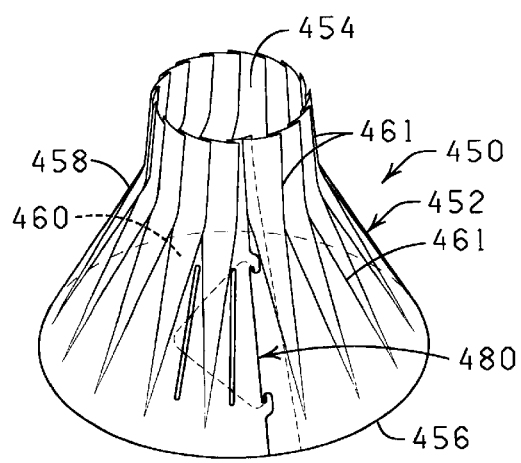

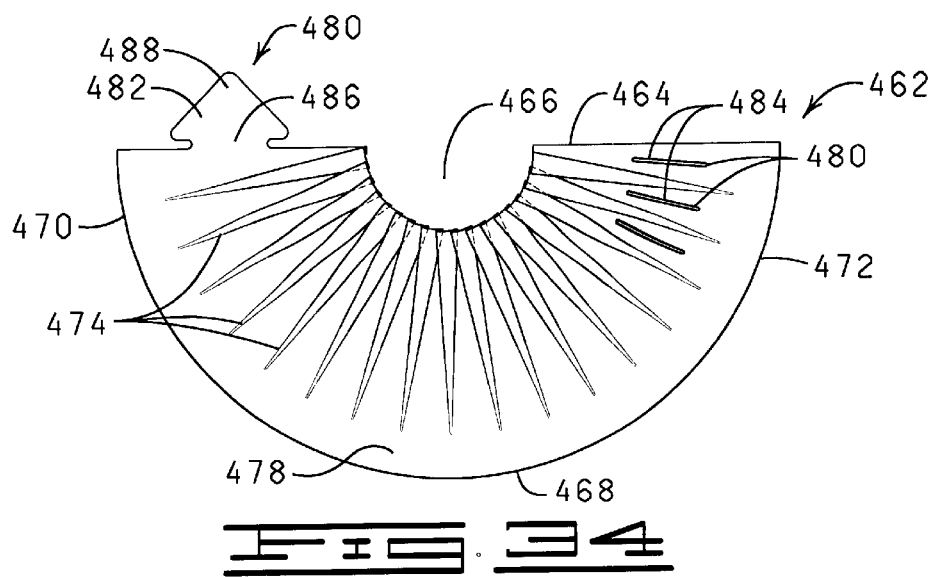

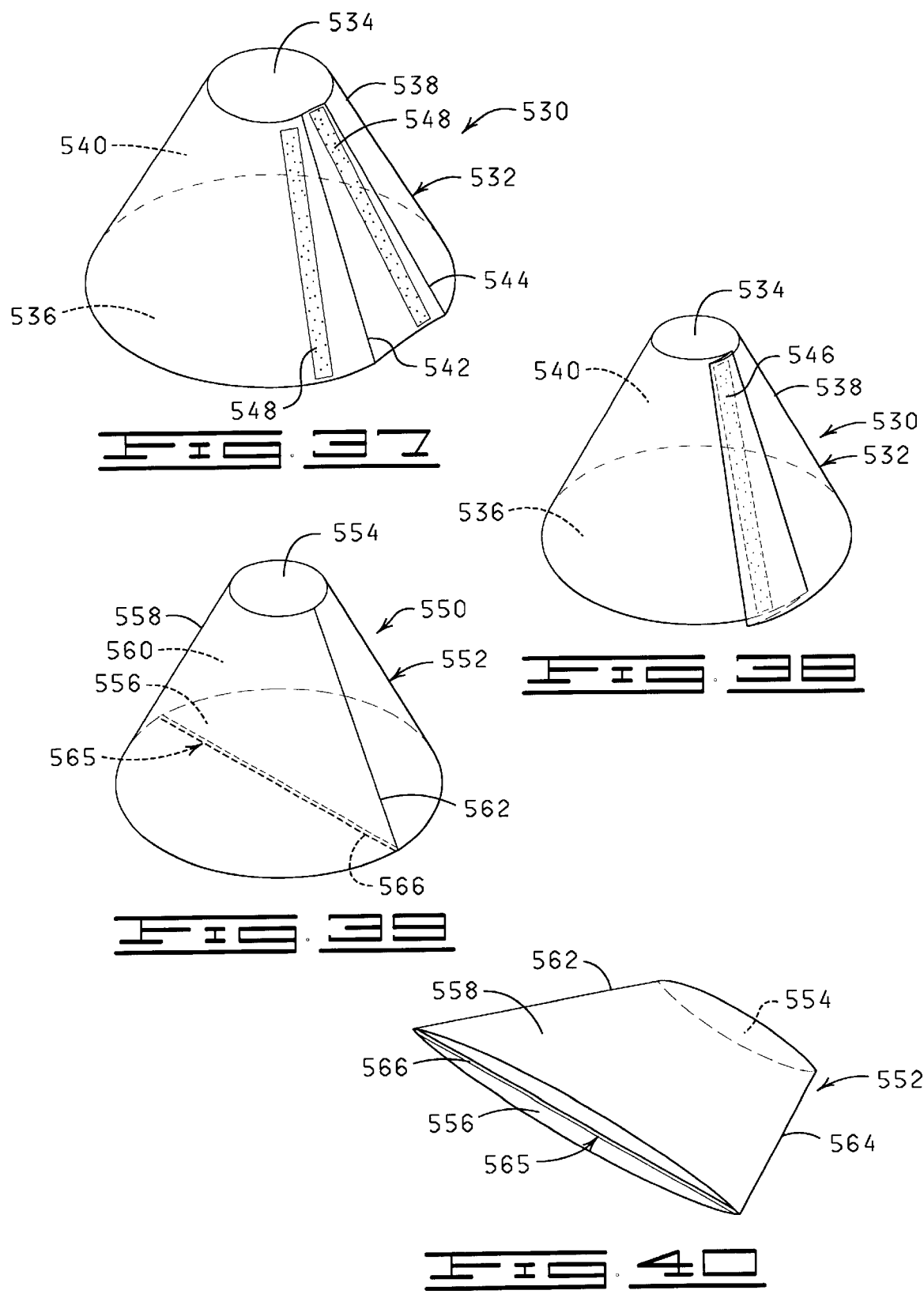

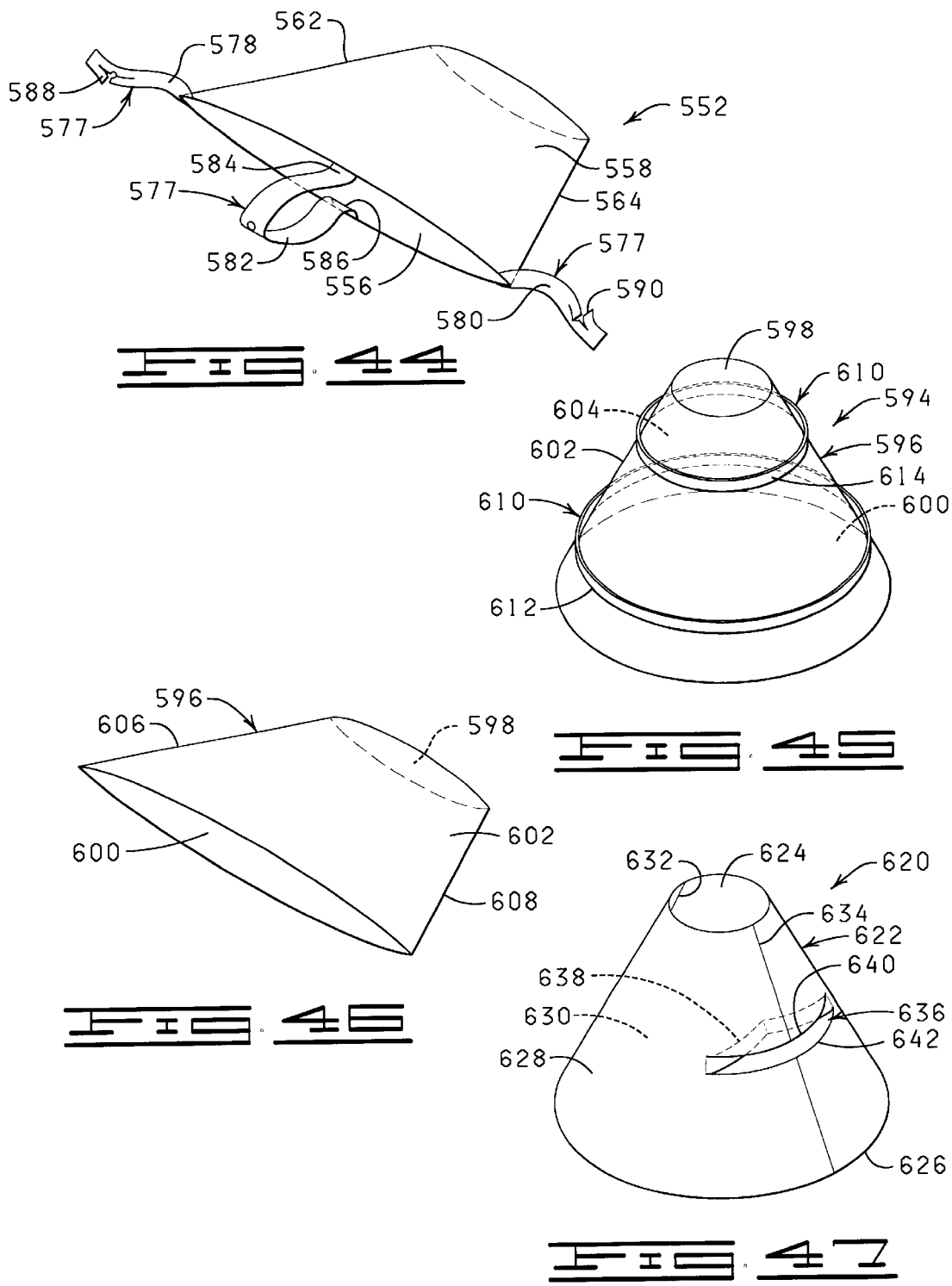

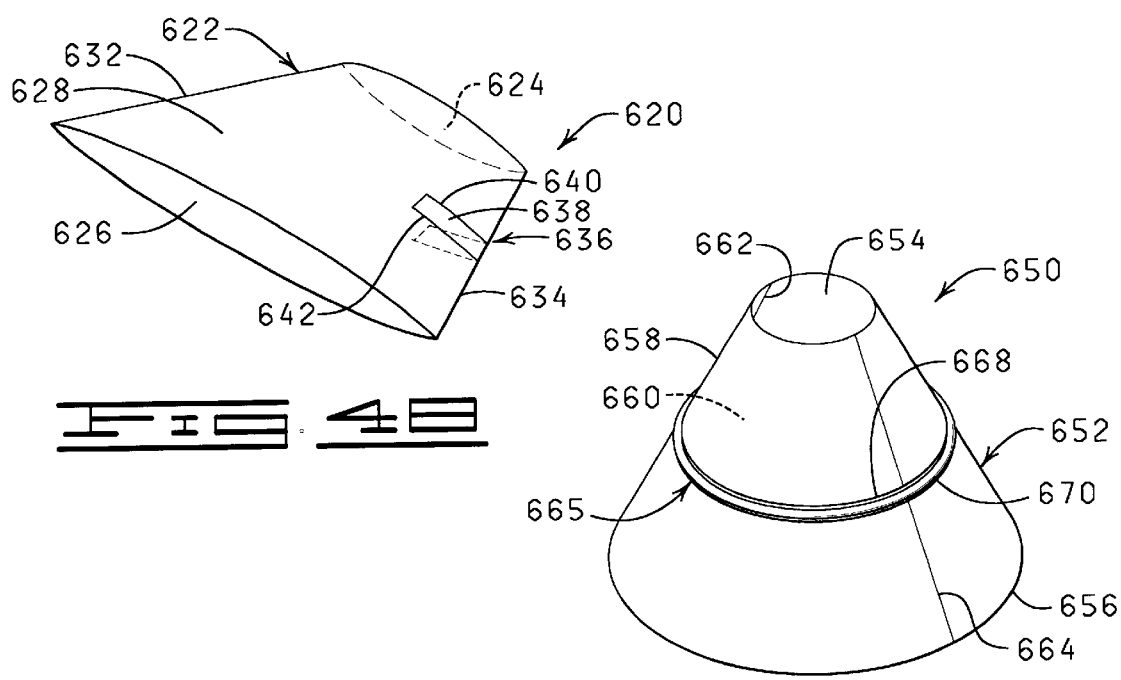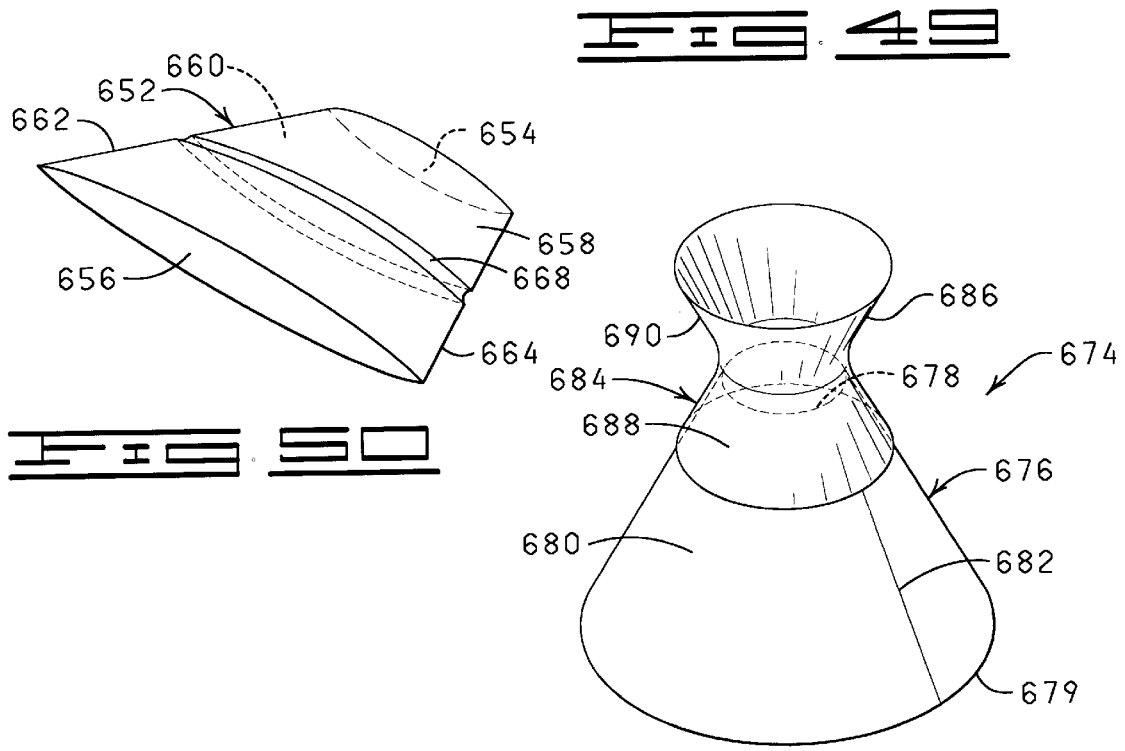

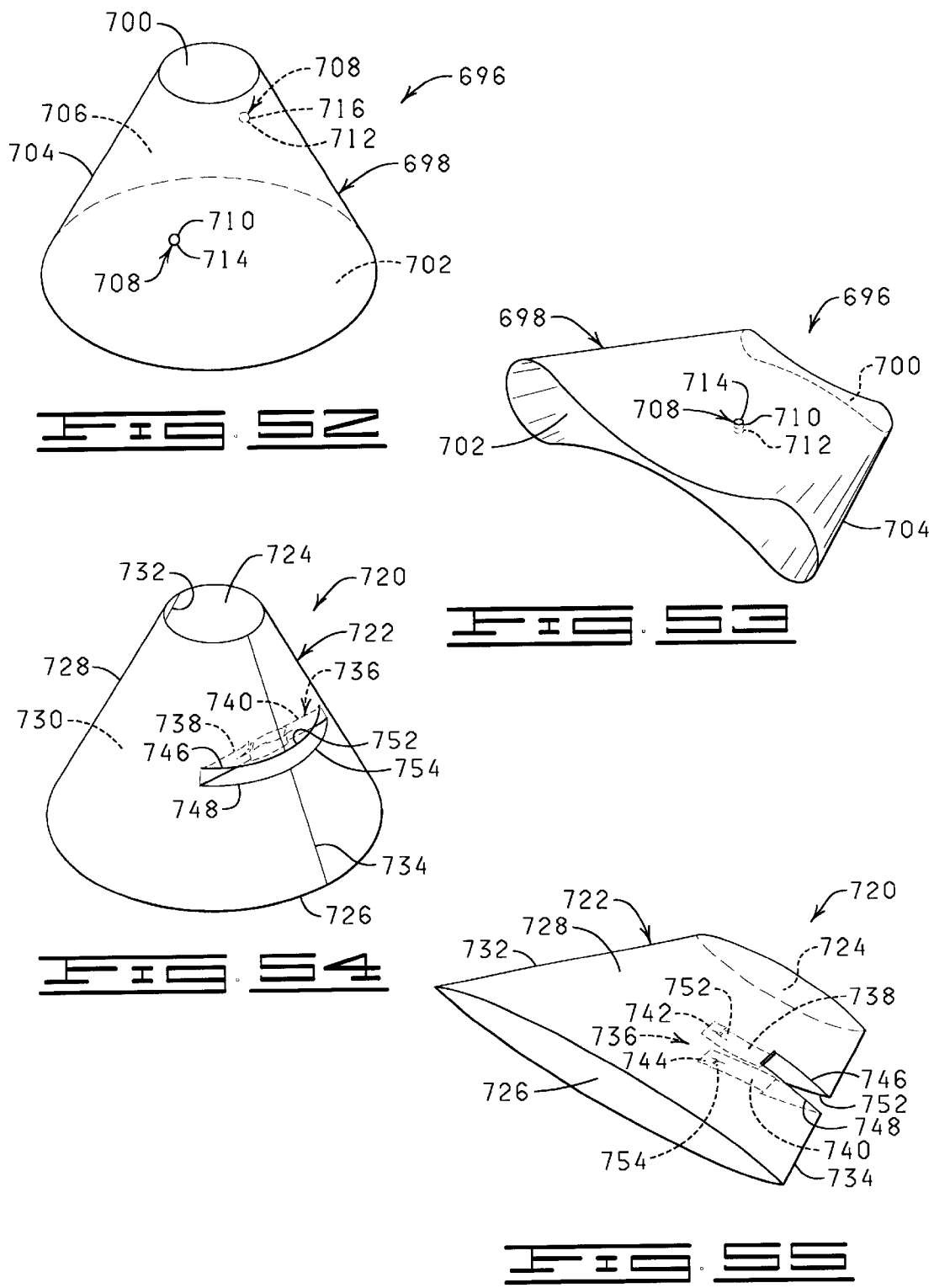

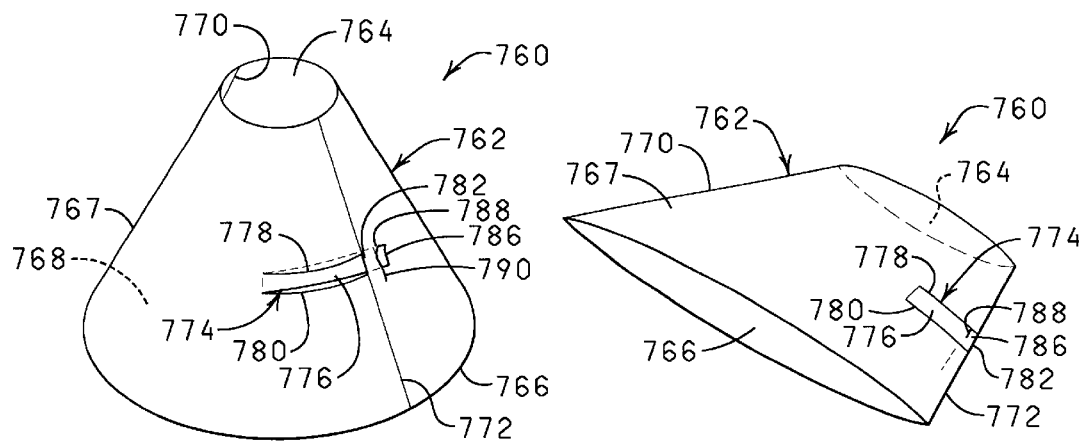
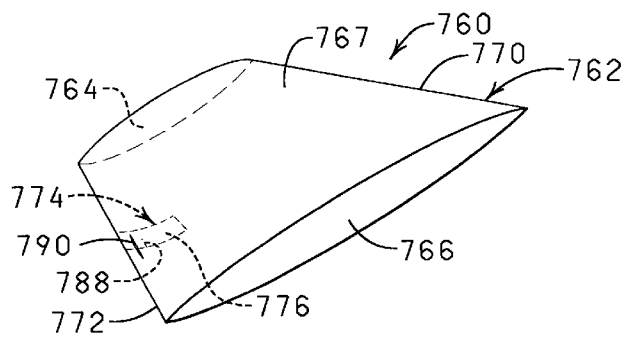
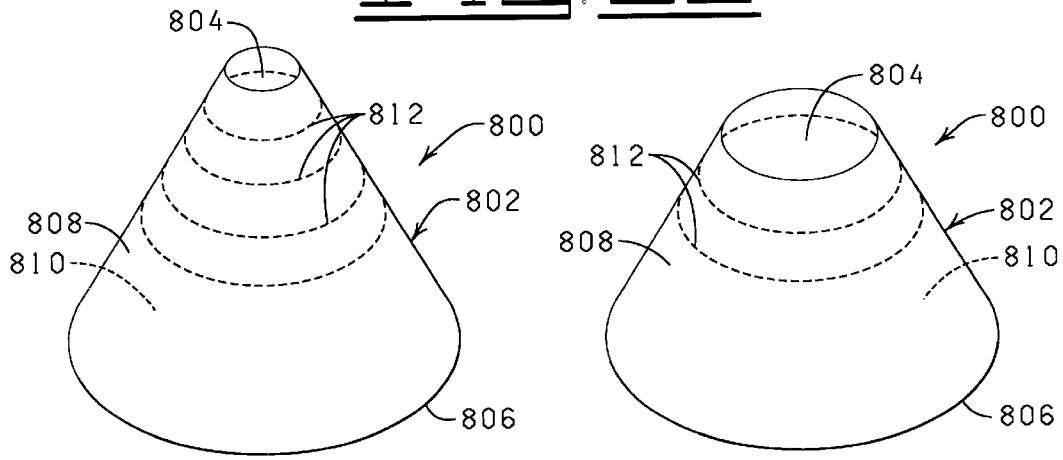

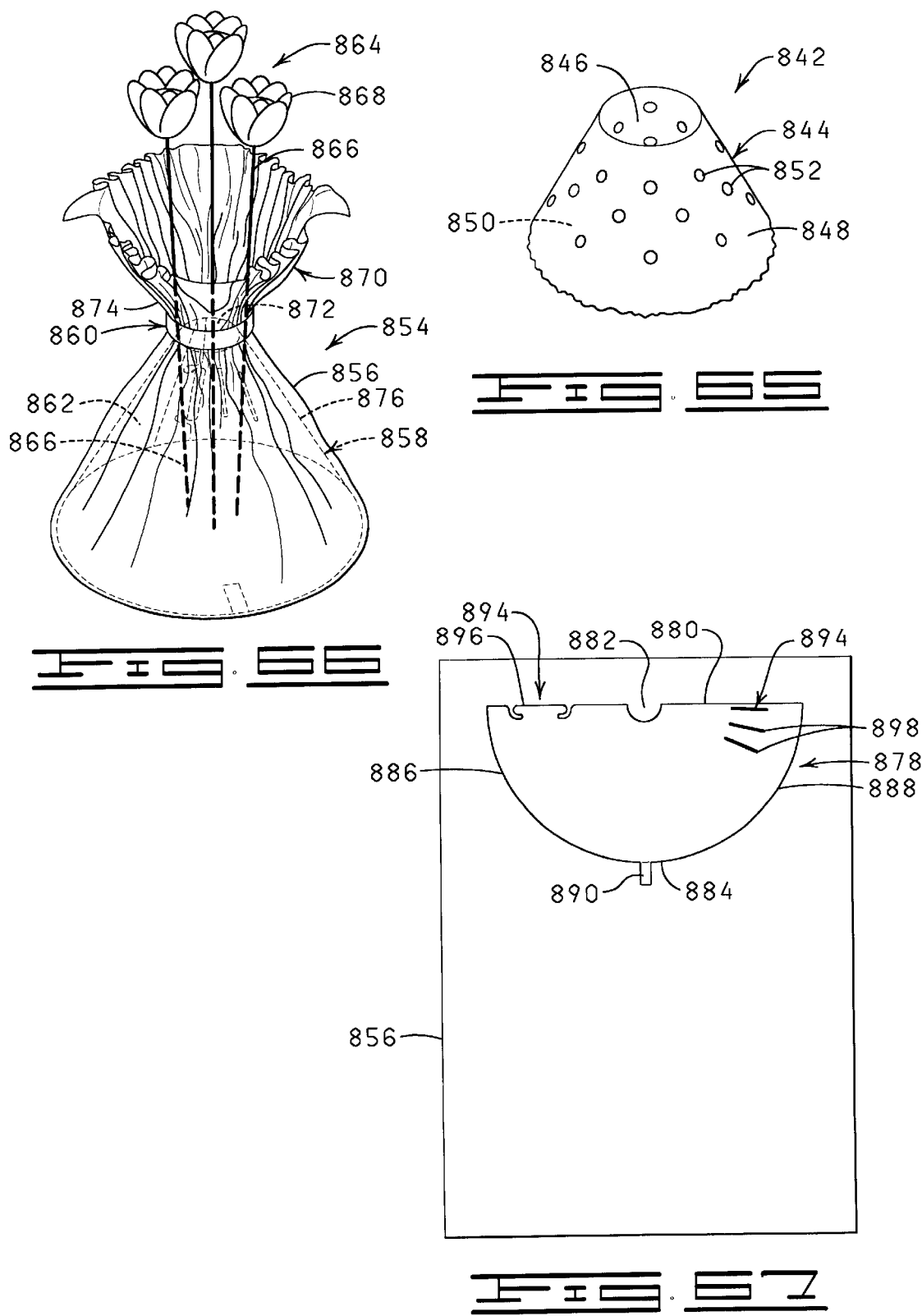

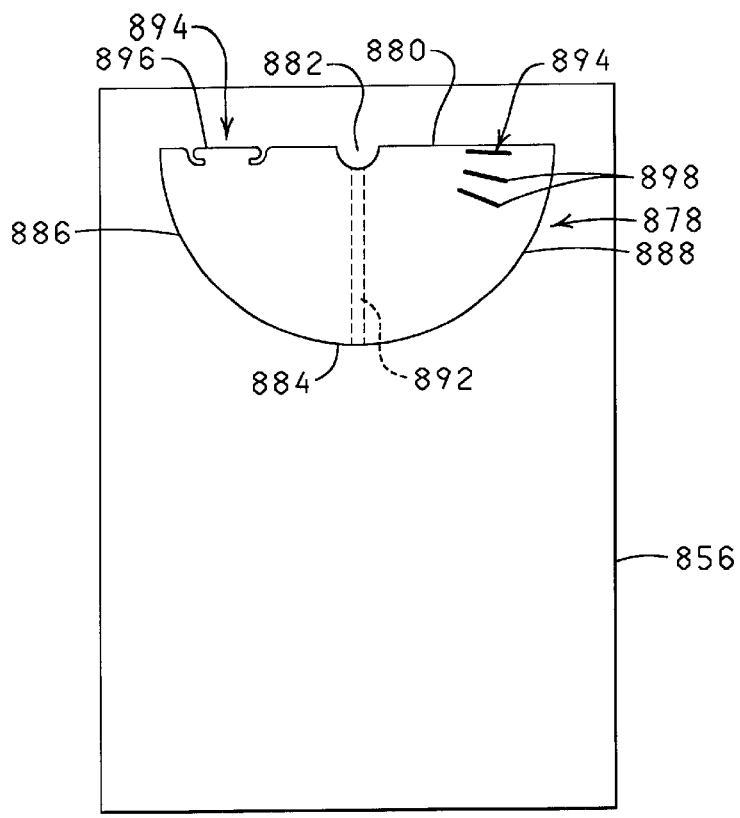
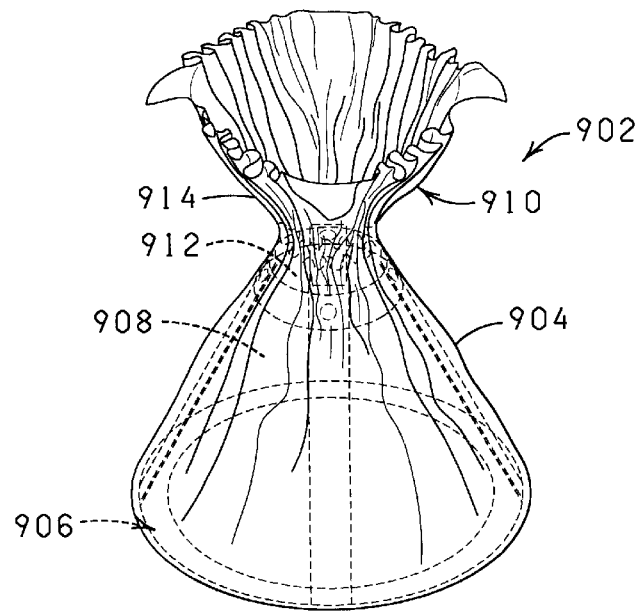

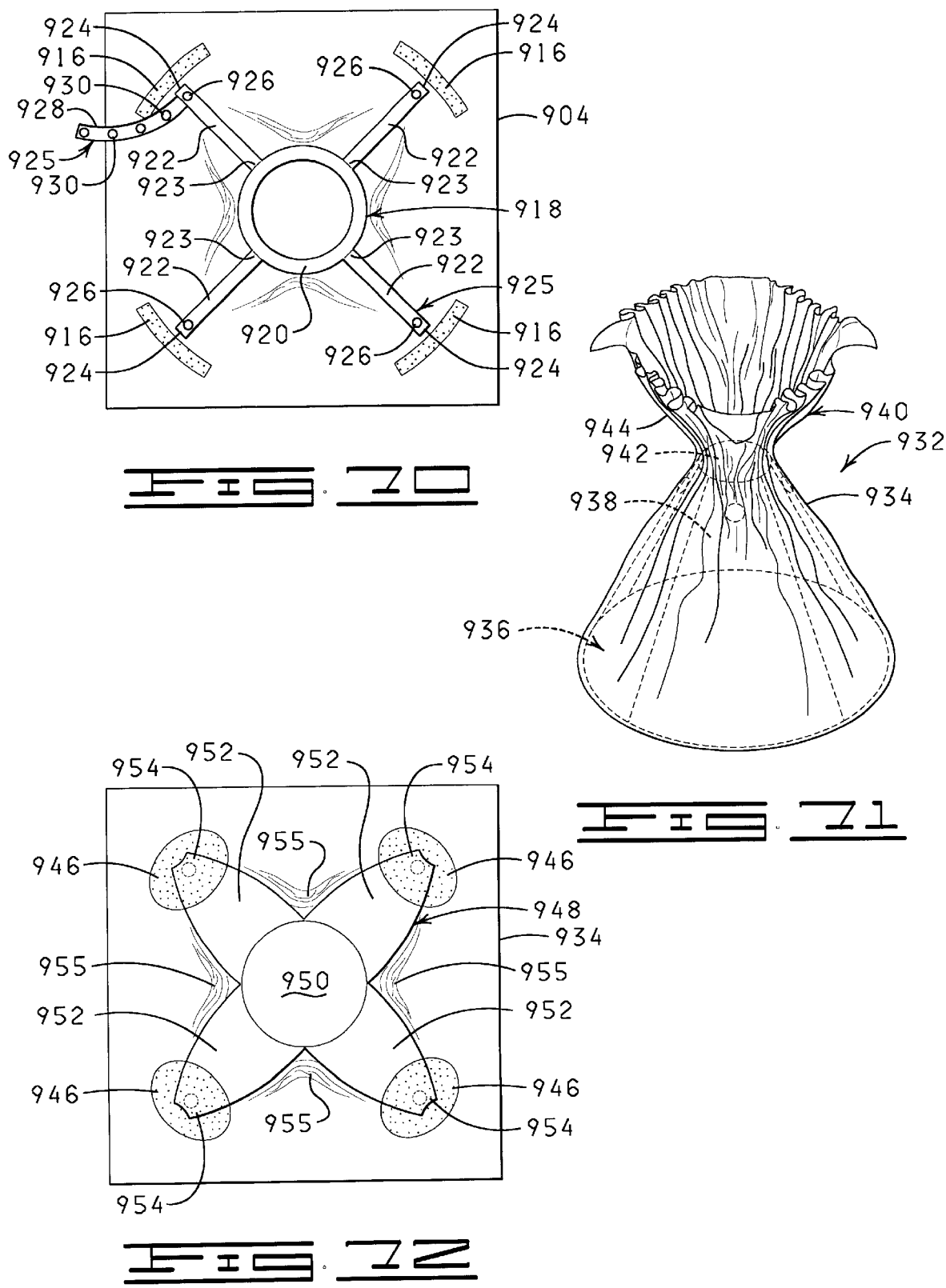

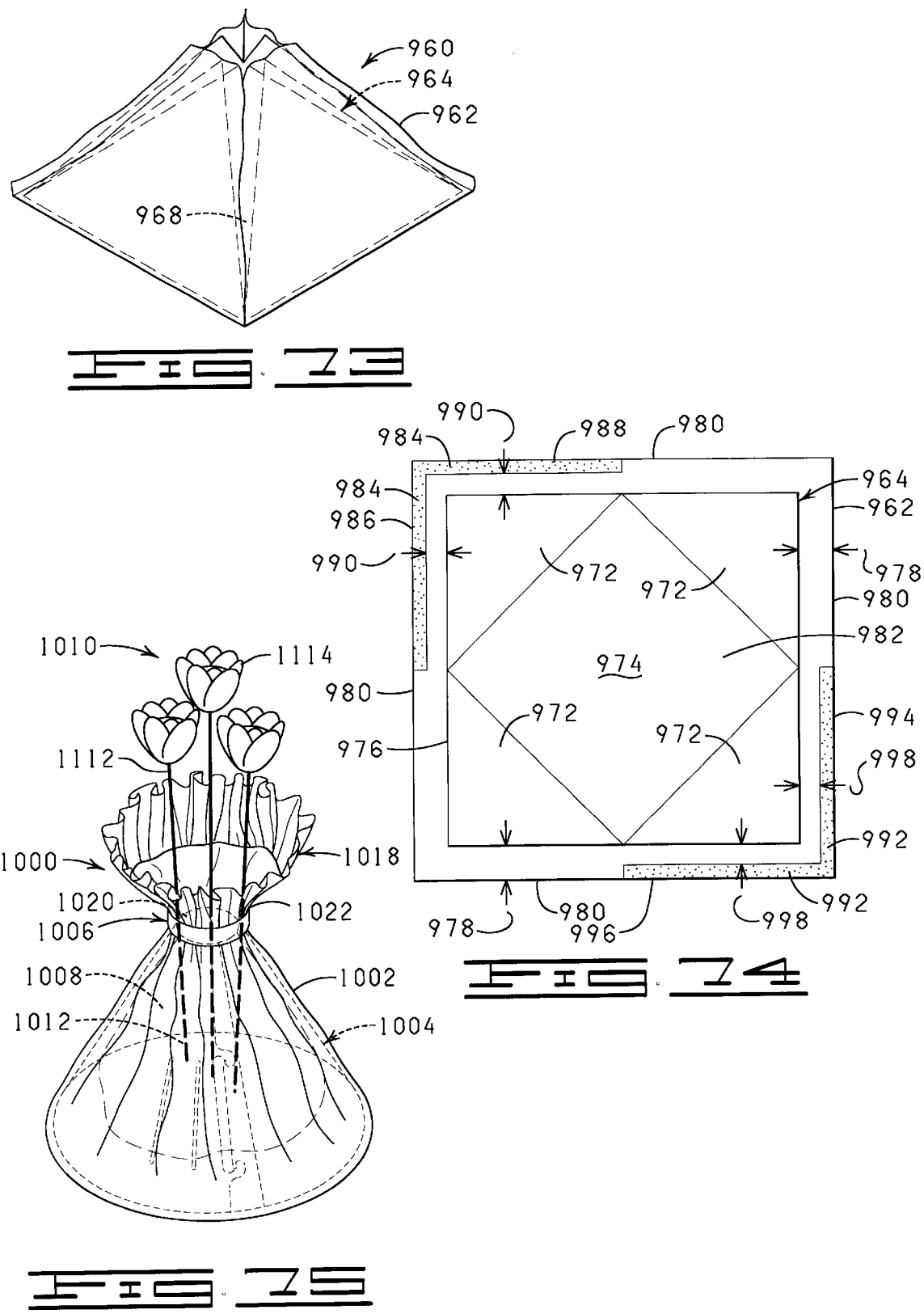

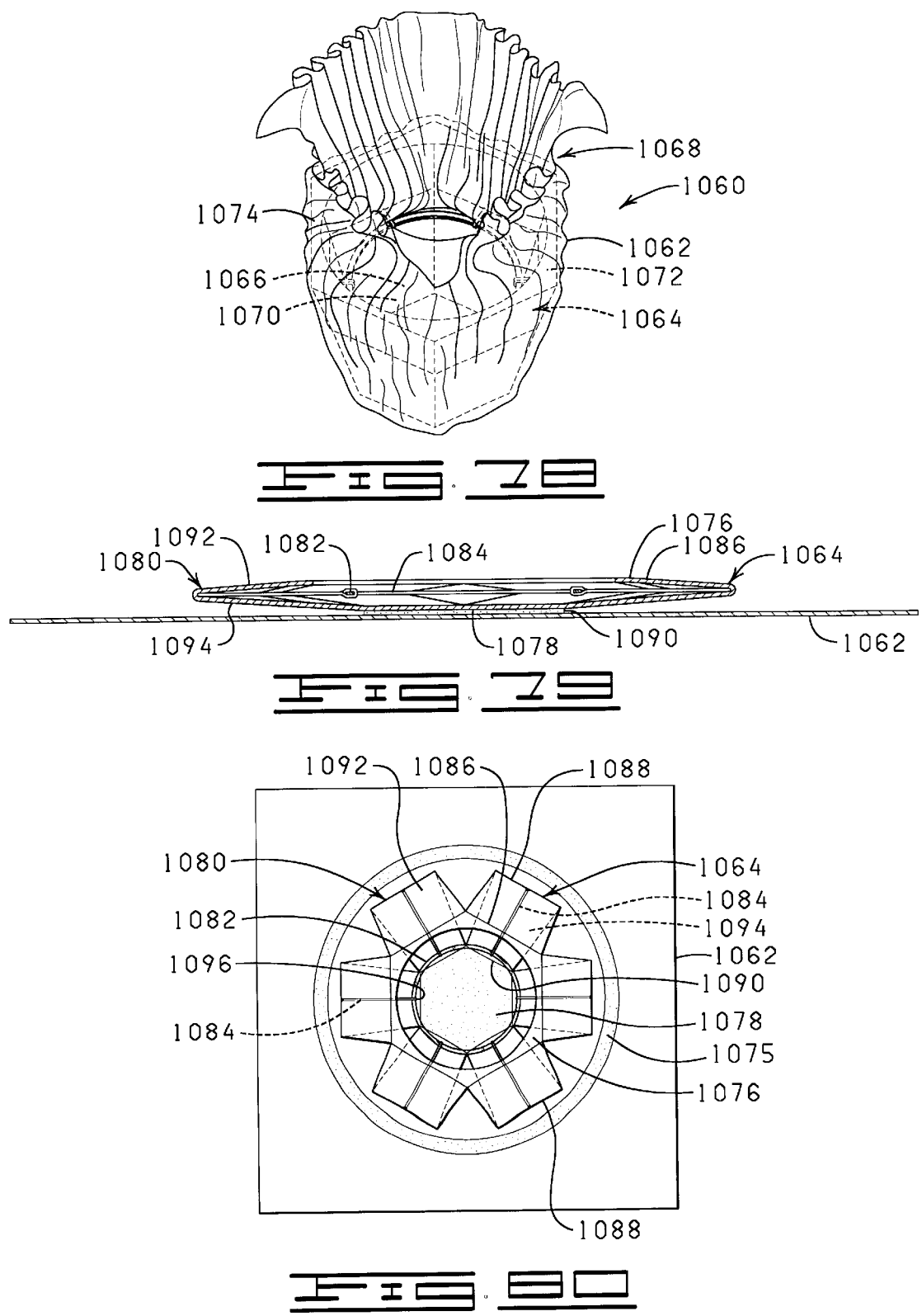

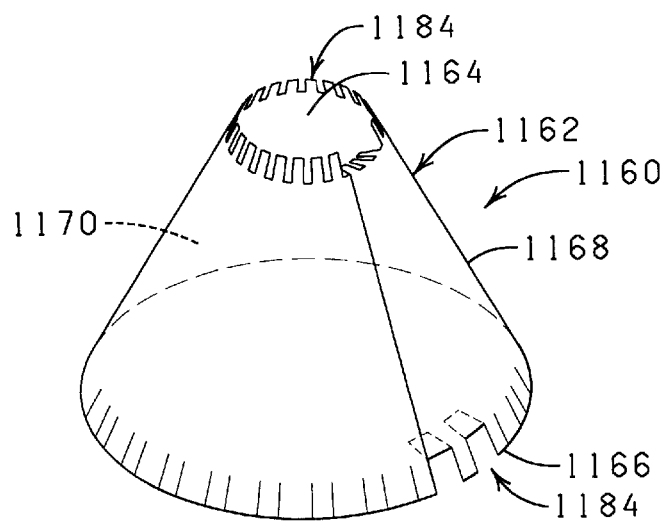
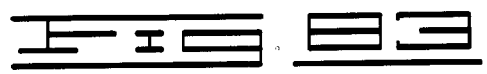
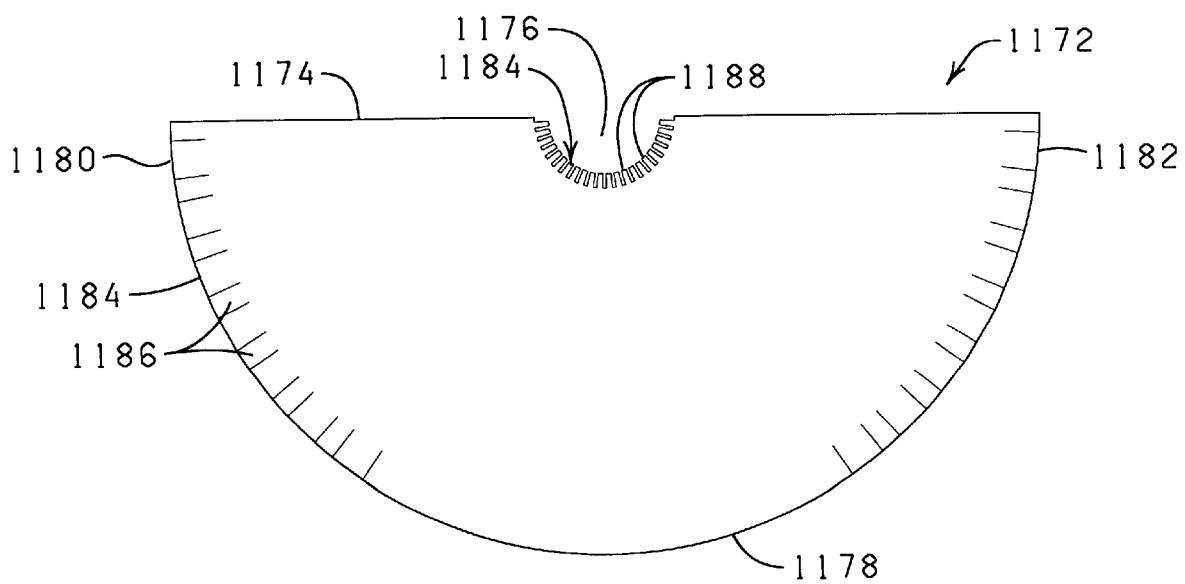
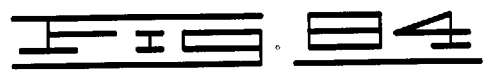

DECORATIVE ASSEMBLY FOR A FLORAL GROUPING

CROSS REFERENCE TO RELATED APPLICATIONS

This application is a continuation of U.S. Ser. No. 10/011,226, filed Nov. 15, 2001, now abandoned which is a continuation of U.S. Ser. No. 09/912,217, filed Jul. 24, 2001, now U.S. Pat. No. 6,427,380 which is a continuation of U.S. Ser. No. 09/670,644, filed Sep. 27, 2000, now abandoned which is a continuation of U.S. Ser. No. 09/576,789, filed May 23, 2000, now abandoned which is a continuation of U.S. Ser. No. 09/333,333, filed Jun. 15, 1999, now U.S. Pat. No. 6,082,045, which is a divisional of U.S. Ser. No. 08/827,852, filed Apr. 11, 1997, now U.S. Pat. No. 5,937,576.

STATEMENT REGARDING FEDERALLY SPONSORED RESEARCH OR DEVELOPMENT

Not Applicable.

FIELD OF THE INVENTION

The present invention relates generally to decorative assemblies for floral groupings and, more particularly, but not by way of limitation, to a decorative assembly for a floral grouping comprising a sheet of material disposed about a floral holding material with a crimped portion formed in the sheet of material for cooperating to hold the sheet of material in position about the floral holding material to provide a decorative covering.

BRIEF DESCRIPTION OF THE DRAWINGS

FIG. 1 is a plan view of a sheet of material constructed in accordance with the present invention.

FIG. 2 is a cross-sectional view showing the sheet of material extended about a portion of a floral holding material with a crimped portion being formed in the sheet of material for cooperating to hold the sheet of material in the position extended about a floral grouping to provide a decorative covering in accordance with the present invention.

FIG. 3 is a cross-sectional view of a modified floral holding material showing the sheet of material of FIG. 1 wrapped about the modified floral holding material to provide a decorative covering.

FIG. 4 is a perspective view of yet another modified floral holding material.

FIG. 5 is a cross-sectional view of the modified floral holding material of FIG. 4 showing the sheet of material disposed about a portion of the modified floral holding material with the crimped portion being formed in a portion of the sheet of material.

FIG. 6 is a plan view of a modified sheet of material.

FIG. 7 is a cross-sectional view of a floral holding material with the sheet of material of FIG. 6 disposed about a portion of the floral holding material and a modified crimped portion being formed in a portion of the sheet of material.

FIG. 10 is a perspective view of yet another embodiment of a floral holding material having a sheet of fluid impermeable material disposed thereabout to provide a flexible vase in accordance with the present invention.

FIG. 11 is a plan view of the sheet of fluid impermeable material before being disposed about the floral holding material to provide the flexible vase of FIG. 10.

FIG. 12 is a partially cutaway, perspective view of the floral holding material of the flexible vase of FIG. 10.

FIG. 13 is a plan view of a sheet of flexible material used to form the floral holding material of FIG. 12.

FIG. 14 is a perspective view of another embodiment of a floral holding material having a sheet of fluid impermeable material disposed thereabout to provide a flexible vase in accordance with the present invention.

FIG. 15 is a perspective view of the floral holding material of the flexible vase of FIG. 14.

FIG. 16 is a plan view of a sheet of flexible material used to form the floral holding material of FIG. 15.

FIG. 17 is a perspective view of the floral holding material of FIG. 15 having a base member disposed adjacent an open lower end of the floral holding material.

FIG. 18 is a partial cutaway perspective view of the floral holding material of FIG. 15 having another embodiment of a base member disposed adjacent an open lower end of the floral holding material.

FIG. 19 is a perspective view of another embodiment of a floral holding material which, when wrapped with a sheet of material provide a flexible vase similar in appearance to the flexible vase of FIG. 14.

FIG. 20 is a plan view of a sheet of flexible material used to form the floral holding material of FIG. 19.

FIG. 21 is a perspective view of another embodiment of a sheet of flexible material used to form the floral holding material of FIG. 19.

FIG. 22 is a perspective view of another embodiment of a floral holding material having a plurality of slots formed about an open upper end of the floral holding material.

FIG. 23 is a plan view of a sheet of flexible material used to form the floral holding material of FIG. 22.

FIG. 24 is a perspective view of another embodiment of a floral holding material which, when wrapped with a sheet of material, provides a flexible vase in accordance with the present invention.

FIG. 25 is a plan view of a sheet of flexible material used to form the floral holding material of FIG. 24 having one edge thereof turned up to show a lower side thereof.

FIG. 26 is a perspective view of another embodiment of a floral holding material which, when wrapped with a sheet of material, provides a flexible vase in accordance with the present invention.

FIG. 27 is a plan view of a sheet of flexible material used to form the floral holding material of FIG. 26 having one edge thereof turned up to show a lower side thereof.

FIG. 28 is a perspective view of another embodiment of a floral holding material which, when wrapped with a sheet of material, provides a flexible vase in accordance with the present invention.

FIG. 29 is a plan view of a sheet of flexible material used to form the floral holding material of FIG. 28.

FIG. 30 is a perspective view of another embodiment of a floral holding material which, when wrapped with a sheet of material, provides a flexible vase in accordance with the present invention.

FIG. 31 is a plan view of a sheet of flexible material used to form the floral holding material of FIG. 30.

FIG. 32 is a perspective view of the floral holding material of FIG. 30 in a partially assembled condition.

FIG. 33 is a perspective view of another embodiment of a floral holding material which, when wrapped with a sheet of material, provides a flexible vase in accordance with the present invention.

FIG. 34 is a plan view of a sheet of flexible material used to form the floral holding material of FIG. 33.

FIG. 35 is a perspective view of another embodiment of a floral holding material constructed in accordance with the present invention.

FIG. 36 is a plan view of a sheet of flexible material used to form the floral holding material of FIG. 35.

FIG. 37 is a perspective view of a preformed floral holding material constructed in accordance with the present invention.

FIG. 38 is a perspective view of the preformed floral holding material of FIG. 37 wherein a connector assembly has reduced the size of the circumference of the preformed floral holding material.

FIG. 39 is a perspective view of a preformed floral holding material in an expanded condition having an elastic member for maintaining the preformed floral holding material in the expanded condition.

FIG. 40 is a perspective view of the preformed floral holding material of FIG. 39 in a flattened condition for storage and transportation.

FIG. 44 is a perspective view of the preformed floral holding material of FIG. 43 in a flattened condition for storage and transportation.

FIG. 45 is a perspective view of a preformed floral holding material having a plurality of ring members for maintaining the preformed floral holding material in an expanded condition.

FIG. 46 is a perspective view of the preformed floral holding material of FIG. 45 in a flattened condition for storage and transportation.

FIG. 47 is a perspective view of a preformed floral holding material having a tab assembly for maintaining the preformed floral holding material in an expanded condition.

FIG. 48 is a perspective view of the preformed floral holding material of FIG. 47 in a flattened condition for storage and transportation.

FIG. 49 is a perspective view of a preformed floral holding material having an elastic member disposed about a peripheral sidewall for maintaining the preformed floral holding material in an expanded condition.

FIG. 50 is a perspective view of the preformed floral holding material of FIG. 49 in a flattened condition for storage and transportation and having the elastic member removed therefrom.

FIG. 51 is a perspective view of a preformed floral holding material having another embodiment of an assembly for maintaining the preformed floral holding material in an expanded condition.

FIG. 52 is a perspective view of a preformed floral holding material in an expanded condition wherein the preformed floral holding material is formed of a resilient material.

FIG. 53 is a perspective view of the preformed floral holding material of FIG. 52 in a flattened condition for storage and transportation.

FIG. 54 is a perspective view of a preformed floral holding material having another embodiment of a tab assembly for maintaining the preformed floral holding material in an expanded condition.

FIG. 55 is a perspective view of the preformed floral holding material of FIG. 54 in a flattened condition for storage and transportation.

FIG. 56 is a perspective view of a preformed floral holding material having yet another embodiment of a tab assembly for maintaining the preformed floral holding material in an expanded condition.

FIG. 57 is a perspective view illustrating one side of the preformed floral holding material of FIG. 56 when the preformed floral holding material is in a flattened condition for storage and transportation.

FIG. 58 is a perspective view illustrating a second side of the preformed floral holding material of FIG. 56 when the preformed floral holding material is in a flattened condition for storage and transportation.

FIG. 59 is a perspective view of another embodiment of a preformed floral holding material constructed in accordance with the present invention.

FIG. 60 is a perspective view of the preformed floral holding material of FIG. 59 having an upper portion removed therefrom to reduce the height of the preformed floral holding material.

FIG. 65 is a fragmental, perspective view of another embodiment of a preformed floral holding material constructed in accordance with the present invention.

FIG. 66 is a perspective view of another embodiment of a flexible vase constructed in accordance with the present invention.

FIG. 67 is a plan view of a sheet of fluid impermeable material having a sheet of flexible material secured thereto for forming the flexible vase of FIG. 66.

FIG. 68 is a plan view of a sheet of fluid impermeable material having a sheet of flexible material secured thereto for forming the flexible vase of FIG. 66.

FIG. 69 is a perspective view of another embodiment of a flexible vase constructed in accordance with the present invention.

FIG. 70 is a plan view of a sheet of fluid impermeable material having a shape-sustaining support member secured thereto in a flattened condition for forming the flexible vase of FIG. 69.

FIG. 71 is a perspective view of yet another embodiment of a flexible vase constructed in accordance with the present invention.

FIG. 72 is a plan view of a sheet of fluid impermeable material having a shape-sustaining support member secured thereto in a flattened condition for forming the flexible vase of FIG. 71.

FIG. 73 is a perspective view of yet another embodiment of a flexible vase constructed in accordance with the present invention.

FIG. 74 is a plan view of a sheet of fluid impermeable material having a shape-sustaining support member secured thereto in a flattened condition for forming the flexible vase of FIG. 73.

FIG. 75 is a perspective view of another embodiment of a flexible vase constructed in accordance with the present invention.

FIG. 78 is a perspective view of another embodiment of a vase constructed in accordance with the present invention.

FIG. 79 is a cross-sectional view of a self-erecting floral holding container in a collapsed condition disposed on a sheet of fluid impermeable material, the self-erecting floral holding container and the sheet of fluid impermeable material cooperating to form the vase of FIG. 78 when the self-erecting floral holding container is in the erected position.

FIG. 80 is a plan view of the self-erecting floral holding container in a collapsed condition disposed on the sheet of fluid impermeable material.

FIG. 83 is a perspective view of another embodiment of a floral holding material which, when wrapped with a sheet of material, provides a flexible vase in accordance with the present invention.

FIG. 84 is a plan view of a sheet of flexible material used to form the floral holding material of FIG. 83.

DESCRIPTION OF THE PREFERRED EMBODIMENTS

Figure 8:
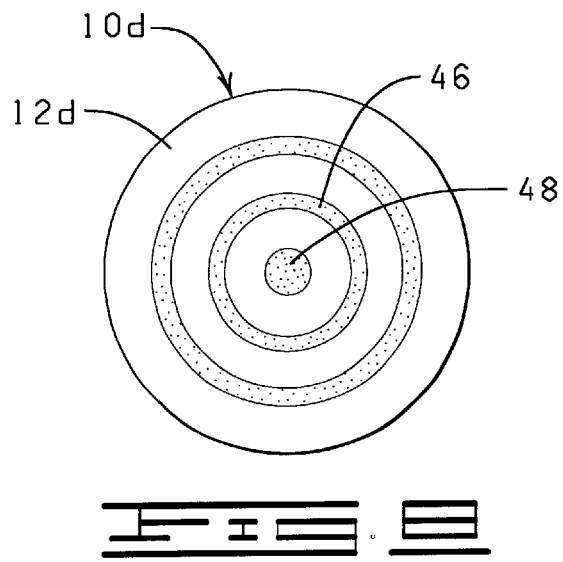
FIG. 8 is a plan view of still another modified sheet of material.

Shown in FIG. 1 and designated by the general reference numeral 10 is a sheet of material constructed in accordance with the present invention. The sheet of material 10 has an upper surface 12, a lower surface 14 and an outer edge 16.

The sheet of material 10 is constructed from any suitable flexible material that is capable of being wrapped or extended about a floral holding material 18 (FIG. 2) in the manner described below. Preferably, the sheet of material 10 is constructed of a material selected from a group of materials consisting of paper, metal foil, cloth (natural or synthetic or combinations thereof), denim, burlap, polymer film or cling material or combinations thereof.

The term "polymer film" as used herein means any polymer film. For example, but not by way of limitation, one polymer film is a polypropylene film. Another example of a polymer film, but not by way of limitation, is cellophane.

The sheet of material 10 has a thickness in a range from about 0.1 mil to about 30 mils. Preferably, the sheet of material 10 has a thickness in a range from about 0.1 mil to about 5 mils.

The sheet of material 10 may be any shape and a circular shape is shown in FIG. 1 only by way of example. The sheet of material 10, for example only, may be square or rectangular or any other geometric shape such as heart shaped.

The sheet of material 10 may be constructed of a single layer of material or a plurality of layers of the same or different types of materials. Any thickness of the sheet of material 10 may be utilized in accordance with the present invention as long as the sheet of material 10 is wrappable about the floral holding material 18, as described herein. Additionally, an insulating material such as bubble film, preferably as one of two or more layers, can be utilized in order to provide additional protection for the item wrapped therein. The layers of material comprising the sheet of material 10 may be connected together or laminated or may be separate layers.

A decorative pattern, such as a color and/or an embossed pattern, and/or other decorative surface ornamentation may be applied to the upper surface 12 and/or the lower surface 14 of the sheet of material 10 or portions thereof including, but not limited to, printed designs, coatings, colors, flocking or metallic finishes. The sheet of material 10 also may be totally or partially clear or tinted transparent material.

"Cling wrap or material" as used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material which remains securely connected to and about the wrapped item until the wrapping material is removed therefrom.

The cling material is constructed and treated, if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mil to about 10 mils, and preferably less than about 0.5 mil to about 2.5 mils and most preferably from less than about 0.6 mil to about 2 mils. However, any thickness of cling material may be utilized in accordance with the present invention which permits the cling material to function as described herein.

As shown in FIG. 2, the floral holding material 18 has an upper end 20, a lower end 22 and an outer peripheral surface 24. The floral holding material 18 shown in FIG. 2 is spherically shaped, although the floral holding material 18 may be any shape desired in any particular application. The floral holding material 18 is constructed of a material capable of receiving a portion of a floral grouping 26 and holding or supporting the floral grouping without any pot means, such as a separate flower pot, for example.

The floral holding means 18 may be the type of material commonly referred to in the art as floral foam or Oasis™, or may be soil, or artificial soil or other earth composition so long as the material is capable of holding its predetermined shape and capable of receiving and supporting the floral grouping 26 without any additional pot means. The floral holding material 18 may be capable of receiving and holding water for supplying water to the floral grouping 26.

As shown in FIG. 2, the floral grouping 26 has a stem end 28 and a bloom end 30. A portion of the stem end 28 of the floral grouping 26 is extended into the floral holding material 18. The bloom end 30 of the floral grouping 26 extends a distance above the floral holding material 18.

"Floral grouping" as used herein means cut fresh flowers, artificial flowers, a single flower, other fresh and/or artificial plants, or other floral materials and may include other secondary plants and/or ornamentation which add to the aesthetics of the overall floral grouping.

As mentioned before, the floral holding material 18, as shown in FIG. 2, is generally spherically shaped. A flat portion (not shown) may be formed on the lower end 22 of the floral holding material 18 so that the floral holding material 18 may be supported more easily on a flat surface such as on a table (not shown) for example.

The sheet of material 10 is disposed adjacent the floral holding material 18 with the upper surface 12 of the sheet of material 10 being disposed adjacent the outer peripheral surface 24 of the floral holding material 18. In this position, as shown in FIG. 2, the sheet of material 10 is extended about and covers a substantial portion of the floral holding material 18 leaving the upper end 20 of the floral holding material 18 substantially uncovered so that the floral grouping 26 extends outwardly from the upper end 20 of the floral holding material 18.

In this position, a crimped portion 32 is formed in the sheet of material 10 near the upper end 20 of the floral holding material 18. The crimped portion 32 is formed by crimping together portions of the sheet of material 10 to form the crimped portion 32. The crimped portion 32 extends a distance inwardly toward a central portion of the floral holding material 18. The crimped portion 32 preferably extends circumferentially about the upper end 20 of the floral holding material 18, although the crimped portion 32 could be formed only in portions of the sheet of material 10 thereby forming circumferentially spaced apart crimped portions 32 if desired in a particular application.

As shown in FIG. 2, the crimped portion 32 is formed by placing a band 34 about a portion of the sheet of material 10 with the band 34 gathering or bringing together portions of the sheet of material 10 pulling portions of the sheet of material 10 toward a central portion of the upper end 20 of the floral holding material 18 to form the crimped portion 32.

The term "band" as used herein means any material which may be secured about an object, such bands commonly being referred to as elastic bands or rubber bands and also includes any other type of material such as a string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material 10 to removably or substantially permanently form the crimped portion 32 and secure the crimped portion 32 formed in the sheet of material 10. The band 34 also may include a bow if desired in a particular application.

A portion of the sheet of material 10 near the outer edge 16 thereof extends a distance above and beyond the crimped portion 32 to form a skirt 36 (FIG. 2) extending circumferentially about the upper end 20 of the floral holding material 18 and circumferentially about the floral grouping 26. The sheet of material 10 secured about the floral holding material 18 in the manner just described provides a decorative covering 38. The sheet of material 10 and the floral holding material 18 together with the means (e.g. band 34) for forming the crimped portion 32 comprise a decorative assembly 40.

In one preferred embodiment, the band 34 is automatically placed about the sheet of material 10 using any one of a number of commercially available automatic or semi automatic banding machines such as the automatic shaping machine Model No. Power 260 available from Clements Industries, Inc., South Hackensack, N.J., or the machine Model No. Model BMNS Side Bender available from Saxmayer Corporation, Blissfield, Minn., for example. In this last mentioned embodiment, the floral holding material 18 with the sheet of material 10 extended thereabout is placed in the banding machine and the banding machine is activated to automatically place the band 34 about the sheet of material 10.

A system for automatically placing a band 34 about a sheet of material disposed about a flower pot is disclosed in U.S. Pat. Nos. 5,623,807 and 5,761,879, which are specifically incorporated herein by reference. This system can be utilized for automatically placing the band 34 about the sheet of material 10 in accordance with the present invention.

In one other embodiment, the sheet of material 10 is placed about the floral holding material 18 and then placed in a holding device of the type disclosed in U.S. Pat. No. 5,522,202, which specifically hereby is incorporated herein by reference. This device includes a band holder. After the floral holding material 18 with the sheet of material 10 extended thereabout is placed in the holding device, the operator then takes a band 34 from the band holder and pulls it over the holding device and onto the sheet of material 10.

Embodiment of FIG. 3

Shown in FIG. 3 is a modified decorative assembly 40a comprising a sheet of material 10a wrapped about a modified floral holding material 18a. The floral holding material 18a is constructed exactly like the floral holding material 18 shown in FIG. 2 and described in detail before, except the floral holding material 18a has a generally rectangularly shaped cross section as compared to the circular shaped cross section shown in FIG. 2 with respect to the floral holding material 18.

The sheet of material 10a is constructed exactly like the sheet of material 10 except the sheet of material 10a may be rectangularly shaped.

The sheet of material 10a is extended about the floral holding material 18a and a crimped portion 32a is formed in the sheet of material 10a via the band 34a in a manner exactly like that described before in connection with the sheet of material 10 and the floral holding material 18 shown in FIG. 2.

Embodiment of FIGS. 4 and 5

Shown in FIG. 4 is a modified floral holding material 18b which is constructed exactly like the floral holding material 18 shown in FIG. 2 and described in detail before, except the floral holding material 18b is in the shape of a solid basket.

Shown in FIG. 5 is a sheet of material 10b which is constructed exactly like the sheet of material 10 shown in FIG. 1 and described in detail before, except the sheet of material 10b is disposed or extended about the floral holding material 18b. A crimped portion 32b is formed in the sheet of material 10b via a band 34b for cooperating to hold the sheet of material 10b in position about the floral holding material 18b to provide a decorative covering 38b.

A decorative assembly 40b is constructed and operates exactly like the decorative assembly 40 shown in FIGS. 1 and 2 and described in detail before, except the sheet of material 10b is extended about the floral holding material 18b having a basket like shape as opposed to a spherical shape or rectangularly shaped cross section like the floral holding material 18 or 18a shown in FIGS. 2 and 3 respectively.

Embodiment of FIGS. 6 and 7

Shown in FIG. 6 is a modified sheet of material 10c which is constructed exactly like the sheet of material 10 shown in FIG. 1 and described in detail before, except the sheet of material 10c has a closure bonding material 42 disposed thereon. More particularly, the closure bonding material 42 is disposed on the upper surface 12c of the sheet of material 10c and the closure bonding material 42 is spaced a distance 44 from the outer periphery 16c of the sheet of material 10c. The closure bonding material 42 extends circumferentially about the sheet of material 10c. The closure bonding material 42 is spaced a distance radially from a central portion of the sheet of material 10c. It should be noted that, although the closure bonding material 42 is shown in FIG. 6 in the form on a continuous strip of closure bonding material 42, the closure bonding material 42 may be in the form of spots or spaced apart strips and the spots or strips may be of any geometric shape desired in a particular application.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein.

Shown in FIG. 7 is a floral holding material 18c which is constructed exactly like the floral holding material 18a shown in FIG. 3 and described in detail before.

In operation, the sheet of material 10c is extended about a portion of the outer peripheral surface 24c of the floral holding material 18c. The crimped portion 32c is formed in the sheet of material 10c by crimping together portions of the sheet of material 10c near the closure bonding material 42 and forming overlapping portions of the sheet of material with the overlapping portions being substantially bonded via the closure bonding material 42 to form the crimped portion 32c. The crimped portion 32c will cooperate to hold the sheet of material 10c about the floral holding material 18c to provide the decorative covering 38c in a manner exactly like that described before with respect to the crimped portion 32c formed with the band 34 shown in FIG. 2, except in this instance the crimped portion 32 is formed by bringing together and bonding portions of the sheet of material 10c via the closure bonding material 42. The closure bonding material 42 is positioned on the upper surface 12c of the sheet of material 10c so that the crimped portion 32c is positioned above the upper end 20c of the floral holding material 18c, shown in FIG. 7.

The crimping of the sheet of material 10c may be accomplished by hand or with a machine or device.

Figure 9:
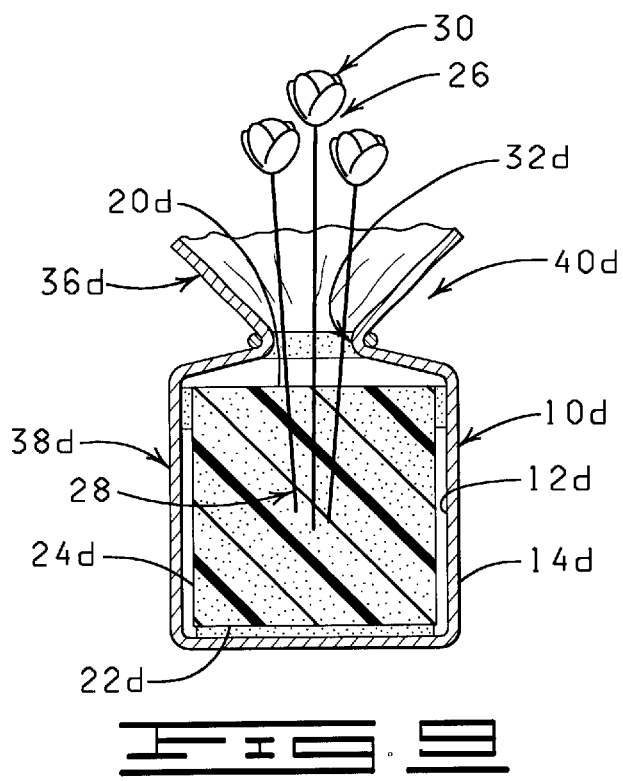
FIG. 9 is a cross-sectional view of a floral holding material showing the sheet of material of FIG. 8 disposed about a portion of the floral holding material with the crimped portion being formed in the sheet of material in a manner like that shown in FIG. 7.

Embodiment of FIGS. 8 and 9

Shown in FIG. 8 is a modified sheet of material 10d which is constructed exactly like the sheet of material 10c shown in FIG. 6, except the sheet of material 10d also includes a first pot bonding material 46 which extends circumferentially about a portion of the sheet of material 10d. The first pot bonding material 46 is spaced a distance from the closure bonding material 42 and spaced a distance from a central portion of the sheet of material 10d. The sheet of material 10d also includes a second pot bonding material which is disposed on the upper surface 12d of the sheet of material 10d with the second pot bonding material 48 covering a central portion of the sheet of material 10d.

Shown in FIG. 9 is a sectional view of a floral holding material 18d which is constructed exactly like the floral holding material 18a shown in FIG. 3 and described in detail before. The sheet of material 10d is extended about the floral holding material 18d and the crimped portion 32d is formed in the sheet of material 10d in a manner exactly like that described before in connection with the sheet of material 10c shown in FIG. 7.

The first pot bonding material 46 is disposed on the sheet of material 10d and positioned thereon so that, when the sheet of material 10d is wrapped or extended about the floral holding material 18d, the first pot bonding material 46 is disposed adjacent a portion of the outer peripheral surface 24d near the upper end 20d of the floral holding material 18d. The portion of the sheet of material 10d with the pot bonding material 46 thereon is bondingly connected to the outer peripheral surface 24d of the floral holding material 18d for further cooperating to hold the sheet of material 10d extended about the floral holding material 18d. In addition, the second pot bonding material 48 is positioned on the sheet of material 10d so that the second pot bonding material 48 engages a portion of the lower end 22d of the floral holding material 18d and is bondingly connected thereto for still further cooperating to hold the sheet of material 10d extended about the floral holding material 18d to form the decorative covering 38d.

The closure bonding material 42 and the pot bonding materials 46 and 48 may be disposed on the upper surface or the lower surface or both of the sheets of material 10 described herein or in any of the other positions described in U.S. Pat. No. 5,809,629 the present invention, the disclosure of which specifically hereby is incorporated herein by reference.

The present invention particularly is useful for providing a decorative covering using a sheet of material constructed of a material which is non-shape-sustaining. Non-shape-sustaining means that the material may be shaped about the form of the floral holding material, but the sheet of material will not hold that shape and will relax back into substantially the non-formed shape unless held in the formed shaped by some means such as the forming of the crimped portion in the sheet of material. By comparison, a shape-sustaining sheet of material would be a material such as a metal foil for example which may be formed about the floral holding material and which will substantially maintain the formed shape.

Embodiment of FIGS. 10–13

Shown in FIG. 10 is an embodiment of a flexible vase 60 constructed in accordance with the present invention. The flexible vase 60 comprises a sheet of fluid impermeable material 62 wrapped about a floral holding material 64 and secured about the floral holding material 64 by a band 66. As will be more fully described in detail hereinafter, the sheet of fluid impermeable material 62 and the floral holding material 64 cooperate to define a reservoir 68 in the flexible vase 60. Thus, to store floral groupings, such as cut flowers, 70 having stem portions 72 and bloom portions 74, the stem portions 72 of the cut flowers 70 are disposed into the reservoir 68 of the flexible vase 60 and the reservoir 68 is then filled with a suitable fluid, such as water 76.

The sheet of fluid impermeable material 62 may be of any shape such as a square as shown in FIG. 11, or a rectangle or any other geometric configuration. Further, the sheet of fluid impermeable material 62 may be constructed of a single layer of material or a plurality of layers of the same or different types of material as long as at least one of the sheets of material, preferably the sheet of material disposed substantially adjacent the floral holding material 64 is impermeable to a fluid, such as water. When utilizing more than one layer of material as the sheet of fluid impermeable material 62, the sheets of material may be connected together, laminated or maintained as separate sheets of material. The thickness of the sheet of fluid impermeable material 62 can vary widely, the only requirements being that the sheet of fluid impermeable material 62 have sufficient strength so that the flexible vase 60 formed from the floral holding material 64 and the sheet of fluid impermeable material 62 is capable of holding water disposed in the reservoir 68 of the flexible vase 60 and to permit the flexible vase 60 to be transported and displayed, and that the sheet of fluid impermeable material 62 be wrappable about the floral holding material 64 as described in detail hereinafter.

While the sheet of fluid impermeable material 62 has been shown in FIG. 11 as a single sheet of material, it should be understood that a pad of sheets of fluid impermeable material 62 may be utilized to enhance assembly of a plurality of flexible vases 60, or a roll of fluid impermeable material 62 may be provided so that sheets of the fluid impermeable material 62 can readily be obtained by cutting a sheet of material from the roll of material or by providing perforations in the roll of material to facilitate removal of the sheet of fluid impermeable material 62.

The sheet of fluid impermeable material 62 is disposed about the floral holding material 64 to form a decorative cover 78 about the floral holding material 64. The decorative cover 78 extends a distance above the floral holding material 64 such that an upper end portion 80 of the floral holding material 64 remains substantially uncovered by the decorative cover 78. Thus, when a floral grouping such as cut flowers 70 is positioned within the reservoir 68 of the flexible vase 60, an upper portion of the stem portions 72 and the bloom portions 74 of the cut flowers 70 extend outwardly from the upper end portion 80 of the floral holding material 64.

A crimped portion 82 can be formed in the decorative cover 78 near the upper end portion 80 of the floral holding material 64. The crimped portion 82, which extends a distance inwardly, can be formed by crimping together portions of the decorative cover 78. The crimped portion 82 can also be formed by placing the band 66 about a portion of the decorative cover 78, in which case the band 66 gathers or brings together portions of the decorative cover 78 and pulls portions of the decorative cover 78 toward the upper end portion 80 of the floral holding material 64 to form the crimped portion 82 substantially as shown.

The term "band" as used herein means any material which may be secured about the decorative cover 78 to secure the decorative cover 78 about the floral holding material 64 and/or to provide additional decorative features to the decorative cover 78. Such bands are well known in the art and include elastic or rubber bands, string, ribbon, bows, paper strips, plastic strips, wire, tie wraps, twist ties and combinations thereof or any other device capable of gathering the decorative cover 78 to form the crimped portion 82 and thereby secure the decorative cover 78 about the floral holding material 64 or to enhance the decor of the flexible vase 60.

The sheet of fluid impermeable material 62 may also have a bonding material 84 disposed thereon for connecting adjacently disposed portions of the decorative cover 78 forming the crimped portion 82. More particularly, the bonding material 84 may be disposed on at least one of an upper surface 86 or a lower surface (not shown) of the sheet of fluid impermeable material 62 so as to be disposed a distance radially from a central portion of the sheet of fluid impermeable material 62. It should be noted that, although the bonding material 84 is shown in FIG. 11 in the form of a continuous strip, the bonding material may be in the form of spots or spaced apart strips and the spots or spaced apart strips may be of any geometric design.

The bonding material 84 is desirably a pressure sensitive adhesive or a cohesive. However, it is to be understood that the term bonding material 84 also includes heat sealing, a heat sealing lacquer which may be applied to the sheet of fluid impermeable material 62 and which requires heat to effect the bonding, or any other type of material which may be used to effect bonding of adjacently disposed portions of the decorative cover 78 defining the crimped portion 82.

Referring more specifically to FIG. 12, the floral holding material 62 comprises a substantially frustoconical shape-sustaining support member 88 (also referred to herein as the shape-sustaining support member 88). The shape-sustaining support member 88 has an open upper end 89, an open lower end 90 and a peripheral sidewall 92 defining an internal chamber 94 extending between the open upper end 89 and the open lower end 90 which serves as the reservoir 68 of the flexible vase 60. To prevent puncture of the decorative cover 78 formed about the shape-sustaining support member 88 by the stem portions 72 of the cut flowers 70, a base member 96 is disposed across at least a portion of the open lower end 90 of the shape-sustaining support member 88 for restricting movement of the stem portions 72 of the cut flowers 70 through the open lower end 90 of the shape-sustaining support member 88.

The shape-sustaining support member 88 is fabricated of a sheet of flexible material 98 (FIG. 13) which has sufficient flexibility to permit the sheet of flexible material 98 to be formed into the shape-sustaining support member 88, which also has sufficient strength to provide the required shape-sustaining properties to the shape-sustaining support member 88 and is sufficiently water resistant to prevent deterioration of the shape-sustaining support member 88 when contacted with a fluid, such as water. The thickness of the sheet of flexible material 98 can vary widely, the only requirements being that the sheet of flexible material 98 have sufficient strength and flexibility to satisfy the above requirements. Materials possessing the above-identified properties which may be used as the sheet of flexible material 98 for fabrication of the shape-sustaining support member 88 are polymeric materials, metals, water-repellent cardboards and the like.

While the sheet of flexible material 98 has been shown as an individual sheet of material, it should be understood that sheets of flexible material 98 can be stacked so that each individual sheet of the flexible material could be removed from the stack and shaped into the desired configuration of the shape-sustaining support member 88; or, the sheets of flexible-material 98 could be in the form of a roll of material in which perforations outline the configuration of each sheet of flexible material 98.

The sheet of flexible material 98 has an upper side 100 having a centrally disposed recess 102, a lower side 104, a first end portion 106 and a second end portion 108 which cooperate to provide the sheet of flexible material 98 with a substantially semi-circular configuration. The base member 96 is connected to the lower side 104 of the sheet of flexible material 98 (substantially as shown), and the base member 96 is provided with a circular configuration. The size or dimensions of the base member 96 can vary widely. That is, the base member 96 can be provided with a diameter substantially equal to the diameter of the open lower end 90 of the shape-sustaining support member 88 so that when the sheet of flexible material 98 is formed into the configuration of the shape-sustaining support member 88 and the base member 96 is folded to be disposed substantially adjacent the open lower end 90 of the shape-sustaining support member 88, the base member 96 extends across the open lower end 90 of the shape-sustaining support member 88 substantially as shown in FIG. 12; or, the base member 96 can be provided with a diameter less than the diameter of the open lower end 90 of the shape-sustaining support member 88 so that when the sheet of flexible material 98 is formed into the configuration of the shape-sustaining support member 88 and the base member 96 is folded so as to be disposed substantially adjacent the open lower end 90 of the shape-sustaining support member 88, the base member 96 extends across only a portion of the open lower end 90 of the shape-sustaining support member 88; or, the base member 96 can be provided with a diameter greater than the diameter of the open lower end 90 of the shape-sustaining support member 88 so that when the sheet of material 98 is formed into the configuration of the shape-sustaining support member 88 and the base member 96 is folded so as to be disposed substantially adjacent the open lower end 90 of the shape-sustaining support member 88, the base member 96 extends beyond the portion of the peripheral sidewall 92 of the shape-sustaining support member 88.

The sheet of flexible material 98 is further provided with a connector assembly 110 for connecting the first end portion 106 of the sheet of flexible material 98 to the second end portion 108 of the sheet of flexible material 98 when the sheet of flexible material 98 is formed into the shape-sustaining support member 88 configuration substantially as shown in FIG. 12. The connector assembly 110 comprises a male connector 112 disposed along the upper side 100 of the sheet of flexible material 98 and comprises a first tab member 113a and a second tab member 113b. The connector assembly 110 also comprises a plurality of female connectors 114 disposed in the second end portion 108 of the sheet of flexible material 98 such that at least one female connector 114 is adapted to matingly receive the male connector 112 and first tab member 113a and second tab member 113b thereof and thereby connect the first end portion 106 of the sheet of flexible material 98 to the second end portion 108 of the sheet of material 98.

The plurality of female connectors 114 are spatially disposed slits provided in the second end portion 108 of the sheet of material 98 so that each of the female connectors 114 is alignable with the male connector 112 when the first end portion 106 of the sheet of flexible material 98 is disposed over the second end portion 108 of the sheet of flexible material 98 during formation of the shape-sustaining support member 88. Thus, upon inserting the first tab member 113a and second tab ember 113b of the male connector 112 into a selected female connector 114, the circumferential dimensions of the shape-sustaining support member 88 can be varied.

While the sheet of flexible material 98 has been illustrated as having only one male connector 112, it should be understood that a plurality of the male connectors 112 could be disposed along the upper side 100 of the sheet of flexible material 98 for mating engagement with the female connectors 114 formed in the second end portion 108 of the sheet of flexible material 98. Further, the configuration of the male connector 112 can vary widely, the only requirement being that the male connector 112 be adapted to matingly engage and be connected to the female connector 114 so that the first end portion 106 of the sheet of flexible material 98 can be securely connected to the second end portion 108 of the sheet of flexible material 98 so as to form the shape-sustaining support member 88.

To stabilize cut flowers 70 within the internal chamber 94 of the shape-sustaining support member 88 (i.e. the floral holding material 64 of the flexible vase 60), or to provide a flared neck portion about the open upper end 89 of the shape-sustaining support member 88, a plurality of finger members 116 are formed in the sheet of flexible material 98 about the centrally disposed recess 102 formed in the upper side 100 of the sheet of flexible material 98. The finger members 116, which extend inwardly into the sheet of flexible material 98 from the centrally disposed recess 102, desirably have a rounded or arcuate distal end 118. Thus, the finger members 116 can be easily and quickly pressed inwardly into the open upper end 89 of the shape-sustaining support member 88 so as to engage the stem portions 72 of cut flowers 70 disposed within the internal chamber 94 of the shape-sustaining support member 88, or the finger members 116 can be flared outwardly and thereby provide a flared neck portion about the open upper end 89 of the shape-sustaining support member 88.

Embodiments of FIGS. 14–18

Shown in FIG. 14 is an embodiment of a flexible vase 120 constructed in accordance with the present invention. The flexible vase 120 comprises a sheet of fluid impermeable material 122 wrapped about a floral holding material 124 and secured about the floral holding material 124 by a band 126. As will be more fully described in detail hereinafter, the sheet of fluid impermeable material 122 and the floral holding material 124 cooperate to define a reservoir 128 in the flexible vase 120. Thus, to store floral groupings, such as cut flowers 70 having stem portions 72 and bloom portions 74, the stem portions 72 of the cut flowers 70 are disposed into the reservoir 128 of the flexible vase 120 and the reservoir 128 is then filled with a suitable fluid, such as water 76.

The sheet of fluid impermeable material 122 is substantially identical in construction to the sheet of fluid impermeable material 62 hereinbefore described with reference to FIG. 11. Thus, the sheet of fluid impermeable material 122 may be of any shape such as a square, or a rectangle or any other geometric configuration. Further, the sheet of fluid impermeable material 122 may be constructed of a single layer of material or a plurality of layers of the same or different types of material as long as at least one of the sheets of material, preferably the sheet of material disposed substantially adjacent the floral holding material 124 is impermeable to a fluid, such as water. When utilizing more than one layer of material as the sheet of fluid impermeable material 122, the sheets of material may be connected together, laminated or maintained as separate sheets of material. The thickness of the sheet of fluid impermeable material 122 can vary widely, the only requirements being that the sheet of fluid impermeable material 122 have sufficient strength so that the flexible vase 120 formed from the floral holding material 124 and the sheet of fluid impermeable material 122 is capable of holding water disposed in the reservoir 128 of the flexible vase 120 and to permit the flexible vase 120 to be transported and displayed and that the sheet of fluid impermeable material 122 be wrappable about the floral holding material 124 as described in detail hereinafter.

It should be understood that a pad of sheets of fluid impermeable material 122 may be utilized to enhance assembly of a plurality of flexible vases 120, or a roll of fluid impermeable material 122 may be provided so that sheets of the fluid impermeable material 122 can readily be obtained by cutting a sheet of material from the roll of material or by providing perforations in the roll of material to facilitate removal of the sheet of fluid impermeable material 122.

The sheet of fluid impermeable material 122 is disposed about the floral holding material 124 to form a decorative cover 130 about the floral holding material 124. The decorative cover 130 extends a distance above the floral holding material 124 such that an upper end portion 132 of the floral holding material 124 remains substantially uncovered by the decorative cover 130. Thus, when a floral grouping such as cut flowers 70 is positioned within the reservoir 128 of the flexible vase 120, an upper portion of the stem portions 72 and the bloom portions 74 of the cut flowers 70 extend outwardly from the upper end portion 132 of the floral holding material 124.

A crimped portion 134 can be formed in the decorative cover 130 near the upper end portion 132 of the floral holding material 124. The crimped portion 134, which extends a distance inwardly, can be formed by crimping together portions of the decorative cover 130. The crimped portion 134 can also be formed by placing the band 126 about a portion of the decorative cover 130, in which case the band 126 gathers or brings together portions of the decorative cover 130 and pulls portions of the decorative cover 130 toward the upper end portion 132 of the floral holding material 124 to form the crimped portion 134 substantially as shown.

As previously stated, the term "band" as used herein means any material which may be secured about the decorative cover 130 to secure the decorative cover 130 about the floral holding material 124 and/or to provide additional decorative features to the decorative cover 130. Such bands are well known in the art and include elastic or rubber bands, string, ribbon, bows, paper strips, plastic strips, wire, tie wraps, twist ties and combinations thereof or any other device capable of gathering the decorative cover 130 to form the crimped portion 134 and thereby secure the decorative cover 130 about the floral holding material 124 or to enhance the decor of the flexible vase 120.

The sheet of fluid impermeable material 122 may also have a bonding material (not shown) disposed thereon for connecting adjacently disposed portions of the decorative cover 130 forming the crimped portion 134. The bonding material (not shown) may be disposed on at least one of an upper surface or a lower surface (not shown) of the sheet of fluid impermeable material 122 so as to be disposed a distance radially from a central portion of the sheet of fluid impermeable material 122; and the bonding material may be in the form of a continuous strip, spots or spaced apart strips and the spots or spaced apart strips may be of any geometric design.

Referring now to FIGS. 15–18, the floral holding material 124 comprises a shape-sustaining support member 140 having an open upper end 142, an open lower end 144 and a peripheral sidewall 146 defining an internal chamber 148 extending between the open upper end 142 and the open lower end 144. The shape-sustaining support member 140 is fabricated of a sheet of flexible material 150 (FIG. 16) which has sufficient flexibility to permit the sheet of flexible material 150 to be formed into the shape-sustaining support member 140, which has sufficient strength to provide the required shape-sustaining properties to the shape-sustaining support member 140 and which is sufficiently water-resistant to prevent deterioration of the shape-sustaining support member 140 when contacted with a fluid such as water. The thickness of the sheet of flexible material 150 can vary widely, the only requirements being that the sheet of flexible material 150 have sufficient strength and flexibility to satisfy the above requirements.

The sheet of flexible material 150 has an upper side 152 having a centrally disposed recess 154, a lower side 156, a first end portion 158, and a second end portion 160 which cooperate to provide the sheet of flexible material 150 with a substantially semi-circular configuration. The sheet of flexible material 150 is also provided with a connector assembly 162 for connecting the first end portion 158 of the sheet of flexible material 150 to the second end portion 160 of the sheet of flexible material 150 so that the sheet of flexible material 150 can be formed into the shape-sustaining support member 140.

The connector assembly 162 comprises a male connector 164 extending from the upper side 152 of the sheet of flexible material 150 so as to be disposed in close proximity to the first end portion 158 of the sheet of flexible material 150. A plurality of female connectors 166 are formed in the second end portion 160 of the sheet of flexible material 150 such that at least one female connector 166 is adapted to matingly receive the male connector 164 and thereby connect the first end portion 158 of the sheet of flexible material 150 to the second end portion 160 of the sheet of flexible material 150 and thus provide the shape-sustaining support member 140 shown in FIG. 15.

The male connector 164 is provided with a substantially mushroom or button shaped head portion 168 and a shank portion 170. The plurality of female connectors 166 are a plurality of slits spatially formed in the second end portion 160 of the sheet of flexible material 150 so that each of the female connectors 166 is alignable with the male connector 164 when the first end portion 158 of the sheet of flexible material 150 is disposed over the second end portion 160 of the sheet of flexible material 132 during formation of the shape-sustaining support member 140. Thus, upon inserting the head portion 168 of the male connector 164 into a selected female connector 166, the circumferential dimensions of the shape-sustaining support member 140 can be varied.

While the sheet of flexible material 150 has been illustrated as having only one male connector 164, it should be understood that a plurality of male connectors 164 could be disposed along the upper side 152 of the sheet of flexible material 150 for matingly engaging the female connectors 166 formed in the second end portion 160 of the sheet of flexible material 150. Further, while the male connector 164 has been depicted as having a mushroom or button shaped head portion 168, it should be understood that the configuration of the male connector 164 can vary widely and the head portion 168 of the male connector 164 could be in the shape of an arrow, or any other geometric configuration which is adapted to matingly engage and be connected to the female connectors 166 so that the first end portion 158 of the sheet of flexible material 150 can be securely connected to the second end portion 160 of the sheet of flexible material 150 so as to form the shape-sustaining support member 140.

To prevent puncture of the decorative cover 130 formed about the shape-sustaining support member 140 by the stem portions 72 of a floral grouping, such as cut flowers 70, a base member 172 is disposed about the open lower end 144 of the shape-sustaining support member 140 substantially as shown in FIG. 17. The base member 172 is provided with an upwardly extending lip 174 to assist in stabilizing the base member 172 relative to the shape-sustaining support member 140.

FIG. 18 illustrates another embodiment of a base member 176 for the shape-sustaining support member 140. In this embodiment, the base member 176 is provided with an inwardly tapered peripheral sidewall 178 for matingly engaging a lower portion of the interior surface of the peripheral sidewall 146 of the shape-sustaining support member 140. That is, the base member 176 is sized such that the base member 176 can be disposed within the open lower end 144 of the shape-sustaining support member 140 substantially as shown in FIG. 18.

The base members 172 and 176 depicted in FIGS. 17 and 18 can be connected, if desired, to the shape-sustaining support member 140 to enhance stability and water tightness of the internal chamber 148 formed in the shape-sustaining support member 140. Any suitable means can be employed for connecting the base members 172 and 176 to the shape-sustaining support member 140, such as an adhesive, cohesive, pressure sensitive adhesive and the like.

Embodiments of FIGS. 19–36

Referring now to FIGS. 19–21, a floral holding material 180 which, when wrapped with a sheet of the fluid impermeable material such as the sheet of fluid impermeable material 62 hereinbefore described, provides a flexible vase having a configuration similar to the flexible vase 60 shown in FIG. 1. The floral holding material 180 comprises a shape-sustaining support member 182 having an open upper end 184, an open lower end 186 and a peripheral sidewall 188 defining an internal chamber 190 extending between the open upper end 184 and the open lower end 186.

The shape-sustaining support member 182 is fabricated of a sheet of flexible material 192 (FIGS. 20–21) which has sufficient flexibility to permit the sheet of flexible material 192 to be formed into the shape-sustaining support member 182, and which also has sufficient strength to provide the required shape-sustaining properties to the shape-sustaining support member 182 and is sufficiently water-resistant to prevent deterioration of the shape-sustaining support member 182 when same is contacted with a fluid, such as water. The thickness of the sheet of flexible material 192 can vary widely, the only requirement being that the sheet of flexible material 192 have sufficient strength and flexibility to satisfy the above requirements. Any material possessing the above-identified properties can be used in the fabrication of the sheet of flexible material 192.

The sheet of flexible material 192 has an upper side 194 having a centrally disposed recess 196, a lower side 198, a first end portion 200 and a second end portion 202 which cooperate to provide the sheet of flexible material 192 with a substantially semi-circular configuration.

The sheet of flexible material 192 is further provided with a connector assembly 204 (FIG. 20) for connecting the first end portion 200 of the sheet of flexible material 192 to the second end portion 202 of the sheet of flexible material 192 when the sheet of flexible material 192 is formed into the shape-sustaining support member 188. The connector assembly 204 comprises a plurality of male connectors 206 formed in the first end portion 200 of the sheet of flexible material 192 so as to be disposed in close proximity to the upper side 194 of the sheet of flexible material 192, and a plurality of female connectors 208 formed in the second end portion 202 of the sheet of flexible material 192 such that at least a portion of the female connectors 208 are adapted to matingly receive the male connectors 206 and thereby connect the first end portion 200 of the sheet of flexible material 192 to the second end portion 202 of the sheet of flexible material 192 to provide the shape-sustaining support member shown in FIG. 19.

The male connectors 206 of the connector assembly 204 are a plurality of spatially disposed studs or bosses which extend upwardly from an upper surface 210 of the sheet of flexible material 192; and the female connectors 208 are a plurality of apertures formed in the second end portion 202 of the sheet of flexible material 192 which are adapted to matingly receive and frictionally engage the male connectors 206 so that, upon inserting the male connectors 206 into the female connectors 208, the first end portion 200 of the sheet of flexible material 192 can be securely connected to the second end portion 202 to form the shape-sustaining support member 182. It should be noted that by providing a plurality of female connectors 208 spatially disposed along the second end portion 202 of the sheet of flexible material 192, insertion of the male connectors 206 into selected female connectors 208 permits one to vary the circumferential dimensions of the shape-sustaining support member 182.

To stabilize cut flowers or other floral arrangements within the internal chamber 190 of the shape-sustaining support member 182, a plurality of finger members 212 are formed in the sheet of flexible material 192 about the centrally disposed recess 196 formed in the upper side 194 of the sheet of flexible material 192. The finger members 212, which extend inwardly into the sheet of flexible material 192 from the centrally disposed recess 196 substantially as shown, desirably have a rounded or arcuate distal end 214. Thus, the finger members 212 can be easily and quickly pressed inwardly into the open upper end 184 of the shape-sustaining support member 182 so as to engage the stem portions of cut flowers or other floral arrangements disposed within the internal chamber 190 of the shape-sustaining support member 182, or the finger members 212 can be flared outwardly and thereby provide a flared neck portion about the open upper end of 184 of the shape-sustaining support member 182.

Referring now to FIG. 21, another embodiment of a connector assembly 220 for interconnecting the first end portion 200 and the second end portion 202 of the sheet of flexible material 192 to form the shape-sustaining support member 182 is illustrated. The connector assembly 220 comprises a plurality of male connectors 222 formed in the first end portion 200 of the sheet of flexible material 192 so as to be disposed in close proximity to the upper side 194 of the sheet of flexible material 192; and a plurality of female connectors 224 formed in the second end portion 202 of the sheet of flexible material 192 such that at least a portion of the female connectors 224 are adapted to matingly receive the male connectors 222 and thereby connect the first end portion 200 of the sheet of flexible material 192 to the second end portion 202 of the sheet of flexible material 192 to provide the shape-sustaining support member 182 shown in FIG. 19. The male connectors 222 are a plurality of spatially disposed studs or bosses which extend upwardly from the upper surface 210 of the sheet of flexible material 192; and the female connectors 224 are a plurality of spatially disposed studs or bosses which extend upwardly from the upper surface 210 of the sheet of flexible material 192 and which have a centrally disposed recess 225 formed therein adapted to matingly receive the male connectors 222. The plurality of female connectors 224 are spatially disposed along the second end portion 202 such that a portion of the female connectors 224 are adapted to matingly receive the male connectors 222. Thus, upon inserting the male connectors 222 into selected female connectors 224, the circumferential dimensions of the shape-sustaining support member 182 can be varied.

Referring now to FIGS. 22 and 23, another embodiment of a floral holding material 230 is shown. The floral holding material 230 comprises a shape-sustaining support member 232 having an open upper end 234, an open lower end 236 and a peripheral sidewall 238 defining an internal chamber 240 extending between the open upper end 234 and the open lower end 236. The shape-sustaining support member 232 is fabricated of a sheet of flexible material 242 (FIG. 23) which has sufficient flexibility to permit the sheet of flexible material 242 to be formed into the shape-sustaining support member 232.

The sheet of flexible material 242 has an upper side 244 having a centrally disposed recess 246, a lower side 248, a first end portion 250 and a second end portion 252 which cooperate to provide the sheet of flexible material 242 with a substantially semi-circular configuration. The sheet of flexible material 242 is further provided with a connector assembly 254 for connecting the first end portion 250 of the sheet of flexible material 242 to the second end portion 252 of the sheet of flexible material 242 when the sheet of flexible material 242 is formed into the shape-sustaining support member 232.

The connector assembly 254 comprises a male connector 256 and a plurality of female connectors 258. The male connector 256 is formed in the upper side 244 of the sheet of flexible material 242 so as to be substantially adjacent the first end portion 250 of the sheet of flexible material 242 and comprises a first tab member 257*a* and a second tab member 257*b*; and the plurality of female connectors 258 are formed in the second end portion 252 of the sheet of flexible material 242 such that at least one of the female connectors 258 is adapted to matingly receive the first tab member 257*a* and second tab member 257*b* of the male connector 256 and thereby connect the first end portion 250 of the sheet of flexible material 242 to the second end portion 252 of the sheet of flexible material 242 and thus provide the shape-sustaining support member 232 shown in FIG. 22. The plurality of female connectors 258 are spatially disposed slits provided in the second end portion 252 of the sheet of flexible material 242 so that each of the female connectors 258 is alignable with the male connector 256 when the first end portion 250 of the sheet of flexible material 242 is disposed over the second end portion 252 of the sheet of flexible material 242 during formation of the shape-sustaining support member 232. Thus, upon inserting the first tab member 257*a* and second tab member 257*b* of the male connector 256 into a selected female connector 258, the circumferential dimensions of the shape-sustaining support member 232 can be varied.

While the sheet of flexible material 242 has been illustrated as having only one male connector 256, it should be understood that a plurality of male connectors 256 can be disposed along the upper side 244 of the sheet of flexible material 242 for mating engagement with the female connectors 258 formed in the second end portion 252 of the sheet of flexible material 242. Further, the configuration of the male connector 256 can vary widely, the only requirement being that the male connector 256 be adapted to matingly engage and be connected to the female connectors 258 so that the first end portion 250 of the sheet of flexible material 242 can be securely connected to the second end portion 252 of the sheet of flexible material 242 and thereby form the shape-sustaining support member 232.

To stabilize a floral grouping, such as the cut flowers 70 (FIG. 1), within the internal chamber 240 of the shape-sustaining support member 232, a plurality of slots 260 are provided in the sheet of flexible material 242 substantially as shown. The slots 260 extend radially from the centrally disposed recess 246 formed in the upper side 244 of the sheet of flexible material 242. Thus, the slots 260 provide open recessed areas for insertion of floral groupings (such as stem portions of cut flowers) therethrough for stabilizing same relative to the open upper end 234 of the shape-sustaining support member 232.

The spatially disposed slots 260 also define a plurality of finger members 262 which extend from the open upper end 234 of the shape-sustaining support member 232. Thus, if desired, the finger members 262 can be easily and quickly pressed inwardly into the open upper end 234 of the shape-sustaining support member 232 so as to engage a portion of the floral arrangement disposed within the internal chamber of the shape-sustaining support member 232 and thereby stabilize the floral arrangement, or the finger members 262 can be flared outwardly and thereby provide a flared neck portion about the open upper end 234 of the shape-sustaining support member 232.

Referring now to FIG. 24, another embodiment of a floral holding material 266 is shown. The floral holding material 266 comprises a shape-sustaining support member 268 having an open upper end 270, an open lower end 272 and a peripheral sidewall 274 defining an internal chamber 276 extending between the open upper end 270 and the open lower end 272. The shape-sustaining support member 268 is fabricated of a sheet of flexible material 278 (FIG. 25) which has sufficient flexibility and strength to permit the sheet of flexible material 278 to be formed into the shape-sustaining support member 268.

The sheet of flexible material 278 has an upper side 280 having a centrally disposed recess 282, a lower side 284, a first end portion 286 and a second end portion 288 which cooperate to provide the sheet of flexible material 278 with a substantially semi-circular configuration. The sheet of flexible material 278 is further provided with a connector assembly 290 for connecting the first end portion 286 of the sheet of flexible material 278 to the second end portion 288 of the sheet of flexible material 278 when the sheet of flexible material 278 is formed into the shape-sustaining support member 268.

The connector assembly 290 comprises a male connector 292 disposed on an upper surface 294 of the sheet of flexible material 278 and a female connector 296 formed along a portion of a lower surface 298 of the sheet of flexible material 278. The male connector, which is provided with a rib configuration, extends along at least a portion of the sheet of flexible material 278 such that the male connector 292 is disposed on the surface 294 of the sheet of flexible material 278 in close proximity to the upper side 280 of the sheet of flexible material 278 and extends between the first end portion 286 and the centrally disposed recess 282. The female connector, which is a generally channel-shaped connection, is disposed on the lower surface 298 of the sheet of flexible material 278 in close proximity to the upper side 280 of the sheet of flexible material 278 and extends between the centrally disposed recess 282 and the second end portion 288 of the sheet of flexible material 278. Thus, upon forming the sheet of flexible material into the configuration of the shape-sustaining support member as shown in FIG. 24, the rib portion of the male connector 292 is snapped into the channel portion of the female connector 296 so as to securely connect the first end portion 286 of the sheet of flexible material 278 to the second end portion 288 of the sheet of flexible material 278 and thereby provide the shape-sustaining support member 268 as shown in FIG. 24.

Referring now to FIG. 26, a floral holding material 300 is shown. The floral holding material 300 comprises a shape-sustaining support member 302 having an open upper end 304, an open lower end 306 and a peripheral sidewall 308 defining an internal chamber 310 extending between the open upper end 304 and the open lower end 306. The shape-sustaining support member 302 is fabricated of a sheet of flexible material 312 which has sufficient flexibility and strength to permit the sheet of flexible material 312 to be formed into the shape-sustaining support member 302.

The sheet of flexible material 312 (FIG. 27) is provided with a substantially semi-circular configuration and has an upper side 314 having a centrally disposed recess 316, a lower side 318, a first end portion 320, a second end portion 322, an upper surface 324 and a lower surface 326. The flexible sheet of material 312 is also provided with a connector assembly 328 for connecting the first end portion 320 of the sheet of flexible material 312 to the second end portion 322 of the sheet of flexible material 312 when the sheet of flexible material 312 is formed into the shape-sustaining support member 302.

The connector assembly 328 comprises a first strip of a cohesive 330 disposed substantially adjacent the upper side 314 of the sheet of flexible material 312 so as to extend along at least a substantial portion, of the distance between the centrally disposed recess 316 formed in the upper side 314 and the first end portion 320 of the sheet of flexible material 312, and a second strip of a cohesive 332 disposed on the lower surface 326 of the sheet of flexible material 312 so as to be disposed near the upper side 314 thereof and along a substantial portion of the upper side 314 between the centrally disposed recess 316 formed in the upper side 314 and the second end portion 322 of the sheet of flexible material 312. Thus, when the first end portion 320 of the sheet of flexible material 312 is disposed over the second end portion 322 of the sheet of flexible material 312 and the first and second strips of cohesive 330, 332 are brought into contact, the first end portion 320 of the sheet of flexible material 312 is connected to the second end portion 322 of the sheet of material 312 to provide the shape-sustaining support member 302. It should be noted that while the connector assembly 328 has been shown as a first strip of cohesive 330 and a second strip of cohesive 332, such cohesives are not restricted to being in strip form but can be in the form of dots, segments or any other desired configuration.

Referring now to FIGS. 28 and 29, another embodiment of a floral holding material 336 is shown. The floral holding material 336 comprises a shape-sustaining support member 338 having an open upper end 340, an open lower end 342, and a peripheral sidewall 344 defining an internal chamber 346 extending between the open upper end 340 and the open lower end 342. The shape-sustaining support member 338 is fabricated of a sheet of flexible material 348 having sufficient flexibility and strength to provide the desired shape-sustaining properties to the shape-sustaining support member 338.

The sheet of flexible material 348, which has a substantially semi-circular configuration, is provided with an upper side 350 having a centrally disposed recess 352, a lower side 354, a first end portion 356, a second end portion 358 and an upper surface 360. The sheet of flexible material 348 is further provided with a connector assembly 362 for connecting the first end portion 356 of the sheet of flexible material 348 to the second end portion 358 of the sheet of flexible material 348 when the sheet of flexible material 348 is formed into the shape-sustaining support member 338.

The connector assembly 362 comprises a first strip of a cohesive 364 and a second strip of a cohesive 366. The first strip of cohesive 364 is disposed on the upper surface 360 of the sheet of flexible material 348 so as to be disposed substantially adjacent the upper side 350 of the sheet of flexible material 348; and the first strip of cohesive 364 extends between the centrally disposed recess 352 and the first end portion 356 of the sheet of flexible material 348. Similarly, the second strip of cohesive 366 is disposed on the upper surface 360 of the sheet of flexible material 348 so as to be disposed substantially adjacent the upper side 360 of the sheet of flexible material 348; and the second strip of cohesive 366 extends between the centrally disposed recess 352 and the second end portion 358 of the sheet of flexible material 348. Thus, when the sheet of flexible material 348 is formed into a substantially conical configuration, the first strip of cohesive 364 is brought into contact with the second strip of cohesive 366 so that the first and second end portions 356 and 358 of the sheet of flexible material 348 are connected and the sheet of flexible material is formed into the shape-sustaining support member 338.

Referring now to FIG. 30, a floral holding material 370 is shown. The floral holding material 370 comprises a shape-sustaining member 372 having an open upper end 374, an open lower end 376 and a peripheral sidewall 378 defining an internal chamber 380 extending between the open upper end 374 and the open lower end 376. The shape-sustaining support member 372 is fabricated of a sheet of flexible material 382 (FIG. 31) having sufficient flexibility and strength to permit the sheet of flexible material 382 to be formed into the shape-sustaining support member 372.

Referring more specifically to FIG. 31, the sheet of flexible material 382 has an upper side 384 having a centrally disposed recess 386, a lower side 388, a first end portion 390 and a second end portion 392 which cooperate to provide the sheet of flexible material 382 with a substantially semi-circular configuration. The sheet of flexible material 382 is further provided with a connector assembly 394 for connecting the first end portion 390 of the sheet of flexible material 382 to the second end portion 392 of the sheet of flexible material 382 when the sheet of flexible material 382 is formed into the shape-sustaining support member 372.

The connector assembly 394 comprises a first strip of cohesive 396 disposed along an upper surface 398 of the sheet of flexible material 382 such that the first strip of cohesive 396 is disposed substantially adjacent the upper side 384 of the sheet of flexible material and extends a substantial portion of the distance between the centrally disposed recess 386 formed in the upper side 384 of the sheet of flexible material 382 and the first end portion 396 thereof. The connector assembly 394 further comprises a second strip of cohesive 400 disposed on the upper surface 398 of the sheet of flexible material 382 such that the second strip of cohesive 400 is disposed substantially adjacent the upper side 384 of the sheet of flexible material 382 and extends a substantial portion of the distance between the centrally disposed recess 386 formed in the upper side 384 of the sheet of flexible material 382 and the second end portion 392 thereof. Thus, when the first end portion 390 of the sheet of flexible material 382 is disposed over the second end portion 392 of the sheet of flexible material 382 and the first and second strips of cohesive 396 and 400 are brought into bonding engagement, the sheet of flexible material 382 is formed and secured in a substantially frustoconical shape-sustaining member 401 substantially as shown in FIG. 32 wherein the portions of the first and second end portions 390 and 392 of the sheet of flexible material 382 are bondingly connected by the first and second strips of cohesive 396 and 400 and extend outwardly therefrom to form a flap portion 402 substantially as shown in FIG. 32. To secure the outwardly extending flap portion 402 to the peripheral sidewall 378 of the shape-sustaining support member 372, the connector assembly 394 further comprises a strip of adhesive 404 disposed along a lower surface 406 of the sheet of flexible material 382 so as to be spatially disposed from the second strip of cohesive 400, substantially as shown in FIG. 31. Thus, when the flap 402 is moved adjacent a portion of the peripheral side wall 378 of the shape-sustaining support member 372, the adhesive 404 bondingly connects the flap 402 to the adjacently disposed portion of the peripheral sidewall 378 of the shape-sustaining support member 372 to provide the shape-sustaining support member 372 with the configuration shown in FIG. 30.

Referring now to FIGS. 33 and 34, another embodiment of a floral holding material 450 is shown. The floral holding material 450, when wrapped with a sheet of fluid impermeable material, provides a flexible vase similar to the flexible vase 120 shown in FIG. 14. The floral holding material 450 comprises a shape-sustaining support member 452 having an open upper end 454, an open lower end 456 and a peripheral sidewall 458 defining an internal chamber 460 extending between the open upper end 454 and the open lower end 456. A plurality of pleats 461 are formed in the peripheral sidewall 458 of the shape-sustaining support member 452. The pleats 461 extend from the open upper end 454 of the shape-sustaining support member 452 and terminate a distance from the open lower end 456 of the shape-sustaining support member 452.

The shape-sustaining support member 452 is fabricated of a sheet of flexible material 462 (FIG. 34) which has sufficient flexibility to permit the sheet of flexible material 462 to be formed into the shape-sustaining support member 452, sufficient strength to provide the required shape-sustaining properties to the shape-sustaining support member 452, and sufficient water-resistance to prevent deterioration of the shape-sustaining support member 452 when the shape-sustaining support member 452 is contacted with a fluid, such as water. The thickness of the sheet of flexible material 462 can vary widely, the only requirement being that the sheet of flexible material 462 have sufficient strength and flexibility to satisfy the above requirements.

The sheet of flexible material 462 has an upper side 464 having a centrally disposed recess 466, a lower side 468, a first end portion 470 and a second end portion 472 which cooperate to provide the sheet of flexible material 462 with a substantially semi-circular configuration. A plurality of score lines 474 are formed in one surface, such as an upper surface 478 of the sheet of flexible material 462, and extend radially from the centrally disposed recess 466 formed in the upper side 464 of the sheet of flexible material 462 in the direction of the first end portion 470, the lower side 468 and the second end portion 472 substantially as shown. The score lines 474 permit the formation of the pleats 461 in the peripheral sidewall 458 of the shape-sustaining support member 452 by permitting portions of the peripheral sidewall 458 of the shape-sustaining support member 452 to be folded over an adjacently disposed portion of the peripheral sidewall 458. Thus, by forming pleats 461 in the peripheral sidewall 458 of the shape-sustaining support member 452, the diameter of the open upper end 454 can be selectively reduced, if desired. The pleats 461 formed in the peripheral sidewall 458 of the shape-sustaining support member 452 can be secured in a stable position by cohesive disposed along each side of the score lines 474 provided in the sheet of flexible material 462 such that when the pleats 461 are made by folding the sheet of flexible material 462 along the score lines 474, the pleats 461 are bondingly connected to an underlying portion of the peripheral sidewall 458 of the shape-sustaining support member 452. It should be understood that the bonding of the pleats 461 to the underlying portion of the peripheral sidewall 458 of the shape-sustaining support member 452 can be achieved in any suitable manner, such as with tape, staples, or any other connecting means well known in the art.

The sheet of flexible material 462 is further provided with a connector assembly 480 for connecting the first end portion 470 of the sheet of flexible material 462 to the second end portion 472 of the sheet of flexible material 462 so as to form the shape-sustaining support member 452 substantially as shown in FIG. 33. The connector assembly 480 comprises a male connector 482 and a plurality of female connectors 484. The male connector 482 extends from the upper side 464 of the sheet of material 462 so as to be disposed in close proximity to the first end portion 470 of the sheet of flexible material 462; and the plurality of female connectors 484 are formed in the second end portion 472 of the sheet of flexible material 462 substantially as shown. The female connectors 484 are spatially disposed along the second end portion 472 of the sheet of flexible material 462 such that at least one female connector 484 is adapted to matingly receive the male connector 482 and thereby connect the first end portion 470 of the sheet of flexible material 462 to the second end portion 472 and thus provide the shape-sustaining support member 452 shown in FIG. 33.

The male connector 482 is provided with a shank portion 486 and a substantially arrow-shaped head portion 488. As previously stated, the female connectors 484 are spatially disposed along the second end portion 472 of the sheet of flexible material 462 so that each of the female connectors 484 can be aligned with the male connector 482 when the first end portion 470 of the sheet of flexible material 462 is disposed over the second end portion 472 of the sheet of flexible material 462 during formation of the shape-sustaining support member 452. Thus, upon inserting the head portion 488 of the male connector 482 through a selected female connector 484, the circumferential dimensions of the shape-sustaining support member 452 can be varied.

While the sheet of flexible material 462 has been illustrated as having only one male connector 482, it should be understood that a plurality of male connectors 482 could be disposed along the upper side 464 of the sheet of flexible material 462 so as to extend between the centrally disposed recess 466 formed in the upper side 464 of the sheet of flexible material 462 and the first end portion 470 of the sheet of flexible material 462. Further, the configuration of the male connector 482 can vary widely, the only requirement being that the male connector 482 be adapted to matingly engage and be connected to the female connectors 484 so that the first end portion 470 of the sheet of flexible material 462 can be securely connected to the second end portion 472 of the sheet of flexible material 462 to form the shape-sustaining support member 452 depicted in FIG. 33.

Referring now to FIG. 35, another embodiment of a floral holding material 490 is shown. The floral holding material 490, when wrapped with a sheet of fluid impermeable material as hereinbefore described, provides a flexible vase having a substantially rectangular configuration. The floral holding material 490 comprises a shape-sustaining support member 492 having a partially open upper end 494, an open lower end 496 and a plurality of sidewalls 498 defining an internal chamber 500 extending between the partially open upper end 494 and the open lower end 496. It should be noted that while the shape-sustaining support member 492 has been illustrated as having four sidewalls 498, the number of sidewalls 498 can vary and the number of sidewalls 498 will determine the geometric configuration of the shape-sustaining support member 492. For example, if the shape-sustaining support member is provided with three sidewalls, the shape-sustaining support member will have a substantially triangular configuration; whereas if the shape-sustaining support member is provided with five sidewalls, the shape-sustaining support member will have a substantially pentagonal configuration. The shape-sustaining support member 492 is further provided with a plurality of substantially triangular shaped tabs 502 disposed along the open upper end 494 which, when pressed inwardly as shown, stabilize a floral arrangement, such as cut flowers, within the internal chamber 500 formed within the shape-sustaining support member 492.

Referring more specifically to FIG. 36, the shape-sustaining support member 492 is fabricated of a sheet of flexible material 504 which has sufficient flexibility to be formed into the shape-sustaining support member 492, sufficient strength to provide the required shape-sustaining properties to the shape-sustaining support member 492 and sufficient water resistance to prevent deterioration of the shape-sustaining support member 492 when contacted with a fluid, such as water. The thickness of the sheet of flexible material 504 can vary widely, the only requirement being that the sheet of flexible material 504 have sufficient strength and flexibility to satisfy the above requirements.

The sheet of flexible material 504 has an upper side 506, a lower side 508, a first end portion 510 and a second end portion 512. The plurality of triangular tabs 502 extend from the upper side 506 of the sheet of flexible material 504 substantially as shown. The substantially triangularly shaped tabs 502 are provided with a plurality of spatially disposed apertures 513 so that when the sheet of flexible material 504 is formed into the shape-sustaining support member 492 and the tabs 502 are pressed inwardly into the open upper end 496 of the shape-sustaining member 492, the stem portion of a floral grouping (not shown) can be disposed through the apertures 513. A score line 514 is provided along the upper side 506 of the sheet of flexible material 504 so as to be disposed between the upper side 506 of the sheet of flexible material 504 and the triangularly shaped tabs 502 for permitting the triangularly shaped tabs 502 to be pressed inwardly into the open upper end 496 of the shape-sustaining member 492 substantially as shown in FIG. 35. The triangularly shaped tabs 502 may be provided with a plurality of floral grouping receiving openings 513 for stabilizing a floral grouping disposed therethrough relative to the shape-sustaining support member 492. In addition, the sheet of flexible material 504 is provided with three vertically extending score lines 516 for permitting the sheet of flexible material 504 to be folded to form the sidewalls 498 of the shape-sustaining support member 492.

The sheet of flexible material 504 is further provided with a connector assembly 518 for connecting the first end portion 510 of the sheet of flexible material 504 to the second end portion 512 thereof so as to form the shape-sustaining support member 492. The connector assembly 518 extends along at least a portion of the first end portion 510 so as to be disposed substantially adjacent an edge thereof and is adapted to connect to the second end portion 512 of the sheet of flexible material 504 to form the shape-sustaining support member 492. Any suitable means can be employed as the connector assembly 518, including the connecting assemblies heretofore described. However, especially desirable results can be obtained wherein the connector assembly 518 is a strip of adhesive 520 which extends along the first end portion 510 of the sheet of flexible material 504 between the upper side 506 and the lower side 508 thereof substantially as shown. It should be understood that while the connector assembly 518 has been shown as a strip of adhesive 520 extending between the upper side 506 and the lower side 508 of the sheet of flexible material 504, the adhesive can be in the form of spaced apart strip segments, dots, or any other geometrical configuration. The only requirement of the bonding material or any other suitable connector assembly employed in combination with the sheet of flexible material 504 is that the bonding material or connector assembly be adapted to securely connect the second end portion 512 to the first end portion 510 of the sheet of flexible material 504 to form the shape-sustaining support member 492.

Referring now to FIGS. 37 and 38, another embodiment of a floral holding material 530 is shown. The floral holding material 530 can be wrapped with a sheet of the fluid impermeable material, such as the sheet of fluid impermeable material 62 hereinbefore described, to provide a flexible vase similar to the flexible vase 60 in the manner hereinbefore described. The floral holding material 530 comprises a preformed shape-sustaining support member 532 having an open upper end 534, an open lower end 536 and a peripheral sidewall 538 defining an internal chamber 540 extending between the open upper end 534 and the open lower end 536. A plurality of score lines, such as score lines 542 and 544, are formed in the peripheral sidewall 538 and extend between the open upper end 534 and the open lower end 536 of the preformed shape-sustaining support member 532. The score lines 542 and 544 permit a portion of the peripheral sidewall 538 of the preformed shape-sustaining support member 532 to be folded over an adjacently disposed portion of the peripheral sidewall 538 substantially as shown in FIG. 38 to reduce the diameter of the open upper end 534 the open lower end 536 and the internal chamber 540 of the preformed shape-sustaining support member 532. The overlapped portion or pleat 546 formed in the peripheral sidewall 538 can then be secured in a stable position by strips of cohesive 548 disposed along each side of the score lines 542 and 544 provided in the peripheral sidewall 538 of the preformed shape-sustaining support member 532. It should be understood that the bonding of the overlapped portion or pleat 546 formed in the peripheral sidewall 538 of the preformed shape-sustaining support member 532 to the underlying portion of the peripheral sidewall 538, while being illustrated with the use of strips of cohesive, can be achieved in any suitable manner, such as with an adhesive, tape, staples, or any other connecting means well known in the art.

Referring now to FIG. 39, another embodiment of a floral holding material 550 for use in forming a flexible decorative vase is illustrated. The floral holding material 550 comprises a preformed shape-sustaining support member 552 having an open upper end 554, an open lower end 556 and a peripheral sidewall 558 defining an internal chamber 560 extending between the open upper end 554 and the open lower end 556. Because the preformed shape-sustaining support member 552 is formed of a substantially rigid material, creases 562 and 564 are formed in the peripheral sidewall 558 of the preformed shape-sustaining support member 552 when the preformed shape-sustaining support member 552 is flattened for transportation and storage substantially as shown in FIG. 40. Since it is desirable to expand the preformed shape-sustaining support member 552 to its substantially original configuration for use in the construction of a flexible vase, and because creases 562 and 564 are formed in the peripheral sidewall 558 of the preformed shape-sustaining support member 552, it is necessary to provide a mechanism 565 for stabilizing the preformed shape-sustaining support member 552 in its expanded configuration when the preformed shape-sustaining support member 552 has been flattened for transportation and storage.

The mechanism 565 comprises an elastic member, such as an elastic band 566, which is attached to the preformed shape-sustaining support member 552 substantially adjacent the open lower end 556 thereof so as to extend between the creases 562 and 564 formed in the peripheral sidewall 558 of the preformed shape-sustaining member 552 substantially as shown. Since the preformed shape-sustaining support member 552 is in its normal expanded condition prior to flattening, the elastic band 566 is placed under tension or stretched during flattening of the preformed shape-sustaining support member 552. Thus, when it is desired to use the flattened preformed shape-sustaining support member 552, one merely removes the preformed shape-sustaining support member 552 from its shipping or storage carton (not shown) and allows the elastic band 566 to contract or resume its unstretched condition whereby the flattened preformed shape-sustaining support member 552 is moved to its original configuration substantially as shown in FIG. 39.

Figure 41:
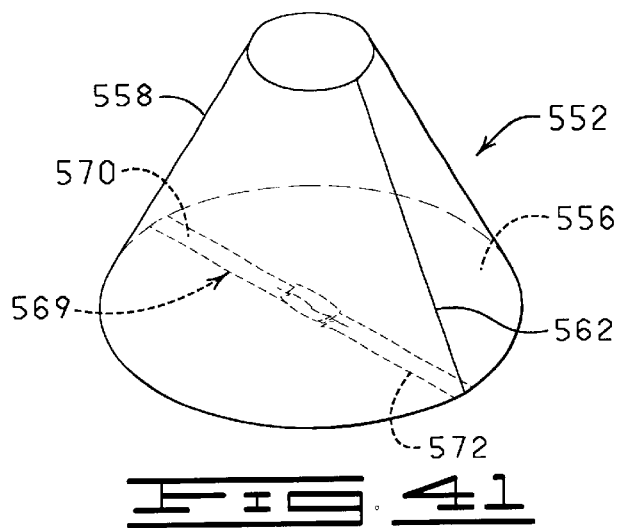
FIG. 41 is a perspective view of another embodiment of a preformed floral holding material in an expanded condition having a strap assembly for maintaining the preformed floral holding material in the expanded condition.
Figure 42:
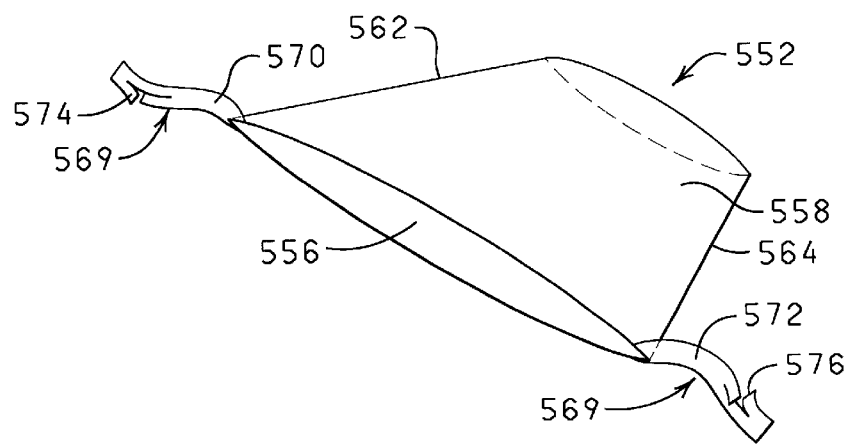
FIG. 42 is a perspective view of the preformed floral holding material of FIG. 41 in a flattened condition for storage and transportation.

Referring now to FIGS. 41 and 42, another embodiment of a mechanism 569 for stabilizing the preformed shape-sustaining support member 552 in its expanded configuration is illustrated. In this embodiment, a first tab 570 having a length greater than the radius of the open lower end 556 of the preformed shape-sustaining support member 552 is connected to a portion of the peripheral sidewall 558 of the preformed shape-sustaining support member 552 so as to be substantially adjacent the open lower end 556 of the preformed shape-sustaining support member 552; and a second tab 572, also having a length greater than the radius of the open lower end 556 of the preformed shape-sustaining support member 552 is connected to a portion of the peripheral sidewall 558 of the preformed shape-sustaining support member 552 so as to be disposed opposite the first tab 570 and substantially adjacent the open lower end 556 of the preformed shape-sustaining support member 552 substantially as shown. When assembling the preformed shape-sustaining support member 552 for use, one applies sufficient pressure along the creases 562 and 564 formed in the peripheral sidewall 558 of the preformed shape-sustaining support member 552 so that the preformed shape-sustaining support member 552 is moved from the flattened storage position (FIG. 42) to an original expanded position (FIG. 41). Thereafter, the first and second tabs 570, 572, which are provided with connectors 574 and 576, respectively, can be interconnected via the connectors 574 and 576 so that the preformed shape-sustaining support member 552 is maintained in a configuration substantially as shown in FIG. 41.

Figure 43:
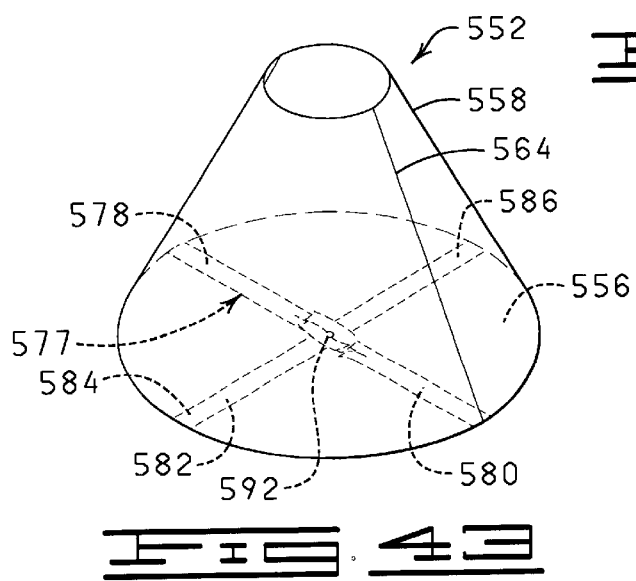
FIG. 43 is a perspective view of the preformed floral holding material of FIG. 41 having another embodiment of a strap assembly for maintaining the preformed floral holding material in an expanded condition.

Referring now to FIGS. 43 and 44, another embodiment of a mechanism 577 for stabilizing the preformed shape-sustaining support member 552 in its expanded configuration is illustrated. In this embodiment, a first tab 578 having a length greater than the radius of the open lower end 556 of the preformed shape-sustaining support member 552 is connected to the peripheral sidewall 558 of the preformed shape-sustaining support member 552 so as to be substantially adjacent the open lower end 556 of the preformed shape-sustaining support member 552; and a second tab 580, also having a length greater than the radius of the open lower end 556 of the preformed shape-sustaining support member 552 is connected to the peripheral sidewall 558 of the preformed shape-sustaining support member 552 so as to be substantially adjacent the open lower end 556 of the preformed shape-sustaining support member 552 substantially as shown.

The mechanism 577 for stabilizing the preformed shape-sustaining support member 552 further includes a strip of substantially non-elastic material 582 having a length substantially equal to the diameter of the open lower end 556 of the preformed shape-sustaining support member 552. The strip of material 582 is connected at one end 584 to the peripheral sidewall 558 of the preformed shape-sustaining support member 552 so as to be disposed between the creases 562 and 564; and an opposed second end 586 of the strip of material 582 is connected to the peripheral sidewall 558 of the preformed shape-sustaining support member 552 between the creases 562 and 564. Thus, the strip of material 582 is substantially normally disposed to the first and second tabs 578 and 580 substantially as shown. The first and second tabs 578 and 580 are provided with connectors 588, 590, respectively, so that the first and second tabs 578 and 580 can be connected via the connectors 588 and 590 when the preformed shape-sustaining support member 552 is moved from its substantially flattened storage position (FIG. 44) to the expanded position (FIG. 43). Thereafter, the interconnected first and second tabs 578 and 580 are connected to a medial portion of the strip of material 582 by a connector 592 illustrated by phantom line in FIG. 43.

Referring now to FIGS. 45 and 46, another embodiment of a floral holding material 594 for use in forming the flexible decorative vase is illustrated. The floral holding material 594 comprises a preformed shape-sustaining support member 596 having an open upper end 598, an open lower end 600 and a peripheral sidewall 602 defining an internal chamber 604 extending between the open upper end 598 and the open lower end 600. Because the preformed shape-sustaining support member 596 is formed of a substantially rigid material, creases 606 and 608 are formed in the peripheral sidewall 602 of the preformed shape-sustaining support member 596 when the preformed shape-sustaining support member 596 is flattened for transportation and storage substantially as shown in FIG. 46. Since it is desirable to expand the preformed shape-sustaining support member 596 to its substantially original configuration for use in the construction of the flexible vase, and because creases 606 and 608 are formed in the peripheral sidewall 602 of the preformed shape-sustaining support member 596, it is necessary to provide a mechanism 610 for stabilizing the preformed shape-sustaining support member 596 in its expanded configuration when the preformed shape-sustaining support member 596 has previously been flattened for transportation and storage.

The mechanism for stabilizing the preformed shape-sustaining support member 596 in its expanded configuration is illustrated as comprising a plurality of ring members 612 and 614. In this embodiment, when it is desirable to assemble the preformed shape-sustaining support member 596 by selectively moving the preformed shape-sustaining support member 596 from a flattened storage position (FIG. 46) to an expanded position for use as a floral holding material (FIG. 45), the preformed shape-sustaining support member 596 is expanded and thereafter the ring member 612 is positioned adjacent the peripheral sidewall 602 of the preformed shape-sustaining support member 596 so as to be disposed near the open lower end 600 of the preformed shape-sustaining support member 596 and the ring member 614 is positioned adjacent the peripheral sidewall 602 of the preformed shape-sustaining support member 596 so as to be disposed near the open upper end 598 of the preformed shape-sustaining support member 596 substantially as shown in FIG. 45. The ring members 612 and 614 can be stabilized along the peripheral sidewall 602 of the preformed shape-sustaining support member 596 by any suitable means, such as by frictional engagement or by application of an adhesive or cohesive. If desired, the ring members 612 and 614 can be used in conjunction with the mechanisms 565, 569 and 577 hereinbefore described for stabilizing the preformed shape-sustaining support member 552 in the expanded position.

Referring now to FIGS. 47 and 48, another embodiment of a floral holding material 620 is illustrated. The floral holding material 620 comprises a preformed shape-sustaining support member 622 having an open upper end 624, an open lower end 626 and a peripheral sidewall 628 defining an internal chamber 630 extending between the open upper end 624 and the open lower end 626. Because the preformed shape-sustaining support member 622 is formed of a substantially rigid material, creases 632 and 634 are formed in the peripheral sidewall 628 of the preformed shape-sustaining support member 622 when the preformed shape-sustaining support member 622 is flattened for transportation and storage substantially as shown in FIG. 48. Since it is desirable to expand the preformed shape-sustaining support member 622 to its substantially original configuration for use in the construction of a flexible vase, and because the creases 632 and 634 formed in the peripheral sidewall 628 of the preformed shape-sustaining support member 622 tend to distort the expanded configuration of the preformed shape-sustaining support member 622, it is necessary to provide a mechanism 636 for stabilizing the preformed shape-sustaining support member 622 in its expanded configuration.

The mechanism 636 for stabilizing the preformed shape-sustaining support member 662 in its expanded configuration comprises a locking tab 638 formed in the peripheral sidewall 628 of the preformed shape-sustaining support member 622 which is selectively movable into a portion of the internal chamber 630 defined by the peripheral sidewall 628 of the preformed shape-sustaining support member 622.

The locking tab 638 is formed by providing a pair of substantially parallel horizontally disposed slits 640 and 642 formed in the peripheral sidewall 628 of the preformed shape-sustaining support member 622. Thus, when the preformed shape-sustaining support member 622 is expanded from a flattened storage position (FIG. 48) to an expanded position for use as the floral holding material 620, the locking tab 638 is forced inwardly into the internal chamber 630 of the preformed shape-sustaining support member 622 so as to stabilize the preformed shape-sustaining support member 622 in its expanded position substantially as shown in FIG. 47.

Referring now to FIGS. 49 and 50, a floral holding material 650 for use in forming a flexible decorative vase is illustrated. The floral holding material 650 comprises a preformed shape-sustaining support member 652 having an open upper end 654, an open lower end 656 and a peripheral sidewall 658 defining an internal chamber 660 extending between the open upper end 654 and the open lower end 656. Because the preformed shape-sustaining support member 652 is formed of a substantially rigid material, creases 662 and 664 are formed in the peripheral sidewall 658 of the preformed shape-sustaining support member 652 when the preformed shape-sustaining support member 652 is flattened for transportation and storage substantially as shown in FIG. 50. Since it is desirable to expand the preformed shape-sustaining support member 652 to its substantially original configuration for use as the floral holding material 650, and especially when used in the construction of a flexible vase, and because creases 662 and 664 are formed in the peripheral sidewall 658 of the preformed shape-sustaining support member 652, it is necessary to provide a mechanism 665 for stabilizing the preformed shape-sustaining support member 652 in its expanded configuration.

As shown in FIG. 50, a circumferentially disposed groove 668 is formed in the peripheral sidewall 658 of the preformed shape-sustaining support member 652 so as to be disposed substantially intermediate the open upper end 654 and the open lower end 656 of the preformed shape-sustaining support member 652. An elastomeric member 670 (FIG. 49) is positioned within the groove 668 for stabilizing the preformed shape-sustaining support member 652 in its normal expanded position. It should be noted that while the groove 668 has been shown as being disposed substantially intermediate the open upper end 654 and the open lower end 656 of the preformed shape-sustaining support member 652, the groove 668 can be formed in the peripheral sidewall 658 of the preformed shape-sustaining support member 652 at a variety of positions. Further, if desired, more than one groove 668 can be formed in the peripheral sidewall 658 of the preformed shape-sustaining support member 652 and the number of elastomeric members 670 will correspond to the number of grooves 668 formed therein.

Referring now to FIG. 51, another embodiment of a floral holding material 674 is illustrated. The floral holding material 674 comprises a preformed shape-sustaining support member 676 having an open upper end 678, an open lower end 679, a peripheral sidewall 680 defining an internal chamber (not shown) which extends between the open upper end 678 and the open lower end 679. The preformed shape-sustaining support member 676 is thus substantially identical in construction to the preformed shape-sustaining member 596 hereinbefore described with reference to FIGS. 45 and 46. Because the preformed shape-sustaining support member 676 is formed of a substantially rigid material, creases such as crease 682 are formed in the peripheral sidewall 680 of the preformed shape-sustaining support member 676 when the preformed shape-sustaining support member 676 is flattened for transportation and storage. Since it is desirable to expand the preformed shape-sustaining support member 676 to its substantially original configuration for use as the floral holding material 674, it is desirable to provide a mechanism 684 whereby the preformed shape-sustaining support member 676 can be stabilized in its original expanded configuration.

Thus, the preformed shape-sustaining support member 676 is provided with a substantially double frustoconical cone-shaped stabilizer 686 having an outwardly flared lower portion 688 and an outwardly flared upper portion 690. The outwardly flared lower portion 688 of the double frustoconical cone-shaped member 686 is disposed over a portion of the peripheral sidewall 680 of the preformed shape-sustaining support member 676 substantially adjacent the open upper end 678 thereof such that the outwardly flared upper portion 690 extends above and outwardly from the open upper end 678 of the preformed shape-sustaining support member 676 substantially as shown. Thus, the double frustoconical cone-shaped stabilizer 686, when disposed over an upper end portion of the peripheral sidewall 680 of the preformed shape-sustaining support member 676, stabilizes the preformed shape-sustaining support member 676 in its expanded position.

Referring now to FIGS. 52 and 53, a floral holding material 696 is illustrated. The floral holding material 696 comprises a preformed shape-sustaining member 698 having an open upper end 700, an open lower end 702 and a peripheral sidewall 704 defining an internal chamber 706 extending between the open upper end 700 and the open lower end 702. The preformed shape-sustaining support member 698 is formed of a substantially rigid member having sufficient memory such that the preformed shape-sustaining member 698 can be moved between a flattened condition (FIG. 53) and an expanded position (FIG. 52). Since it is desirable to flatten the preformed shape-sustaining member 698 for transportation and storage, and since the preformed shape-sustaining member 698 is formed of a material having sufficient memory to restore the preformed shape-sustaining support member 698 to its expanded position, a locking assembly 708 is provided for maintaining the preformed shape-sustaining support member 698 in a flattened condition during transportation and storage.

The locking assembly 708 comprises a male connector 710 and a female connector 712. The male connector 710 is disposed along a portion of the peripheral sidewall 704 so as to be opposite the position of the female connector 712 such that upon connecting the male connector 710 to the female connector 712, the preformed shape-sustaining member 698 is secured in a folded position substantially as shown in FIG. 53. The male connector 710 is illustrated as a lug or stud 714 which extends from the peripheral sidewall 704 of the preformed shape-sustaining member 698 and into the internal chamber 706 of the preformed shape-sustaining member 698. The female connector 712 is an aperture 716 formed in the peripheral sidewall 704 of the preformed shape-sustaining support member 698 and positioned so as to matingly receive the lug or stud 714 when the preformed shape-sustaining support member 698 is moved to its folded position.

Referring now to FIGS. 54 and 55, another embodiment of a floral holding material 720 is illustrated. The floral holding material 720 comprises a preformed shape-sustaining support member 722 having an open upper end 724, an open lower end 726 and a peripheral sidewall 728 defining an internal chamber 730 extending between the open upper end 724 and the open lower end 726. Because the preformed shape-sustaining support member 722 is formed of a substantially rigid material, creases 732 and 734 are formed in the peripheral sidewall 728 of the preformed shape-sustaining support member 722 when the preformed shape-sustaining support member 722 is flattened for transportation and storage substantially as shown in FIG. 55. Since it is desirable to expand the preformed shape-sustaining support member 722 to its substantially original configuration for use in the construction of a flexible vase, and because the creases 732 and 734 formed in the peripheral sidewall 728 of the preformed shape-sustaining support member 722 tend to distort the expanded configuration of the preformed shape-sustaining support member 722, it is desirable to provide a mechanism 736 for stabilizing the preformed shape-sustaining support member 722 in its desired expanded configuration.

The mechanism 736 for stabilizing the preformed shape-sustaining support member 722 in the expanded configuration (FIG. 54) comprises a first tab 738 formed in the peripheral sidewall 728 of the preformed shape-sustaining support member 722 and a second tab 740 formed in the peripheral sidewall 728 of the preformed shape-sustaining support member 722 such that the first and second tabs 738 and 740 are laterally aligned, and a distal end 742 of the first tab 738 and a distal end 744 of the second tab 740 terminate at the crease 734 formed in the peripheral sidewall 728 of the preformed shape-sustaining member 722. That is, the first tab 738 is defined by a pair of substantially parallel, horizontally disposed slits 746 and 748 and a substantially vertically disposed slit (not shown) in the peripheral sidewall 738 of the preformed shape-sustaining support member 722; and the second tab 740 is defined by a pair of substantially parallel, horizontally disposed slits 752 and 754 and the substantially vertically disposed slit (not shown).

When assembling the preformed shape-sustaining support member 722 for use, one applies sufficient pressure along the creases 732 and 734 formed in the peripheral sidewall 728 of the preformed shape-sustaining support member 722 so that the preformed shape-sustaining support member 722 is moved from the flattened storage position (FIG. 55) to an expanded position (FIG. 54). Thereafter, the first and second tabs 738 and 740, which are provided with, connectors (i.e., slits) 752 and 754 near their respective distal ends 742 and 744, can be interconnected via the connectors 752 and 754 so that the preformed shape-sustaining support member 722 is secured in a configuration substantially as shown in FIG. 54.

Referring now to FIGS. 56–58, another embodiment of a floral holding material 760 is shown. The floral holding material 760 comprises a preformed shape-sustaining support member 762 having an open upper end 764, an open lower end 766 and a peripheral sidewall 767 defining an internal chamber 768 extending between the open upper end 764 and the open lower end 766. Because the preformed shape-sustaining support member 762 is formed of a substantially rigid material, creases 770 and 772 are formed in the peripheral sidewall 767 of the preformed shape-sustaining support member 762 when the preformed shape-sustaining support member 762 is flattened for transportation and storage substantially as shown in FIGS. 57 and 58. Since it is desirable to expand the preformed shape-sustaining support member 762 to its substantially original configuration for use in the construction of a flexible vase, and because the creases 770 and 772 formed in the peripheral sidewall 766 of the preformed shape-sustaining support member 762 tend to distort the expanded configuration of the preformed shape-sustaining support member 762, it is necessary to provide a mechanism 774 for stabilizing the preformed shape-sustaining support member 762 in its desired expanded configuration.

The mechanism 774 for stabilizing the preformed shape-sustaining support member 762 in its expanded configuration comprises a locking tab 776 formed in the peripheral sidewall 767 of the preformed shape-sustaining support member 762.

The locking tab 776 is formed by a pair of substantially parallel horizontally disposed slits 778 and 780 and a substantially vertically disposed slit 782 formed in the peripheral sidewall 766 of the preformed shape-sustaining support member 762. The vertical slit 782 extending between the horizontally disposed slits 778, 780 is provided along the crease 772 formed in the peripheral sidewall 766 of the preformed shape-sustaining support member as a result of flattening the preformed shape-sustaining support member 762 for transportation and storage. A distal end 786 of the locking tab 776 is provided with a slit 788 formed near the distal end 786 of the locking tab 776 via one of an upper edge or a lower edge of the locking tab 776. A slit 790 is formed in the peripheral sidewall 766 of the preformed shape-sustaining support member 762 in close proximity to the crease 772; and the slit 790 is adapted to matingly receive the distal end 786 of the locking tab 776 so that the slit 788 formed near the distal end 786 of the locking tab 776 can be matingly engaged and secured to the peripheral sidewall 776 adjacent the slit 790 substantially as shown. Thus, to stabilize the preformed shape-sustaining support member 762 in its substantially original configuration for use in the construction of a flexible vase as shown in FIG. 56, the locking tab 776 is positioned across a portion of the internal chamber 768 adjacent the slot formed by formation of the locking tab 776 and the distal end 786 is positioned through the slit 790 such that the locking tab 776 is connected to the portion of the peripheral 766 adjacent the slit 790 substantially as shown.

Referring now to FIGS. 59 and 60, a floral holding material 800 is shown. The floral holding material 800 comprises a preformed shape-sustaining support member 802 having an open upper end 804, an open lower end 806 and a peripheral sidewall 808 defining an internal chamber 810 extending between the open upper end 804 and the open lower end 806. A plurality of circumferentially extending perforations 812 are formed in the peripheral sidewall 808 of the preformed shape-sustaining support member 802 so as to be spatially disposed relative to each other and from the open upper end 804 of the preformed shape-sustaining support member 802 substantially as shown. Thus, the overall height of the preformed shape-sustaining support member 802 can readily be reduced by tearing or cutting the preformed shape-sustaining support member 802 along a selected one of the circumferentially extending perforations 812.

Figure 61:
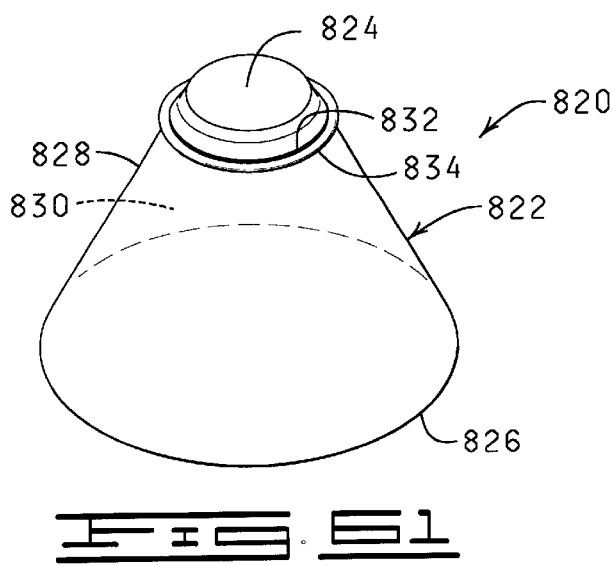
FIG. 61 is a perspective view of another embodiment of a preformed floral holding material constructed in accordance with the present invention.
Figure 62:
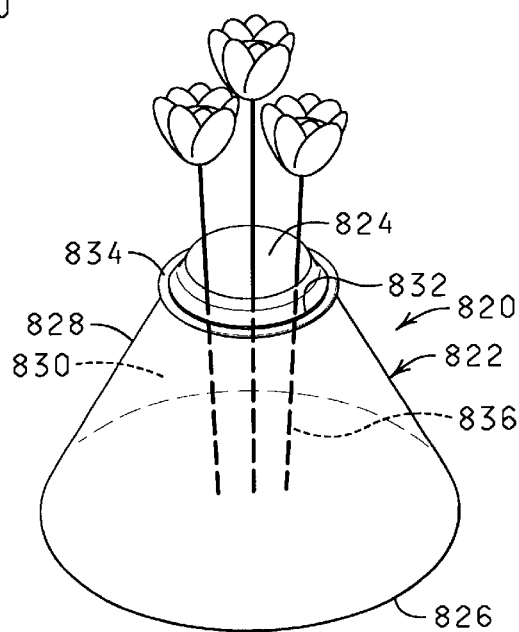
FIG. 62 is a perspective view of the preformed floral holding material of FIG. 61 showing a floral grouping disposed therein.
Figure 63:
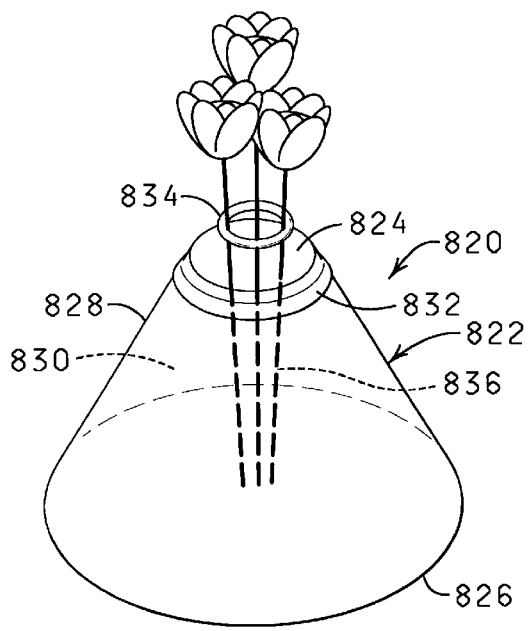
FIG. 63 is a perspective view of the preformed floral holding material of FIG. 61 showing a floral grouping disposed therein and having an elastic band disposed about the floral grouping.

Referring now to FIGS. 61–63, another embodiment of a floral holding material 820 is illustrated. The floral holding material 820 comprises a preformed shape-sustaining support member 822 having an open upper end 824, an open lower end 826 and a peripheral sidewall 828 defining an internal chamber 830 extending between the open upper end 824 and the open lower end 826. A circumferentially disposed groove 832 is formed in the peripheral sidewall 828 so as to be disposed near the open upper end 824 of the preformed shape-sustaining support member 822. An elastic band 834, which is in a stretched condition, is positioned within the circumferentially disposed groove 832 substantially as shown in FIGS. 61 and 62.

When utilizing the floral holding material 820, stems 836 of a floral arrangement 838 are disposed into the internal chamber 830 of the preformed shape-sustaining support member 822 via the open upper end 824 of the preformed shape-sustaining support member 822. When the stems 836 of the floral arrangement 838 have been properly positioned, the elastic band 834 is removed from the circumferentially disposed groove 832 formed in the peripheral sidewall 828 of the preformed shape-sustaining member 822 and positioned about a portion of the stems 836 extending above the open upper end 824 of the preformed shape-sustaining support member 822 substantially as shown in FIG. 63. Because the elastic band 834 is in a stretched condition when disposed within the circumferentially disposed groove 832, contraction of the band 834 about the stems 836 of the floral arrangement 838 secures the floral arrangement 838 in a substantially stable position when a sheet of flexible material (not shown) is wrapped about the preformed shape-sustaining support member 822 in the manner hereinbefore described to provide a flexible vase.

Figure 64:
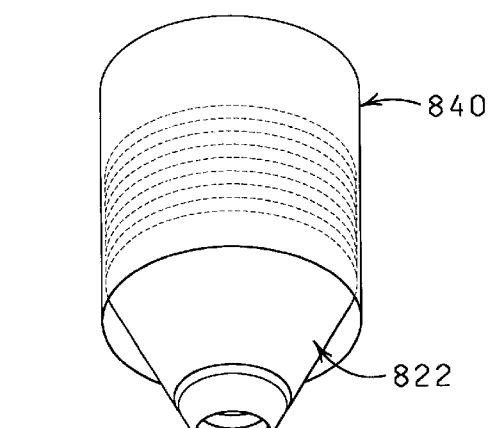
FIG. 64 is a perspective view of a dispenser containing a plurality of the preformed floral holding material of FIG. 61.

Referring now to FIG. 64, a plurality of preformed shape-sustaining support members, such as the preformed shape-sustaining support members 822 are illustrated supported in a dispenser 840 to facilitate storage of the preformed shape-sustaining support members 822, as well as to provide easy access to the preformed shape-sustaining support members 822. While the dispenser 840 is illustrated as containing the preformed shape-sustaining support members 822, it should be understood that any of the preformed shape-sustaining members hereinbefore described can likewise be disposed within a dispenser. Dispensers suitable for dispensing preformed shape-sustaining support members as hereinabove described are well known and have been used heretofore for dispensing cups. Thus, no further description of the dispenser 840 is believed necessary.

Referring now to FIG. 65, another embodiment of a floral holding material 842 which can be employed in the fabrication of a flexible vase as hereinbefore described is illustrated. The floral holding material 842 comprises a preformed shape-sustaining support member 844 having an open upper end 846, an open lower end (not shown) and a peripheral sidewall 848 defining an internal chamber 850 extending between the open upper end 846 and the open lower end (not shown). A plurality of apertures 852 are provided in the peripheral sidewall 848 so as to be disposed about the peripheral sidewall 848 substantially as shown. Each of the apertures 850 is adapted to receive a stem portion (not shown) of a floral grouping for stabilizing the floral grouping relative to the floral holding material 842.

Embodiment of FIGS. 66–68

Shown in FIG. 66 is an embodiment of a flexible vase 854 constructed in accordance with the present invention. The flexible vase 854 comprises a sheet of fluid impermeable material 856 wrapped about a floral holding material 858 and secured about the floral holding material 858 by a band 860. As will be more fully described in detail hereinafter, the sheet of fluid impermeable material 856 and the floral holding material 858 cooperate to define a reservoir 862 in the flexible vase 854. Thus, to store floral groupings, such as cut flowers 864 having stem portions 866 and bloom portions 868, the stem portions 866 of the cut flowers 864 are disposed into the reservoir 862 of the flexible vase 854 and the reservoir 862 is then filled with a suitable fluid, such as water.

The sheet of fluid impermeable material 856 may be of any shape, such as a rectangle as shown in FIGS. 67 and 68, or a square or any other geometric configuration. Further, the sheet of fluid impermeable material 856 may be constructed of a single layer of material or a plurality of layers of the same or different types of material as long as at least one of the sheets of material, preferably the sheet of material disposed substantially adjacent the floral holding material 858, is impermeable to a fluid, such as water. When utilizing more than one layer of material as the sheet of fluid impermeable material 856, the sheets of material may be connected together, laminated or maintained as separate sheets of material. The thickness of the sheet of fluid impermeable material 856 can vary widely, the only requirements being that the sheet of fluid impermeable material 856 have sufficient strength so that the flexible vase 854 formed from the floral holding material 858 and the sheet of fluid impermeable material 856 is capable of holding water disposed in the reservoir 862 of the flexible vase 854 and to permit the flexible vase 854 to be transported and displayed, and that the sheet of fluid impermeable material 856 be wrappable about the floral holding material 858 as described in detail hereinafter.

The sheet of fluid impermeable material 856 is disposed about the floral holding material 858 to form a decorative cover 870 about the floral holding material 858. The decorative cover 870 extends a distance above the floral holding material 858 such that an upper end portion 872 of the floral holding material 858 remains substantially uncovered by the decorative cover 870. Thus, when a floral grouping, such as cut flowers 864, is positioned within the reservoir 862 of the flexible vase 854, an upper portion of the stem portions 866 and the bloom portions 868 of the cut flowers 864 extend outwardly from the upper end portion 872 of the floral holding material 858.

A crimped portion 874 can be formed in the decorative cover 870 near the upper end portion 872 of the floral holding material 858. The crimped portion 874, which extends a distance inwardly, can be formed by crimping together portions of the decorative cover 870. The crimped portion 874 can also be formed by placing the band 860 about a portion of the decorative cover 870, in which case the band 860 gathers or brings together portions of the decorative cover 870 and pulls portions of the decorative cover 870 toward the upper end portion 872 of the floral holding material 858 to form the crimped portion 874 substantially as shown.

The sheet of fluid impermeable material 856 may also have a bonding material (not shown) disposed thereon for connecting adjacently disposed portions of the decorative cover 870 forming the crimped portion 874. More particularly, the bonding material may be disposed on at least one of an upper surface or a lower surface (not shown) of the sheet of fluid impermeable material 856 so as to be disposed a distance radially from a central portion of the sheet of fluid impermeable material 856. The bonding material, which is in the form of a continuous strip or spots or spaced apart strips or of any geometric design, is desirably a pressure sensitive adhesive or a cohesive. However, if desired, the crimped portion 874 of the decorative cover 870 could be connected by the use of heat sealing, a heat sealing lacquer which may be applied to the sheet of fluid impermeable material 856 and which requires heat to effect the bonding, or any other type of material which may be used to effect bonding of adjacently disposed portions of the decorative cover 870 defining the crimped portion 874.

Referring more specifically to FIGS. 67 and 68, the floral holding material 858 is a substantially frustoconical shape-sustaining support member 876 (FIG. 66) (which is also referred to herein as the shape-sustaining support member 876) formed of a sheet of flexible material 878 which has sufficient flexibility to permit the sheet of flexible material 878 to be formed into the shape-sustaining support member 876, which also has sufficient strength to provide the required shape-sustaining properties to the shape-sustaining support member 876 and which is sufficiently water resistant to prevent deterioration of the shape-sustaining support member 876 when contacted with a fluid, such as water. The shape-sustaining support member 876 formed from the sheet of flexible material 878 is identical in construction to the shape-sustaining support member 140 hereinbefore described with reference to FIG. 15. The sheet of flexible material 878 is disposed on the sheet of fluid impermeable material 856 in a preselected location such that, upon forming the sheet of flexible material 878 into the shape-sustaining support member 876, the shape-sustaining support member 876 is substantially centrally positioned on and secured to the sheet of fluid impermeable material 856.

The sheet of flexible material 878 has an upper side 880 having a centrally disposed recess 882, a lower side 884, a first end portion 886 and a second end portion 888 which cooperate to provide the sheet of flexible material 878 with a substantially semi-circular configuration. The sheet of flexible material 878 is connected to the sheet of fluid impermeable material 856 so that, upon forming the sheet of flexible material 878 into the shape-sustaining support member 876, the sheet of fluid impermeable material 856 can be easily wrapped about the shape-sustaining support member 876 to form the flexible vase 854. The lower side 884 of the sheet of flexible material 878 may be connected to the sheet of fluid impermeable material 856 by a strip of tape 890 or other suitable bonding means substantially as shown in FIG. 67, or the sheet of flexible material 878 may be connected to the sheet of fluid impermeable material 856 by an adhesive 892 disposed between the sheet of flexible material 878 and the sheet of fluid impermeable material 856 such that the adhesive 892 extends along a central portion of the sheet of flexible material 878 between the centrally disposed recess 882 formed in the upper side 880 of the sheet of flexible material 878 and the lower side 884 of the sheet of flexible material 878 as shown in FIG. 68.

The sheet of flexible material 878 is further provided with a connector assembly 894 for connecting the first end portion 886 of the sheet of flexible material 878 to the second end portion 888 of the sheet of flexible material 878 when the sheet of flexible material 878 is formed into the shape-sustaining support member 876. The connector assembly 894 comprises a male connector 896 disposed along the upper side 880 of the sheet of flexible material 878 and a plurality of female connectors 898 disposed in the second end portion 888 of the sheet of flexible material 878 such that at least one female connector 898 is adapted to matingly receive the male connector 896 and thereby connect the first end portion 886 of the sheet of flexible material 878 to the second end portion 888 of the sheet of flexible material 878 and thus provide the shape-sustaining support member 876.

Once the shape-sustaining support member 876 has been formed, the sheet of fluid impermeable material 856 is then extended about a peripheral sidewall (not shown) of the shape-sustaining support member 876 to provide the flexible vase 854 shown in FIG. 66.

Embodiment of FIGS. 69–70

Shown in FIG. 69 is an embodiment of a flexible vase 902 constructed in accordance with the present invention. The flexible vase 902 comprises a sheet of fluid impermeable material 904 wrapped about a floral holding material 906. As will be more fully described in detail hereinafter, the sheet of fluid impermeable material 904 and the floral holding material 906 cooperate to define a reservoir 908 in the flexible vase 902. Thus, to store floral groupings, such as cut flowers (not shown) stem portions of the cut flowers are disposed into the reservoir 908 of the flexible vase 902 and the reservoir 908 is then filled with a suitable fluid, such as water.

The sheet of fluid impermeable material 904 is shown as having a configuration of a square. However, it should be understood that the sheet of fluid impermeable material 904 may be of any shape such as a rectangle or any other geometric configuration. Further, the sheet of fluid impermeable material 904 may be constructed of a single layer of material or a plurality of layers of the same or different types of material as long as at least one of the sheets of material, preferably the sheet of material disposed substantially adjacent the floral holding material 906 is impermeable to a fluid, such as water. When utilizing more-than one layer of material as the sheet of fluid impermeable material 904, the sheets of material may be connected together, laminated or maintained as separate sheets of material. The thickness of the sheet of fluid impermeable material 904 can vary widely, the only requirements being that the sheet of fluid impermeable material 904 have sufficient strength so that the flexible vase 902 formed from the floral holding material 906 and the sheet of fluid impermeable material 904 is capable of holding water disposed in the reservoir 908 of the flexible vase 902.

The sheet of fluid impermeable material 904 is disposed about the floral holding material 906 to form a decorative cover 910 about the floral holding material 906. The decorative cover 910 extends a distance above the floral holding material 906 such that an upper end portion 912 of the floral holding material 906 remains substantially uncovered by the decorative cover 910.

A crimped portion 914 is formed in the decorative cover 910 generally above the floral holding material 906 substantially as shown in FIG. 69. The crimped portion 914 is formed by crimping together portions of the decorative cover 910 and the crimped portions 914 can be secured together by a bonding material, such as a plurality of strips of an adhesive or cohesive 916 as illustrated in FIG. 70.

Referring now to FIG. 70, the floral holding material 906 comprises a shape-sustaining support member 918 formed of a base 920 and a plurality of radially extending arms 922. The radially extending arms 922 are connected to the base 920 such that the radially extending arms 922 can be pivoted in an upward direction. For example, score lines 923 can be provided between the base 920 and the radially extending arms 922 to facilitate the desired pivotal movement of the radially extending arms 922. It should be understood that while the shape-sustaining support member 918 is illustrated as having four radially extending arms 922, the number of radially extending arms 922 can vary and the number of radially extending arms 922 will depend on the configuration of the flexible vase 902. That is, three or more radially extending arms 922 can be used in the formation of the shape-sustaining support member 918.

The base 920 and the radially extending arms 922 are formed of a flexible material, such as a plastic material, waterproof cardboard and the like. The base 920 and at least a portion of the radially extending arms 922 near a distal end portion 924 of the radially extending arms 922 are secured to the sheet of fluid impermeable material 904 so that the base 920 is substantially centrally disposed thereon. The sheet of fluid impermeable material 904 is gathered about the base 920 to provide an excess amount of the sheet of fluid impermeable material 904 about the base 920 such that when the radially extending arms 922 are moved to an upwardly extending position to provide the shape-sustaining support member 918 with a predetermined configuration, the excess of the sheet of fluid impermeable material 904 prevents the sheet of fluid impermeable material 904 from tearing or becoming disconnected from the radially extending arms 922. Once the radially extending arms 922 have moved to an upwardly extending position as shown in phantom in FIG. 69, a connector assembly 925 is connected to the distal end portion 924 of each of the radially extending arms 922 so that the radially extending arms 922 are interconnected and stabilized in the upright position.

The connector assembly 925 comprises a stud or shank 926 formed on the distal end portion 924 of each of the radially extending arms 922 and a flexible strap member 928 having a plurality of spatially disposed openings 930 formed therein such that, in a connected position, each of the studs or shanks 926 provided on the distal end portion 924 of the radially extending arms 922 are disposed in an opening 930 of the strap member 928.

To form the flexible vase 902 shown in FIG. 69, one selectively moves the radially extending arm 922 to a properly disposed position and thereafter secures the flexible strap member 928 to the studs 926 on the distal end portion 924 of each of the radially extending arms 922. By selectively moving the radially extending arms 922 in an upward position, the sheet of fluid impermeable material 904 is formed about the shape-sustaining support member 918 (i.e. the base 920 and the radially extending arms 922). The distal end portions 924 of the radially extending arms 922 are then interconnected by the flexible strap member 928 and the crimped portion 914 is formed in the decorative cover 910 by crimping together portions of the decorative cover 910 whereby the crimped portions 914 are secured together by the bonding material 916 disposed on the sheet of fluid impermeable material 904.

The bonding material 916 is shown in FIG. 70 as a plurality of arcuate shaped strips positioned on the sheet of fluid impermeable material 904 so as to be disposed in close proximity to the distal end portion 924 of each of the radially extending arms 922. However, it should be understood that the bonding material 916 can be in the form of a continuous strip as shown in FIG. 11, or as a plurality of spatially disposed spots.

Embodiment of FIGS. 71–72

Shown in FIG. 71 is another embodiment of a flexible vase 932 constructed in accordance with the present invention. The flexible vase 932 comprises a sheet of fluid impermeable material 934 wrapped about a floral holding material 936. The sheet of fluid impermeable material 934 and the floral holding material 936 cooperate to define a reservoir 938 in the flexible vase 932. Thus, to store floral groupings, such as cut flowers (not shown), stem portions of the cut flowers are disposed into the reservoir 938 of the flexible vase 932 and the reservoir 938 is then filled with a suitable fluid, such as water.

The sheet of fluid impermeable material 934 is shown as having a substantially square configuration. However, it should be understood that the sheet of fluid impermeable material 934 may be of any shape, such as a rectangle or any other geometric configuration. Further, the sheet of fluid impermeable material 934 may be constructed of a single layer of material or a plurality of layers of the same or different types of material as long as at least one of the sheets of material, preferably the sheet of material disposed adjacent the floral holding material 936, is impermeable to a fluid, such as water. When utilizing more than one layer of material as the sheet of fluid impermeable material 934, the sheets of material may be connected together, laminated or maintained as separate sheets of material. The thickness of the sheet of fluid impermeable material 934 can vary widely, the only requirements being that the sheet of fluid impermeable material 934 have sufficient strength so that the flexible vase 932 formed from the floral holding material 936 and the sheet of fluid impermeable material 934 is capable of holding water disposed in the reservoir 938 of the flexible vase 932.

The sheet of fluid impermeable material 934 is disposed about the floral holding material 936 to form a decorative cover 940 about the floral holding material 936. The decorative cover 940 extends a distance above the floral holding material 936 such that an upper end portion 942 of the floral holding material 936 remains substantially uncovered.

A crimped portion 944 is formed in the decorative cover 940 generally above the floral holding material 936 substantially as shown in FIG. 71. The crimped portion 944 is formed by crimping together portions of the decorative cover 940 formed of the sheet of fluid impermeable material 934 and the crimped portions 944 are secured together by a bonding material, such as an adhesive or cohesive 946 as illustrated in FIG. 72.

Referring now to FIG. 72, the floral holding material 936 comprises a shape-sustaining support member 948 formed of a base 950 and a plurality of substantially parabolically shaped radially extending arms 952. The radially extending arms 952 are connected to the base 950 such that the radially extending arms 952 can be pivoted in an upward direction. It should be understood that while the shape-sustaining support member 948 is illustrated as having four substantially parabolically shaped radially extending arms 952, the number of radially extending arms 952 can vary and the number of radially extending arms 952 will depend on the configuration of the flexible vase 932. That is, three or more substantially parabolically shaped radially extending arms 952 can be used in the formation of the shape-sustaining support member 948. The base 950 and the radially extending arms 952 are formed of a flexible shape-sustaining material, such as a plastic material, water-proof cardboard and the like. The base 950 and a distal end portion 954 of each of the radially extending arms 952 are secured to the sheet of fluid impermeable material 934 so that the base 950 is substantially centrally disposed thereon. The sheet of fluid impermeable material 934 is provided with a gathered portion 955 of the fluid impermeable material 940 between the base 950 and the distal end portions 954 of the radially extending arms 952 such that when the radially extending arms 952 are moved to an upwardly extending position during formation of the shape-sustaining support member 948, the excess of the sheet of fluid impermeable material 934 prevents the sheet of fluid impermeable material 934 from tearing or becoming disconnected from the radially extending arms 952. Once the radially extending arms 952 have been moved to an upwardly extending position as shown in phantom in FIG. 71, the sheet of fluid impermeable material 934 is crimped above the distal end portions 954 of the radially extending arms 952 such that the bonding material disposed on the sheet of fluid impermeable material 934 substantially adjacent the distal end portions 954 of the radially extending arms 952 bonds the crimped portion 944 and the distal end portions 954 of each of the radially extending arms 952 so as to secure the radially extending arms 952 in the desired upright position.

When it is desired to provide a stack of sheets of fluid impermeable material 934 having the shape-sustaining support member 948 disposed thereon in a non-assembled condition, one can readily utilize a release material disposed between each of the sheets of fluid impermeable material 934 forming the stack to ensure that the bonding material 946 does not adhere to an adjacently disposed sheet of fluid impermeable material 934 thereby enhancing removal of individual sheets of fluid impermeable material 934 from the stack of such materials.

Embodiment of FIGS. 73–74

Shown in FIG. 73 is another embodiment of a flexible vase 960 constructed in accordance with the present invention. The flexible vase 960 comprises a sheet of fluid impermeable material 962 wrapped about a floral holding material 964. As will be more fully described in detail hereinafter, the sheet of fluid impermeable material 962 and the floral holding material 964 cooperate to define a reservoir 968 in the flexible vase 960.

The sheet of fluid impermeable material 962 may be of any shape, such as a square as shown in FIG. 74, a rectangle, or any other geometric configuration. Further, the sheet of fluid impermeable material 962 may be constructed of a single layer of material or a plurality of layers of the same or different types of material as long as at least one of the sheets of material, preferably the sheet of material disposed adjacent the floral holding material 964, is impermeable to a fluid, such as water. When utilizing more than one layer of material as the sheet of fluid impermeable material 962, the sheets of material may be connected together, laminated or maintained as separate sheets of material. The thickness of the sheet of fluid impermeable material 962 can vary widely, the only requirements being that the sheet of fluid impermeable material 962 have sufficient strength so that the flexible vase 960 formed from the floral holding material 964 and the sheet of fluid impermeable material 962 is capable of holding water disposed in the reservoir 968 of the flexible vase 960 and to permit floral groups disposed in the flexible vase 960 to be transported and displayed, and that the sheet of fluid impermeable material 962 be wrappable about the floral holding material 964 as described in detail hereinafter.

While the sheet of fluid impermeable material 962 has been shown in FIG. 74 as a single sheet of material, it should be understood that a pad of sheets of fluid impermeable material 962 may be utilized to enhance assembly of a plurality of flexible vases 960, or a roll of fluid impermeable material 962 may be provided so that the sheets of fluid impermeable material 962 can readily be obtained by cutting a sheet of material from the roll of material or by providing perforations in the roll of material to facilitate removal of the sheet of fluid impermeable material 962.

Referring now to FIG. 74, the floral holding material 964 comprises a plurality of substantially triangularly shaped support members 972 secured to an upper surface 974 of the sheet of fluid impermeable material 962 with a suitable bonding material (not shown). The triangularly shaped support members 972 cooperate to provide the floral holding material 964 with a substantially square shaped outer periphery 976 which is disposed a distance 978 from an outer periphery 980 of the sheet of fluid impermeable material 962. Thus, a substantially square-shaped opening 982 is provided between the triangularly shaped support members 972.

To secure the triangularly shaped support members 972 in an upwardly extending position to provide the configuration of the flexible vase 960, a bonding material 984 is disposed on the upper surface 974 of the sheet of fluid impermeable material 962 so as to extend along a portion of a first and a second side 986 and 988 of the sheet of fluid impermeable material 962 and substantially adjacent a portion of the outer periphery 980 of the sheet of fluid impermeable material 962, and a distance 990 from the adjacently disposed triangularly shaped support members 972; and a bonding material 992 is disposed on the upper surface 974 of the sheet of fluid impermeable material 962 so as to extend along a portion of a third and fourth side 994 and 996 of the sheet of fluid impermeable material 962 and substantially adjacent a portion of the outer periphery 980 of the sheet of fluid impermeable material 962, and a distance 998 from the adjacently disposed triangularly shaped support members 972. The bonding material 984 and 992 permits the gathering of the portion of the sheet of fluid impermeable material 962 disposed above the triangularly shaped support members 972 when same are moved to an upwardly extending position to provide the floral holding material 964 of the flexible vase 960 substantially as shown in FIG. 73.

The bonding material 984 and 992 is desirably a cohesive. However, it should be understood that staples, brads, ribbons elastic bands, ties and the like can be used to secure the triangularly shaped support members 972 in the desired form of the floral holding material 964.

Figure 76:
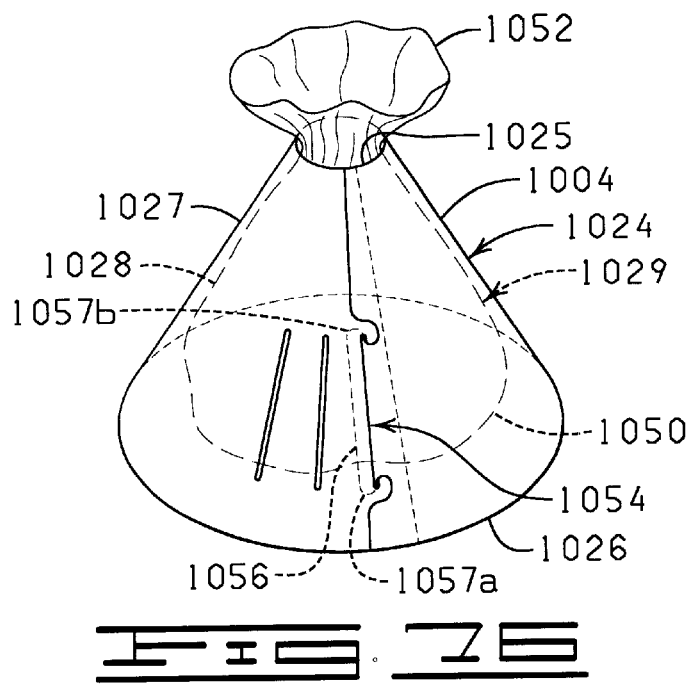
FIG. 76 is a perspective view of a shape-sustaining support member having a flexible bag disposed therein which, when wrapped with a sheet of material provides the flexible vase of FIG. 75.
Figure 77:
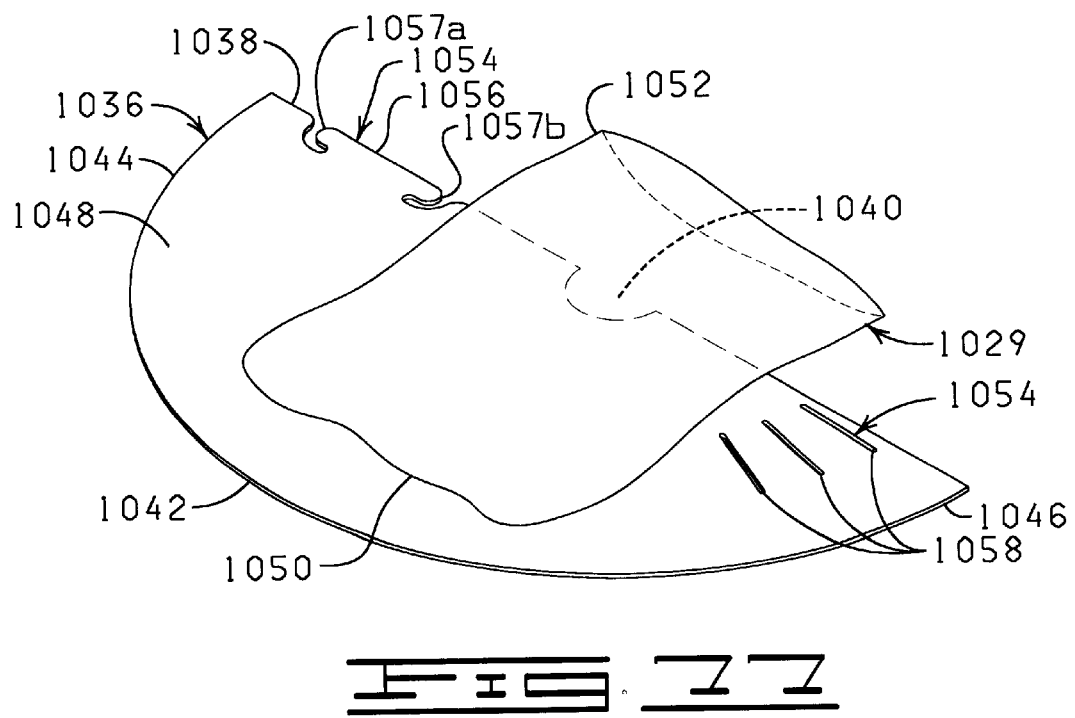
FIG. 77 is a perspective view of a sheet of flexible material for forming the shape-sustaining support member of FIG. 76, the sheet of flexible material having the flexible bag connected thereto.

Embodiment of FIGS. 75–77

Shown in FIG. 75 is another embodiment of a flexible vase 1000 constructed in accordance with the present invention. The flexible vase 1000 comprises a sheet of fluid impermeable material 1002 wrapped about a floral holding material 1004 and secured about the floral-holding material 1004 by a band 1006. As will be more fully described in detail hereinafter, the sheet of fluid impermeable material 1002 and the floral holding material 1004 cooperate to define a reservoir 1008 in the flexible vase 1000. Thus, to store floral groupings, such as cut flowers 1010 having stem portions 1012 and bloom portions 1014, the stem portions 1012 of the cut flowers 1010 are disposed into the reservoir 1008 of the flexible vase 1000 and the reservoir 1008 is then filled with a suitable fluid, such as water.

The sheet of fluid impermeable material 1002 which is substantially identical in construction as the sheet of fluid impermeable material 62 hereinbefore described in detail with reference to FIG. 11, is disposed about the floral holding material 1004 to form a decorative cover 1018 about the floral holding material 1004. The decorative cover 1018 extends a distance above the floral holding material 1004 such that an upper end portion 1020 of the floral holding material 1004 remains substantially uncovered by the decorative cover 1018. Thus, when a floral grouping such as cut flowers 1010 is positioned within the reservoir 1008 of the flexible vase 1000, an upper portion of the stem portions 1012 and the bloom portions 1014 of the cut flowers 1010 extend outwardly from the upper end portion 1020 of the floral holding material 1004.

A crimped portion 1022 can be formed in the decorative cover 1018 near the upper end portion 1020 of the floral holding material 1004. The crimped portion 1022 can be formed by crimping together portions of the decorative cover 1018. The crimped portion 1022 can also be formed by placing the band 1006 about a portion of the decorative cover 1018, in which case the band 1006 gathers or brings together portions of the decorative cover 1018 and pulls portions of the decorative cover 1018 toward the upper end portion 1020 of the floral holding material 1004 to form the crimped portion 1022 substantially as shown. The sheet of fluid impermeable material 1002 may also have a bonding material (not shown) disposed thereon for connecting adjacently disposed portions of the decorative cover 1018 forming the crimped portion 1022.

Referring more specifically to FIG. 76, the floral holding material 1004 comprises a substantially frustoconical shape-sustaining support member 1024 (also referred to herein as the shape-sustaining support member 1024). The shape-sustaining support member 1024 has an open upper end 1025, an open lower end 1026 and a peripheral sidewall 1027 defining an internal chamber 1028 extending between the open upper end 1025 and the open lower end 1026. The floral holding material 1004 further has a flexible bag 1029 disposed within the internal chamber 1028 of the shape-sustaining support member 1024, the flexible bag 1029 and the floral holding material 1004 together comprises a flexible vase 1000.

The shape-sustaining support member 1024 is fabricated of a sheet of flexible material 1036 (FIG. 77) which has sufficient flexibility to permit the sheet of flexible material 1036 to be formed into the shape-sustaining support member 1024 and which also has sufficient strength to provide the required shape-sustaining properties to the shape-sustaining support member 1024. The thickness of the sheet of flexible material 1036 can vary widely, the only requirements being that the sheet of flexible material 1036 have sufficient strength and flexibility to satisfy the above requirements. Examples of materials possessing the aboveidentified properties which may be used as the sheet of flexible material 1036 for fabrication of the shape-sustaining support member 1024 are polymeric materials, metals, cardboards and the like.

The sheet of flexible material 1036 has an upper side 1038 having a centrally disposed recess 1040, a lower side 1042, a first end portion 1044 and a second end portion 1046 which cooperate to provide the sheet of flexible material 1036 with a substantially semi-circular configuration. The flexible bag 1034 is desirably secured to an upper surface 1048 of the sheet of flexible material 1036 with a suitable bonding material such that when the sheet of flexible material 1036 is formed into the shape-sustaining support member 1024, a lower end or bottom wall 1050 of the flexible bag 1034 is substantially aligned with the open lower end 1028 of the shape-sustaining support member 1024 and an upper end portion 1052 of the flexible bag 1034 extends outwardly from the open upper end 1026 of the shape-sustaining support member 1024 substantially as shown in FIG. 76.

The sheet of flexible material 1036 is further provided with a connector assembly 1054 for connecting the first and second end portions 1044 and 1046 of the sheet of flexible material 1036 when the sheet of flexible material 1036 is formed into the shape-sustaining support member 1024 substantially as shown in FIG. 76. The connector assembly 1054 comprises a male connector 1056 disposed along the upper side 1038 of the sheet of flexible material 1036 and a plurality of female connectors 1058 formed in the second end portion 1046 of the sheet of flexible material 1036 such that at least one female connector 1058 is adapted to matingly receive the male connector 1056 and thereby connect the first end portion 1044 of the sheet of flexible material 1036 to the second end portion 1046 of the sheet of material 1036. The male connector 1056 has a first tab member 1057a and a second tab member 1057b.

The plurality of female connectors 1058 are illustrated as spatially disposed slits provided in the second end portion 1046 of the sheet of material 1036 so that each of the female connectors 1058 is alignable with the male connector 1056 when the first end portion 1044 of the sheet of flexible material 1036 is disposed over the second end portion 1046 of the sheet of flexible material 1036 during formation of the shape-sustaining support member 1024. Thus, upon inserting the male connector 1056 into a selected female connector 1058, the circumferential dimensions of the shape-sustaining support member 1024 can be varied.

Once the sheet of flexible material 1036 has been formed into the shape-sustaining support member 1024 as described above with the upper end portion 1052 of the flexible bag 1029 extending from the open upper end 1025 of the shape-sustaining support member 1024, the flexible vase 1000 can be used.

Embodiment of FIGS. 78–80

Referring now to FIG. 78, another embodiment of a flexible vase 1060 constructed in accordance with the present invention is illustrated. The flexible vase 1060 comprises a sheet of fluid impermeable material 1062 wrapped about a self-erecting floral holding container 1064. The sheet of fluid impermeable material 1062 and the self-erecting floral holding container 1064 cooperate to define a reservoir 1066 in the flexible vase 1060 which is capable of holding a fluid, such as water. The sheet of fluid impermeable material 1062 is substantially identical in construction as the sheet of fluid impermeable material 62 herein before described in detail with reference to FIG. 11.

The sheet of fluid impermeable material 1062 is disposed about the floral holding container 1064 to form a decorative cover 1068 about the floral holding container 1064 which extends a distance above the floral holding container 1064 such that an opening 1070 formed in an upper end 1072 of the floral holding container 1064 remains substantially uncovered by the decorative cover 1068.

A crimped portion 1074 can be provided in the decorative cover 1068 near the upper end 1072 of the floral holding container 1064. The crimped portion 1074 can be formed by crimping together portions of the decorative cover 1068 and, if desired, the crimped portion can be connected with a suitable bonding material such as a cohesive 1075 (FIG. 80). The crimped portions 1074 can also be found by placing a band (not shown) about a portion of the decorative cover 1068 in which case the band gathers or brings together portions of the decorative cover 1068 to form the crimped portion 1074.

Referring now to FIGS. 79 and 80, the self-erecting floral holding container 1064 is illustrated in a collapsed position disposed on the sheet of fluid impermeable material 1062. The self-erecting floral holding container 1064 comprises a top member 1076, a bottom member 1078, a plurality of wall members (only one being designated by the reference numeral 1080), a bracket 1082 and a plurality of elastic members (only one being designated by the reference numeral 1084).

Each wall member 1080 has a top hinge 1086, a wall hinge 1088 and a bottom hinge 1090. Each top hinge 1086 allows the corresponding wall member 1080 to pivot with respect to the top member 1076. Each wall hinge 1088 allows the corresponding wall member 1080 to bend outward and define an upper wall section 1092 and a lower wall section 1094. Similarly, each bottom hinge 1090 allows the corresponding wall member 1080 to pivot with respect to the bottom member 1078 of the floral holding container 1064.

With this construction, the floral holding container 1064 may assume an erected position (FIG. 78) when an external force applied to the top member 1076 is removed and a flat position (FIGS. 79 and 80) when an external force is applied to the top member 1076. In the erected position, the floral holding container 1064 is suitable for receiving a floral grouping, such as cut flowers. In the storage position, the wall members 1080 of the floral holding container 1064 are collapsed such that the floral holding container 1064 is substantially flat (FIG. 79). In the storage position, the top member 1076 and the bottom member 1078 of the floral holding container 1064 are moved together and each upper wall section 1092 closely overlays the corresponding lower wall section 1094.

Each elastic member 1084 extends between a corresponding one of the wall members 1080 and the bracket 1082 to suspend the bracket 1082 within the floral holding container 1064. The bracket 1082 has a bracket opening 1096 which may be any suitable size and shape for allowing a floral grouping to be disposed into the floral holding container 1064.

Each elastic member 1084 may be connected to the bracket 1082 and the corresponding wall member 1080 in any appropriate manner known in the art. Further, each elastic member 1084 may be connected to the upper wall section 1092, the lower wall section 1094, or both the upper and lower wall sections 1092 and 1094 of the corresponding wall member 1080.

The elastic members 1080 and the bracket 1082 cooperate to bias the floral holding container 1064 into the erected position (FIG. 78). Under an external force to overcome the bias of the elastic members 1080, the floral holding container 1064 may be collapsed into the flat storage position (FIGS. 79 and 80) wherein the wall members 1080 moves outward at the wall hinges 1088 and the elastic members 1084 are moved to a stretched condition so that the floral holding container 1064 is moved to the collapsed position.

When the external force (i.e. a bias-overcoming influence) is removed, the elastic members 1084 return to the unstretched condition and cause the floral holding container 1064 to move to the erected position. The sheet of fluid impermeable material 1062 is then wrapped about the floral holding container 1064 to produce the flexible vase 1060 shown in FIG. 78.

It should be noted that a quantity of the floral holding containers 1064 having a sheet of the fluid impermeable material 1062 secured to the bottom member 1078 as illustrated in FIGS. 79 and 80 can be compressed into the flat storage position, stacked and shipped, or stored in a suitable shipping box. Further, one of the floral holding containers 1064 having the sheet of fluid impermeable material 1062 secured to the bottom member 1078 of the floral holding container 1064 may be stored in the flat storage position within a sleeve similar to a phonograph record album cover.

The floral holding container 1064 having the sheet of fluid impermeable material 1062 secured thereto may be maintained in a box or shelving having a plurality of mail-slot shelves. When withdrawn from the mail-slot shelf, the floral holding container 1064 automatically assumes the erected position and the sheet of fluid impermeable material 1062 can be wrapped about the floral holding container 1064 to provide the flexible vase 1060. It should be appreciated that any suitable devices known in the art may be used for the elastic members 1084 as the means for biasing the floral holding container 1064 into the erected position. Such devices include, but are not limited to, rubber bands, coiled springs and flat springs.

Further, the top member 1076, the bottom member 1078 and the wall member 1080 of the floral holding container 1064 may be constructed of a wide variety of materials, such as paper, cardboard, wood, metal, polypropylene and various types of natural and synthetic materials, provided, such materials having enough rigidity to sustain the floral holding container 1064 in the appropriate shape for the erected position.

Figure 81:
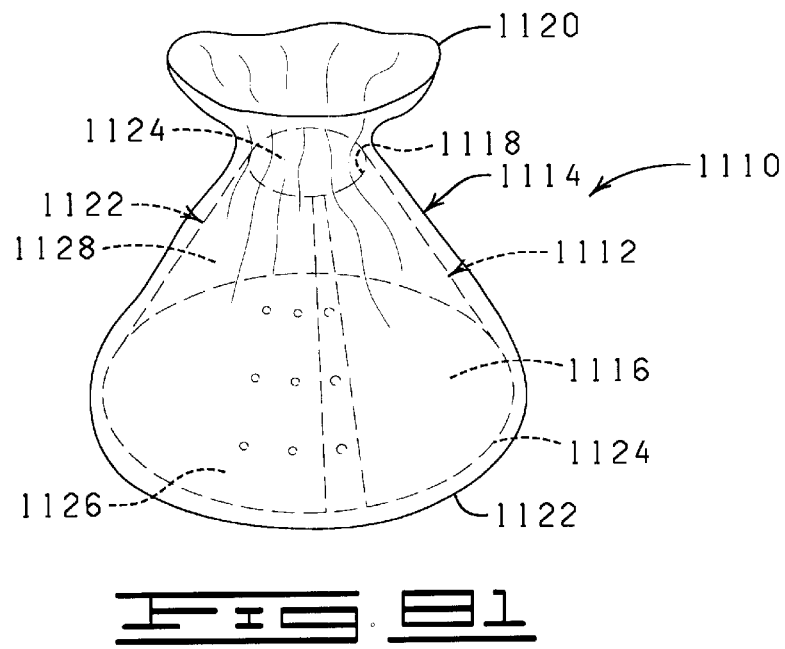
FIG. 81 is a perspective view of a shape-sustaining support member disposed in a flexible bag which, when wrapped with a sheet of material, provides a flexible vase in accordance with the present invention.
Figure 82:
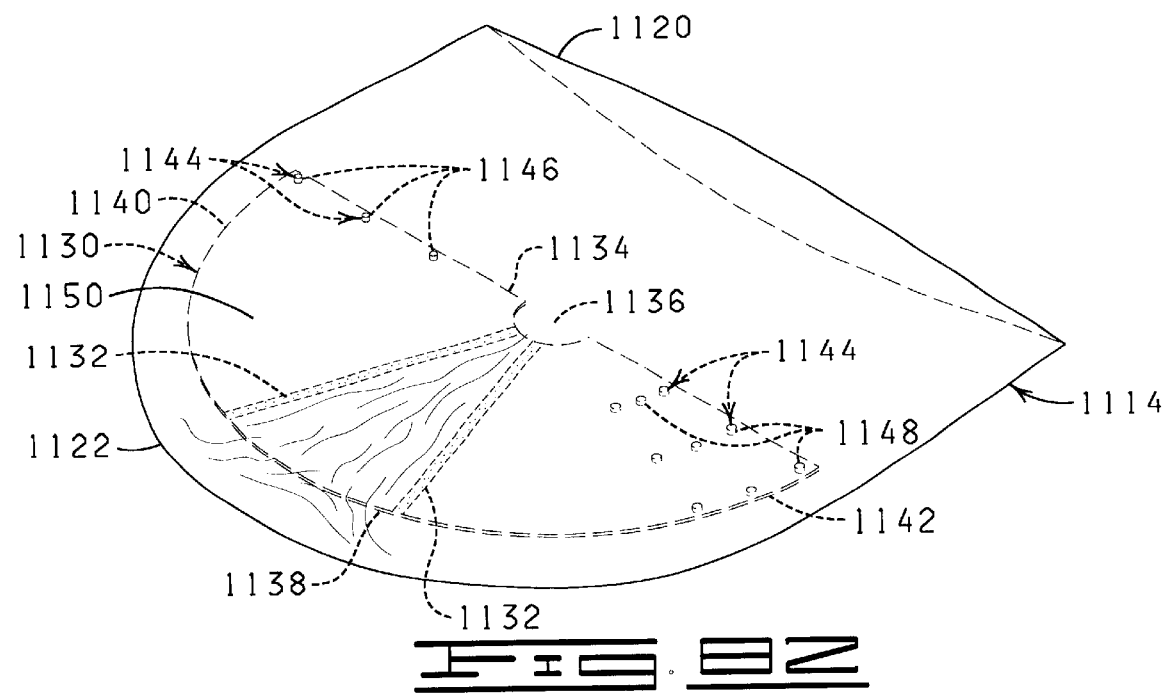
FIG. 82 is a perspective view of a sheet of flexible material disposed in a flexible bag which, when assembled, provides the shape-sustaining support member disposed in the bag of FIG. 81.

Embodiment of FIGS. 81 and 82

Shown in FIG. 81 is another embodiment of a flexible vase 1110 constructed in accordance with the present invention. The flexible vase 1110 comprises a floral holding material 1112 disposed within a flexible bag 1114 formed of a fluid impermeable material which functions as a decorative cover for the floral holding material 1112. As will be more fully described hereinafter, the flexible bag 1114 and the floral holding material 1112 cooperate to define a reservoir 1116 in the flexible vase 1110. The flexible bag 1114 extends a distance above the floral holding material 1112 such that an upper end portion 1118 of the floral holding material 1112 remains substantially uncovered by the flexible bag 1114. Thus, when a floral grouping such as cut flowers (not shown) is positioned within the reservoir 1116 of the flexible vase 1110, a portion of the floral grouping extends outwardly from the upper end portion 1118 of the floral holding material 1112 and an outer top margin 1120 of the flexible bag 1114.

The flexible bag 1114 is provided with a bottom panel 1122 that is preferably formed by a plurality of panel sections which are joined along with lateral edges of the side panel forming the flexible bag 1114 in order to form bellows that conform to the shape of a lower end 1124 of the floral holding material 1112. The side panels of the flexible bag 1114 then provide a more tubular bag sidewall which can extend upwardly from the bottom panel 1122 to terminate at the outer top margin 1120 of the flexible bag 1114. A fastener (not shown) can then be placed about the flexible bag 1114 so as to be disposed above the upper end portion 1118 of the floral holding material 1112 such that the upper end portion 1118 of the floral holding material 1112 remains substantially uncovered by the flexible bag 1114. If desired, a bonding material such as an adhesive or a cohesive may be disposed on an inner or outer surface of the flexible bag 1114 so that a portion of the flexible bag 1114 can be crimped in the manner hereinbefore described.

The floral holding material 1112 comprises a shape-sustaining support member 1122 having an open upper end 1124, an open lower end 1126, and a peripheral sidewall 1128 defining an internal chamber extending between the open upper end 1124 and the open lower end 1126. The shape-sustaining support member 1122 is fabricated of a sheet of flexible material 1130 (FIG. 82) which has sufficient flexibility to permit the sheet of flexible material 1130 to be formed into the shape-sustaining support member 1122 and which also has sufficient strength to provide the required shape-sustaining properties to the shape-sustaining support member 1122. The thickness of the flexible sheet of material 1130 can vary widely. The only requirement being that the sheet of flexible material 1130 has sufficient strength and flexibility to satisfy the above requirements.

The sheet of flexible material 1130 is secured within the flexible bag 1114 by a bonding material, such as a plurality of strips of adhesive 1132. A portion of the bag is gathered between the adhesive strips 1132 such that when the flexible sheet of material 1130 is formed into the shape-sustaining support member 1122, the flexible bag 1114 extends substantially uniformly thereabout.

The flexible sheet of material 1130 has an upper side 1134 having a centrally disposed recess 1136, a lower side 1138, a first end portion 1140, and a second end portion 1142, which cooperate to provide the sheet of flexible material 1130 with a substantially semi-circular configuration. The sheet of flexible material 1130 is further provided with a connector assembly 1144 for connecting the first and second end portions 1140 and 1142 of the flexible sheet of material 1130 when the sheet of flexible material 1130 is formed into the shape-sustaining support member 1122, substantially as shown in FIG. 81.

The connector assembly 1144 comprises a plurality of spatially disposed male connectors 1146 and a plurality of spatially disposed female connectors 1148 adapted to matingly receive the male connectors 1146 when the first end portion 1140 of the sheet of flexible material 1130 is disposed over the second end portion 1142 of the sheet of flexible material 1130. The plurality of male connectors 1146 extend between the centrally disposed recess 1136 and the first end portion 1140 of the sheet of flexible material 1130 such that the male connectors 1146 are disposed in close proximity to the portion of the upper side 1134 of the sheet of flexible material 1130. The plurality of female connectors 1148 extend along the second end portion 1142 of the sheet of flexible material 1130 such that the female connectors 1148 are adapted to matingly engage the male connectors 1146 when the first end portion 1140 of the sheet of flexible material 1130 is disposed over the second end portion 1142 thereof.

The male connectors 1146 are desirably a plurality of stud like members which extend upwardly from an upper surface 1150 of the sheet of material 1130 and the plurality of female connectors 1148 are desirably provided with a recessed portion (not shown) adapted to matingly receive the stud-like members of the male connectors 1146. Such connector assemblies are well known in the art. Thus, no further details concerning the male connectors 1146 and the female connectors 1148 are believed necessary.

To assemble the flexible vase 1110, the flexible sheet of material 1130 is manipulated so that the first end portion 1140 of the sheet of flexible material 1130 overlays the second portion 1142 thereof and the male connectors 1146 are aligned with selected female connectors 1148. Thereafter, the male connectors 1146 are pressed into mating engagement with the female connectors 1148 so that the flexible sheet of material 1130 is formed into the shape-sustaining support member 1122 within the flexible bag 1114. Thus, a one step operation is provided for constructing the flexible vase 1110.

Referring now to FIGS. 83 and 84, another embodiment of a floral holding material 1160 is shown which can be used to construct a flexible vase similar in configuration to the flexible vase 120 hereinbefore described with reference to FIG. 14. The floral holding material 1160 comprises a shape-sustaining support member 1162 having an open upper end 1164, an open lower end 1166 and a peripheral sidewall 1168 defining an internal chamber 1170 extending between the open upper end 1164 and the open lower end 1166. The shape-sustaining support member 1162 is fabricated of a sheet of flexible material 1172 (FIG. 84) which has sufficient flexibility to permit the sheet of flexible material 1172 to be formed into the shape-sustaining support member 1162.

The sheet of flexible material 1172 has an upper side 1174 having a centrally disposed recess 1176, a lower side 1178, a first end portion 1180 and a second end portion 1182 which cooperate to provide the sheet of flexible material 1172 with a substantially semi-circular configuration. The sheet of flexible material 1172 is further provided with a connector assembly 1184 for connecting the first end portion 1180 of the sheet of flexible material 1172 to the second end portion 1182 of the sheet of flexible material 1172 when the sheet of flexible material 1172 is formed into the shape-sustaining support member 1160 as shown in FIG. 83.

The connector assembly 1184 comprises a plurality of first tabs 1186 and a plurality of second tabs 1188. The first tabs 1186 are formed along a peripheral portion of the sheet of flexible material 1172 such that the first tabs 1186 extend along the first end portion 1180 and the second end portion 1182 of the sheet of flexible material 1172 substantially as shown; and the second tabs 1188 extend about the centrally disposed recess 1176 found in the upper side 1174 of the sheet of flexible material 1172.

To form the sheet of flexible material 1172 into the shape-sustaining support member 1160 (FIG. 83) for use in the construction of a flexible vase, the first end portion 1180 of the sheet of flexible material 1172 is positioned over the second end portion 1182 of the sheet of flexible material 1172 such that at least a portion of the first tabs 1186 formed along the first end portion 1180 of the sheet of flexible material 1172 are aligned with and disposed adjacent a portion of the first tabs 1186 found along the second end portion 1182 of the sheet of flexible material 1172 and a portion of the second tabs 1188 found along one side of the centrally disposed recess 1176 overlap and are aligned with a portion of the second tabs 1188 found along a second side of the centrally disposed recess 1176. At least a portion of the aligned first tabs 1186 and at least a portion of the aligned second tabs 1188 are bent or extended in an inwardly direction (FIG. 83) so as to connect the first end portion 1180 of the sheet of flexible material 1172 to the second end portion 1182 of the sheet of flexible material 1172 and thereby provide the shape-sustaining support member 1162 substantially as shown in FIG. 83.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An improved shape-sustaining support member for supporting a sheet of flexible, fluid impermeable material in a form so that the sheet of flexible, fluid impermeable material is capable of holding a floral grouping and maintaining a liquid about a stem portion of the floral grouping during transport and display of the floral grouping, the shape-sustaining support member comprising a sheet of flexible material having an upper side with a centrally disposed recess therein, a lower side, a first end portion, and a second end portion, the sheet of flexible material having a substantially semi-circular shape such that upon the first end portion being caused to overlap the second end portion the sheet of material is formed into a substantially frusto-conically shaped member having an open upper end, an open lower end, and a peripheral sidewall defining an internal chamber extending between the open upper end and the open lower end, the sheet of flexible material having at least one male connector formed on the upper side of the sheet of material on the first end portion thereof so as to protrude a distance away from the upper side and at least one female connector formed on the second end portion of the sheet of material adapted to matingly receive the male connector for securing the first end portion to the second end portion, the improvement comprising:

a plurality of slots extending radially from the centrally disposed recess of the upper side of the sheet of flexible material so as to provide support in a manner that does not crush the stem portion of the floral grouping.

2. The improved shape-sustaining support member of claim 1 wherein the female connector is a slot, and wherein the male connector is at least one tab member configured to lockingly engage with the second end portion of the sheet of flexible material when the tab member is inserted through the slot of the second end portion.

3. An improved shape-sustaining support member for supporting a sheet of flexible, fluid impermeable material in a form so that the sheet of flexible, fluid impermeable material is capable of holding a floral grouping and maintaining a liquid about stem portions of the floral grouping during transport and display of the floral grouping, the shape-sustaining support member comprising a sheet of flexible material having an upper side with a centrally disposed recess therein, a lower side, a first end portion, and a second end portion, the sheet of material having a substantially semi-circular shape such that upon the first end portion being caused to overlap the second end portion the sheet of flexible material is formed into a substantially frusto-conically shaped member having an open upper end, an open lower end, and a peripheral sidewall defining an internal chamber extending between the open upper end and the open lower end, the sheet of flexible material having a pair of tab members formed on the upper side of the sheet of material on the first end portion thereof so as to protrude a distance away from the upper side and at least one slot extending through the second end portion of the sheet of flexible material, each of the tab members configured to lockingly engage with the second end portion of the sheet of flexible material when the tab members are inserted through the slot of the second end portion for securing the first end portion of the sheet of flexible material to the second end portion, the improvement comprising:

a plurality of slots extending radially from the centrally disposed recess of the upper side of the sheet of flexible material so as to provide support in a manner that does not crush the stem portion of the floral grouping.

* * * * *